(12) United States Patent
Maylor et al.

(10) Patent No.: US 11,595,417 B2
(45) Date of Patent: *Feb. 28, 2023

(54) SYSTEMS AND METHODS FOR MEDIATING ACCESS TO RESOURCES

(71) Applicant: Mimecast Services Ltd., London (GB)

(72) Inventors: Jackie Anne Maylor, Wiltshire (GB); Simon Paul Tyler, Wiltshire (GB); Steven Malone, Berkshire (GB); Wayne Van Ry, London (GB); Francisco Ribeiro, London (GB); Nathaniel S. Borenstein, Greenbush, MI (US); Paul Sowden, London (GB)

(73) Assignee: Mimecast Services Ltd., London (GB)

(*) Notice: Subject to any disclaimer, the term of this patent is extended or adjusted under 35 U.S.C. 154(b) by 72 days.

This patent is subject to a terminal disclaimer.

(21) Appl. No.: 16/939,768

(22) Filed: Jul. 27, 2020

(65) Prior Publication Data

US 2020/0358798 A1 Nov. 12, 2020

Related U.S. Application Data

(63) Continuation-in-part of application No. 15/449,569, filed on Mar. 3, 2017, now Pat. No. 10,728,239, which is a continuation-in-part of application No. 15/010,023, filed on Jan. 29, 2016, now Pat. No. 9,654,492, which is a continuation-in-part of application No. 14/855,200, filed on Sep. 15, 2015, now Pat. No. 9,467,435.

(51) Int. Cl.
*H04L 29/06* (2006.01)
*H04L 9/40* (2022.01)

(52) U.S. Cl.
CPC ...... *H04L 63/1425* (2013.01); *H04L 63/1416* (2013.01); *H04L 63/1483* (2013.01)

(58) Field of Classification Search
CPC ............. H04L 63/1425; H04L 63/1416; H04L 63/1483; H04L 63/1433; H04L 63/145
USPC .......................................................... 726/4
See application file for complete search history.

(56) References Cited

U.S. PATENT DOCUMENTS

| | | |
|---|---|---|
| 5,959,542 A | 9/1999 | Ishida |
| 6,253,193 B1 | 6/2001 | Ginter et al. |
| 6,931,532 B1 | 8/2005 | Davis et al. |
| 6,965,968 B1 | 11/2005 | Touboul |
| 7,058,822 B2 | 6/2006 | Edery et al. |
| 7,240,212 B2 | 7/2007 | Arnone et al. |
| 7,363,490 B2 | 4/2008 | Paulsen, Jr. et al. |
| 7,418,731 B2 | 8/2008 | Touboul |

(Continued)

OTHER PUBLICATIONS

Reduced realistic attack plan surface for identification of prioritized attack goals, Smith et al., Nov. 2013 (Year: 2013).*

(Continued)

*Primary Examiner* — Jahangir Kabir
(74) *Attorney, Agent, or Firm* — Nutter McClennen & Fish LLP

(57) ABSTRACT

The present disclosure relates generally to the field of data processing and electronic messaging systems, and, more particularly, to systems and methods for mediating a user's access to a resource to thereby prevent potential security breaches, including phishing and impersonation, malware, and security issues, particularly with respect to websites and electronic communications.

25 Claims, 40 Drawing Sheets

(56) References Cited

U.S. PATENT DOCUMENTS

| | | | |
|---|---|---|---|
| 7,444,380 B1 | 10/2008 | Diamond | |
| 7,562,382 B2 | 7/2009 | Hinton et al. | |
| 7,647,633 B2 | 1/2010 | Edery et al. | |
| 7,653,695 B2 | 1/2010 | Flury | |
| 7,827,402 B2 | 11/2010 | Smith | |
| 7,970,843 B2 | 6/2011 | Brown et al. | |
| 8,019,689 B1 | 9/2011 | Nachenberg | |
| 8,141,154 B2 | 3/2012 | Gruzman et al. | |
| 8,145,718 B1 | 3/2012 | Kacker et al. | |
| 8,281,372 B1 | 10/2012 | Vidal | |
| 8,392,357 B1 | 3/2013 | Zou et al. | |
| 8,522,331 B2 | 8/2013 | Onozawa et al. | |
| 8,635,690 B2 | 1/2014 | Alperovitch | |
| 8,667,069 B1 | 3/2014 | Connelly et al. | |
| 8,843,516 B2 | 9/2014 | Leong et al. | |
| 8,843,997 B1 | 9/2014 | Hare | |
| 8,862,675 B1 | 10/2014 | Coomer | |
| 8,990,392 B1 | 3/2015 | Stamos | |
| 9,027,115 B2 | 5/2015 | Larson et al. | |
| 9,129,116 B1 | 9/2015 | Wiltzius | |
| 9,154,498 B2 | 10/2015 | Byrne et al. | |
| 9,177,293 B1 | 11/2015 | Gagnon | |
| 9,344,449 B2 | 5/2016 | Brown et al. | |
| 9,413,774 B1 | 8/2016 | Liu et al. | |
| 9,467,410 B2 | 10/2016 | Liebmann et al. | |
| 9,467,435 B1 | 10/2016 | Tyler et al. | |
| 9,654,492 B2 | 5/2017 | Maylor et al. | |
| 9,760,697 B1 | 9/2017 | Walker | |
| 10,050,998 B1 | 8/2018 | Singh | |
| 10,148,683 B1 | 12/2018 | Lin et al. | |
| 10,277,628 B1 | 4/2019 | Jakobsson | |
| 10,536,449 B2 | 1/2020 | Maylor et al. | |
| 10,586,261 B2 | 3/2020 | Baig | |
| 10,609,073 B2 | 3/2020 | Jakobsson | |
| 10,728,239 B2 | 7/2020 | Maylor et al. | |
| 2002/0091019 A1 | 7/2002 | Bays et al. | |
| 2002/0095567 A1 | 7/2002 | Royer et al. | |
| 2002/0199096 A1 | 12/2002 | Wenocur et al. | |
| 2003/0051054 A1 | 3/2003 | Redlich et al. | |
| 2003/0065941 A1 | 4/2003 | Ballard et al. | |
| 2003/0110272 A1 | 6/2003 | du Castel et al. | |
| 2003/0182383 A1 | 9/2003 | He | |
| 2003/0202663 A1 | 10/2003 | Hollis et al. | |
| 2003/0204569 A1 | 10/2003 | Andrews et al. | |
| 2003/0227487 A1 | 12/2003 | Hugh | |
| 2004/0003398 A1 | 1/2004 | Donian | |
| 2004/0070678 A1 | 4/2004 | Toyama et al. | |
| 2004/0083270 A1 | 4/2004 | Heckerman et al. | |
| 2004/0086127 A1 | 5/2004 | Candelore | |
| 2004/0249897 A1 | 12/2004 | Espinosa | |
| 2005/0033855 A1 | 2/2005 | Moradi et al. | |
| 2005/0076222 A1 | 4/2005 | Olkin | |
| 2005/0278540 A1 | 12/2005 | Cho | |
| 2006/0015945 A1 | 1/2006 | Fields | |
| 2006/0021031 A1 | 1/2006 | Leahy et al. | |
| 2006/0031359 A1 | 2/2006 | Clegg et al. | |
| 2006/0075494 A1 | 4/2006 | Bertman et al. | |
| 2006/0106802 A1 | 5/2006 | Giblin et al. | |
| 2006/0119288 A1 | 6/2006 | Ayala et al. | |
| 2006/0168006 A1 | 7/2006 | Shannon et al. | |
| 2006/0212931 A1 | 9/2006 | Shull | |
| 2006/0253458 A1 | 11/2006 | Dixon et al. | |
| 2007/0005713 A1 | 1/2007 | LeVasseur et al. | |
| 2007/0005984 A1 | 1/2007 | Florencio et al. | |
| 2007/0038614 A1 | 2/2007 | Guha | |
| 2007/0079379 A1 | 4/2007 | Sprosts et al. | |
| 2007/0143271 A1 | 6/2007 | Yuval et al. | |
| 2007/0143827 A1 | 6/2007 | Nicodemus et al. | |
| 2007/0192853 A1 | 8/2007 | Shraim et al. | |
| 2007/0245422 A1 | 10/2007 | Hwang | |
| 2007/0294292 A1 | 12/2007 | Hydrie | |
| 2008/0028444 A1 | 1/2008 | Loesch et al. | |
| 2008/0115227 A1 | 5/2008 | Toutonghi | |
| 2008/0127319 A1 | 5/2008 | Galloway et al. | |
| 2008/0127339 A1 | 5/2008 | Swain et al. | |
| 2008/0148376 A1 | 6/2008 | Onozawa et al. | |
| 2008/0178278 A1 | 7/2008 | Grinstein et al. | |
| 2008/0222425 A1 | 9/2008 | Buss | |
| 2008/0250106 A1 | 10/2008 | Rugg et al. | |
| 2008/0250114 A1 | 10/2008 | Dubovsky et al. | |
| 2008/0301445 A1 | 12/2008 | Vasic et al. | |
| 2009/0006532 A1 | 1/2009 | Sinn | |
| 2009/0063426 A1 | 3/2009 | Crouch et al. | |
| 2009/0097662 A1 | 4/2009 | Olechowski et al. | |
| 2009/0157490 A1 | 6/2009 | Lawyer | |
| 2009/0216841 A1 | 8/2009 | Choi et al. | |
| 2009/0320021 A1* | 12/2009 | Pan | G06F 11/0715 718/100 |
| 2010/0175136 A1 | 7/2010 | Frumer et al. | |
| 2010/0211459 A1 | 8/2010 | Seeman et al. | |
| 2010/0306819 A1 | 12/2010 | Nahari et al. | |
| 2011/0055004 A1 | 3/2011 | Libby | |
| 2011/0113109 A1 | 5/2011 | LeVasseur et al. | |
| 2011/0119258 A1 | 5/2011 | Forutanpour et al. | |
| 2011/0145580 A1 | 6/2011 | Auradkar et al. | |
| 2011/0179362 A1 | 7/2011 | Craddock et al. | |
| 2011/0296179 A1 | 12/2011 | Templin et al. | |
| 2012/0272317 A1 | 10/2012 | Rubin et al. | |
| 2012/0272319 A1 | 10/2012 | Shi et al. | |
| 2013/0047254 A1 | 2/2013 | Radhakrishnan et al. | |
| 2013/0074191 A1 | 3/2013 | Ben-Reuven | |
| 2013/0091580 A1 | 4/2013 | Maha et al. | |
| 2013/0298192 A1 | 11/2013 | Kumar | |
| 2014/0040394 A1 | 2/2014 | Tang | |
| 2014/0229617 A1 | 8/2014 | Cyr et al. | |
| 2014/0282964 A1 | 9/2014 | Stubblefield | |
| 2014/0283127 A1* | 9/2014 | Chacko | G06F 21/6263 726/28 |
| 2014/0317754 A1* | 10/2014 | Niemela | G06F 21/6227 726/26 |
| 2014/0331119 A1* | 11/2014 | Dixon | H04L 63/168 715/234 |
| 2014/0373123 A1 | 12/2014 | Kang | |
| 2015/0032829 A1 | 1/2015 | Barshow et al. | |
| 2015/0039886 A1 | 2/2015 | Kahol et al. | |
| 2015/0121063 A1 | 4/2015 | Maller et al. | |
| 2015/0281262 A1 | 10/2015 | Cai et al. | |
| 2015/0350143 A1 | 12/2015 | Yang et al. | |
| 2016/0012213 A1 | 1/2016 | Walsh | |
| 2016/0036833 A1 | 2/2016 | Ardeli | |
| 2016/0119288 A1 | 4/2016 | Ardeli et al. | |
| 2016/0142426 A1 | 5/2016 | Bird et al. | |
| 2017/0026393 A1 | 1/2017 | Walsh | |
| 2017/0078321 A1 | 3/2017 | Maylor et al. | |
| 2017/0148032 A1 | 5/2017 | Corniuk et al. | |
| 2018/0191754 A1 | 7/2018 | Higbee | |
| 2020/0137110 A1 | 4/2020 | Tyler et al. | |
| 2020/0186514 A1 | 6/2020 | Maylor et al. | |
| 2020/0358798 A1 | 11/2020 | Maylor et al. | |

OTHER PUBLICATIONS

United States Patent and Trademark Office, Non-Final Office Action for U.S. Appl. No. 16/732,604, dated Mar. 1, 2021, 12 pages.
United States Patent and Trademark Office, Non-Final Office Action for U.S. Appl. No. 16/727,480, dated Mar. 23, 2021, 24 pages.
AVG Technologies, 'AVG AntiVirus Free Edition User Manual', revision AVG.22 (Aug. 8, 2016), AVG Technologies CZ, entire document,http://files-download.avg.com/doc/AVG_free_uma_en_ltst_22.pdf.
Blue Coat Systems Inc., 'Web Application Firewall for Web Environments', Blue Coat Systems Inc., 2015, entire document, https://www.bluecoat.com/documents/download/c8988db3-06c0-4fb5-8bf2-2ec3e- 934e18e/f86a2dc5-cc4c-4756-b82a-1605470ede21.
Proofpoint/Gartner, Inc., 'Protecting the way people work:best practices for detecting and mitigating advanced persistent threats', Gartner, Inc., May 4, 2015, entire document, http://www.ciosummits.com/Online.sub.-Assets.sub.-Proofpoint.sub.-Gart- ner.sub.-Best.sub.-Practices.pdf.
SpamTitan, 'SpamTitan Administrators Guide v6.02',2014, SpamTitan, entire document, http://www.spamtitan.com/updates/PDF/Technical%

(56) References Cited

OTHER PUBLICATIONS

20Documentation/-SpamTitan_Administrators_Guide_v602160414_gh.pdf.

* cited by examiner

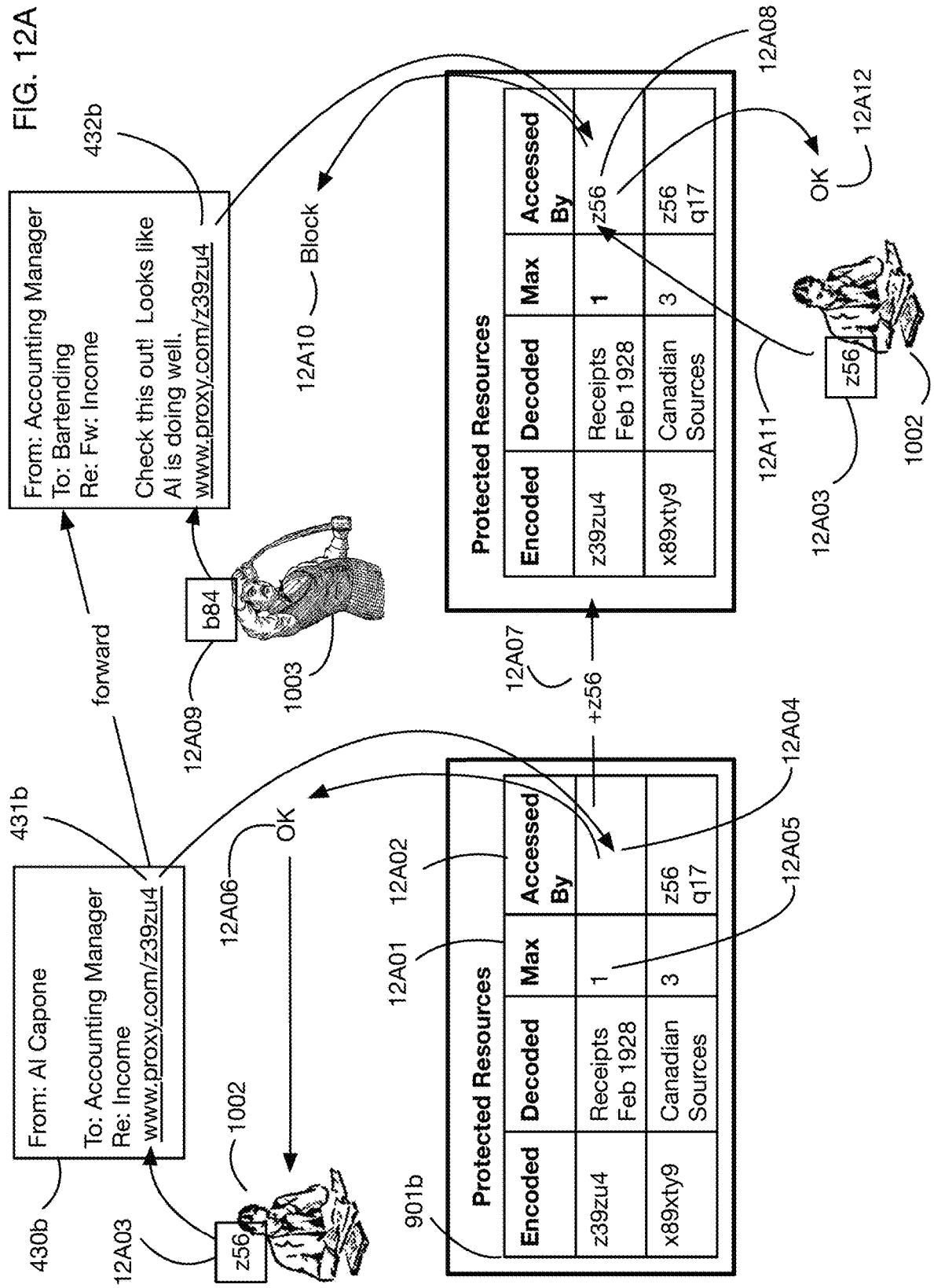

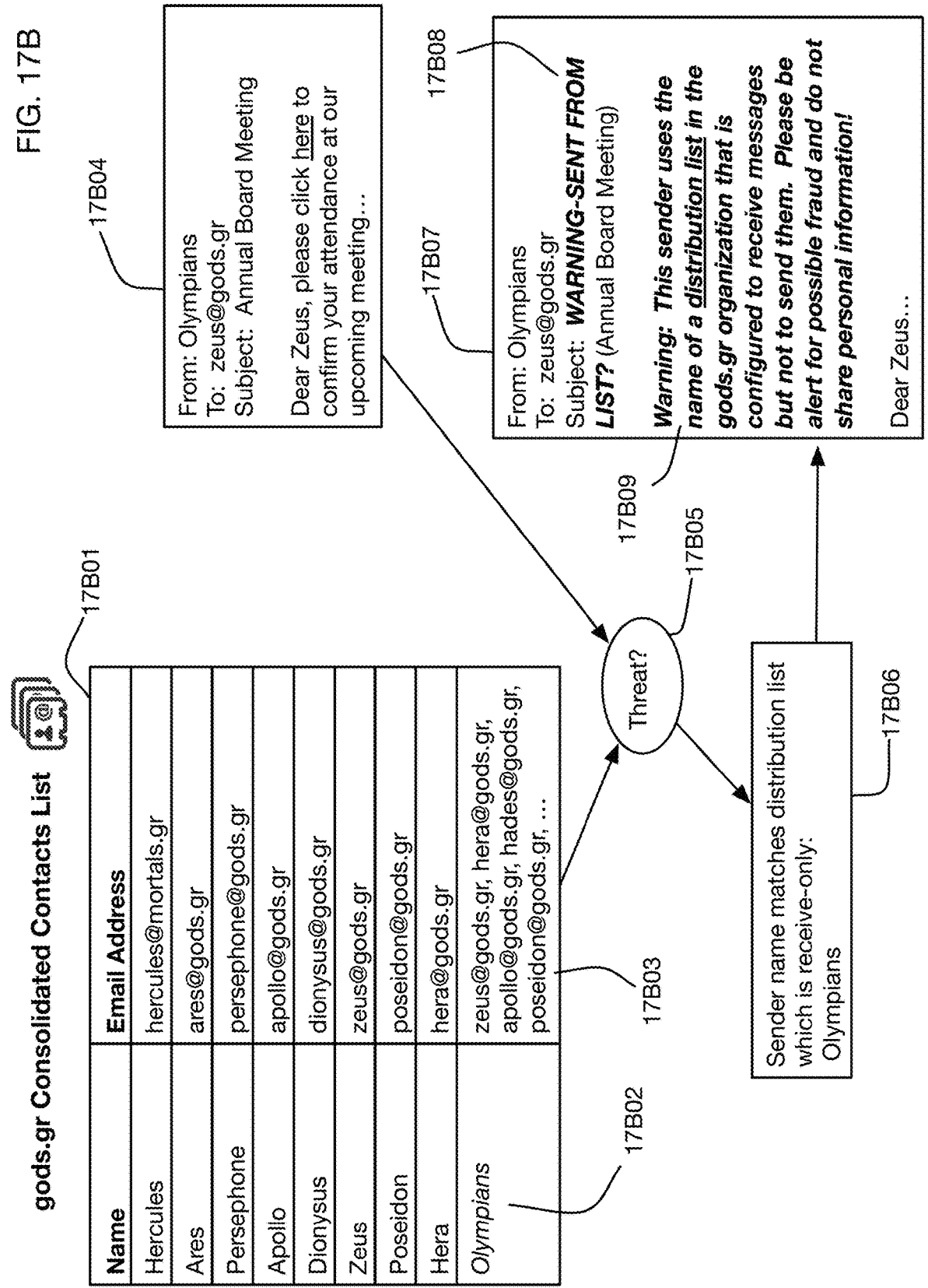

FIG. 19

gods.gr Consolidated Contacts List — 1701

| Name | Email Address |
|---|---|
| Hercules | hercules@mortals.gr |
| Ares | ares@gods.gr |
| Persephone | persephone@gods.gr |
| Apollo | apollo@gods.gr |
| Dionysus | dionysus@gods.gr |
| Zeus | zeus@gods.gr |
| Poseidon | poseidon@gods.gr |
| Hera | hera@gods.gr |
| Alex the Electrician | alexander@electricity.gr |
| Bank of Olympus | service@bankofolympus.com |

— 1901

1902 —

From: Alex the Electrician <alexander@grmail.com> — 1903
To: zeus@gods.gr
Subject: Payment for recent repairs Dear Mr. Zeus...

1906 —

From: From: Alex the Electrician <alexander@grmail.com>
To: zeus@gods.gr
Subject: WARNING-POSSIBLE IMPOSTOR (Payment for recent repairs)

*Warning: The sender's name is the same as a known contact, but the email address is different. Please be alert for possible fraud and do not share personal information!*

Dear Mr. Zeus...

Threat? — 1904

Sender with same display name, different address — 1905

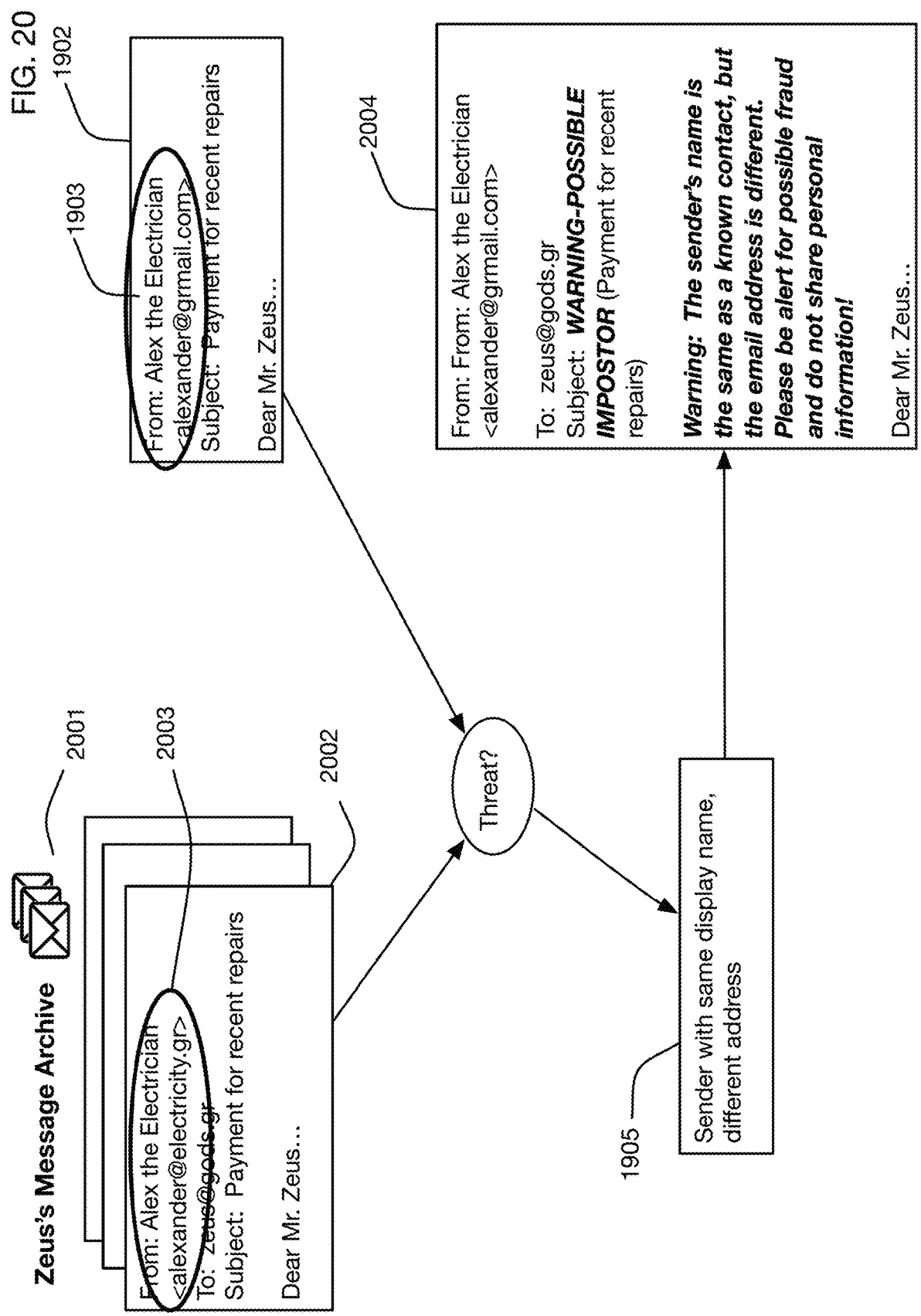

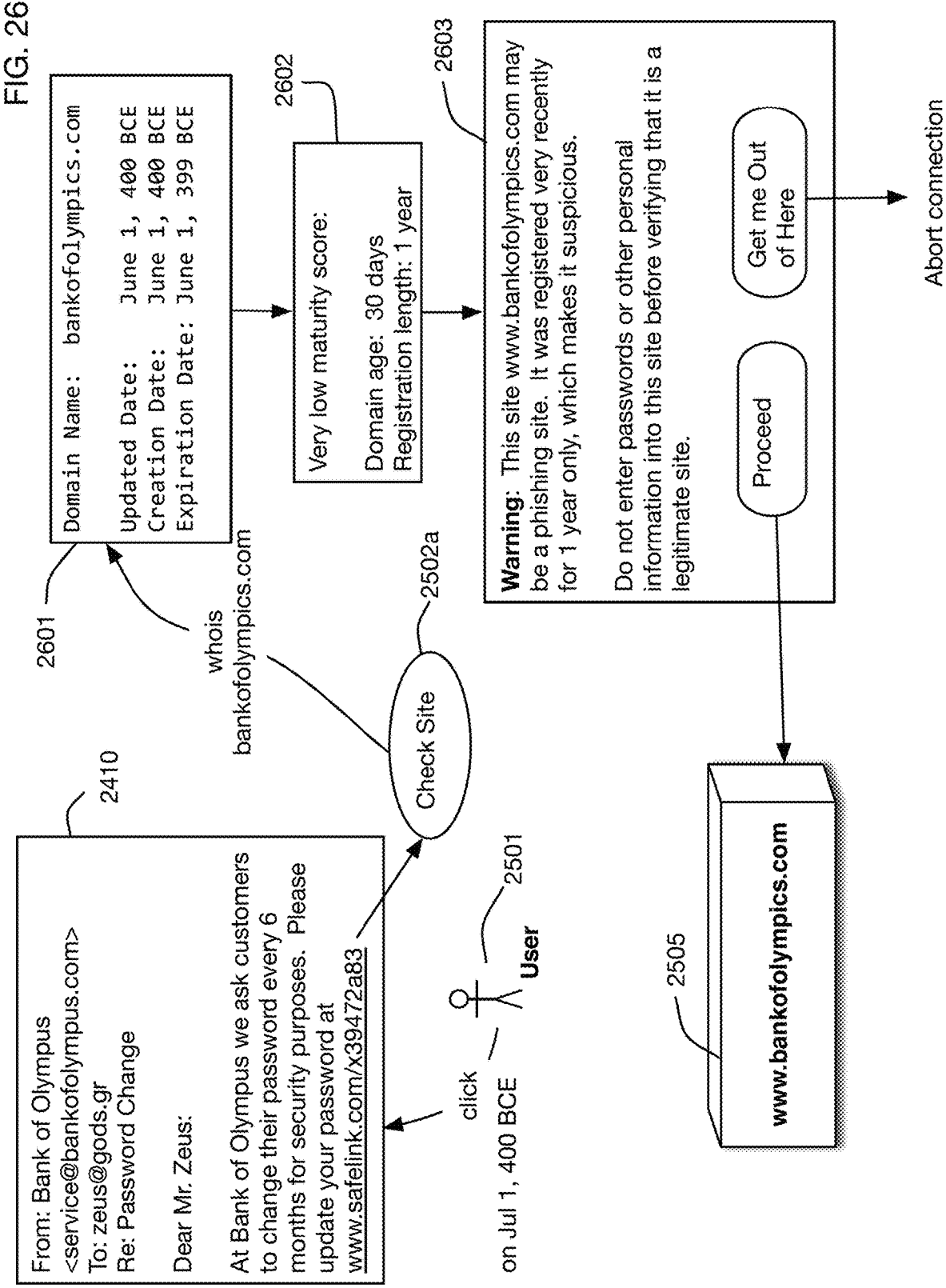

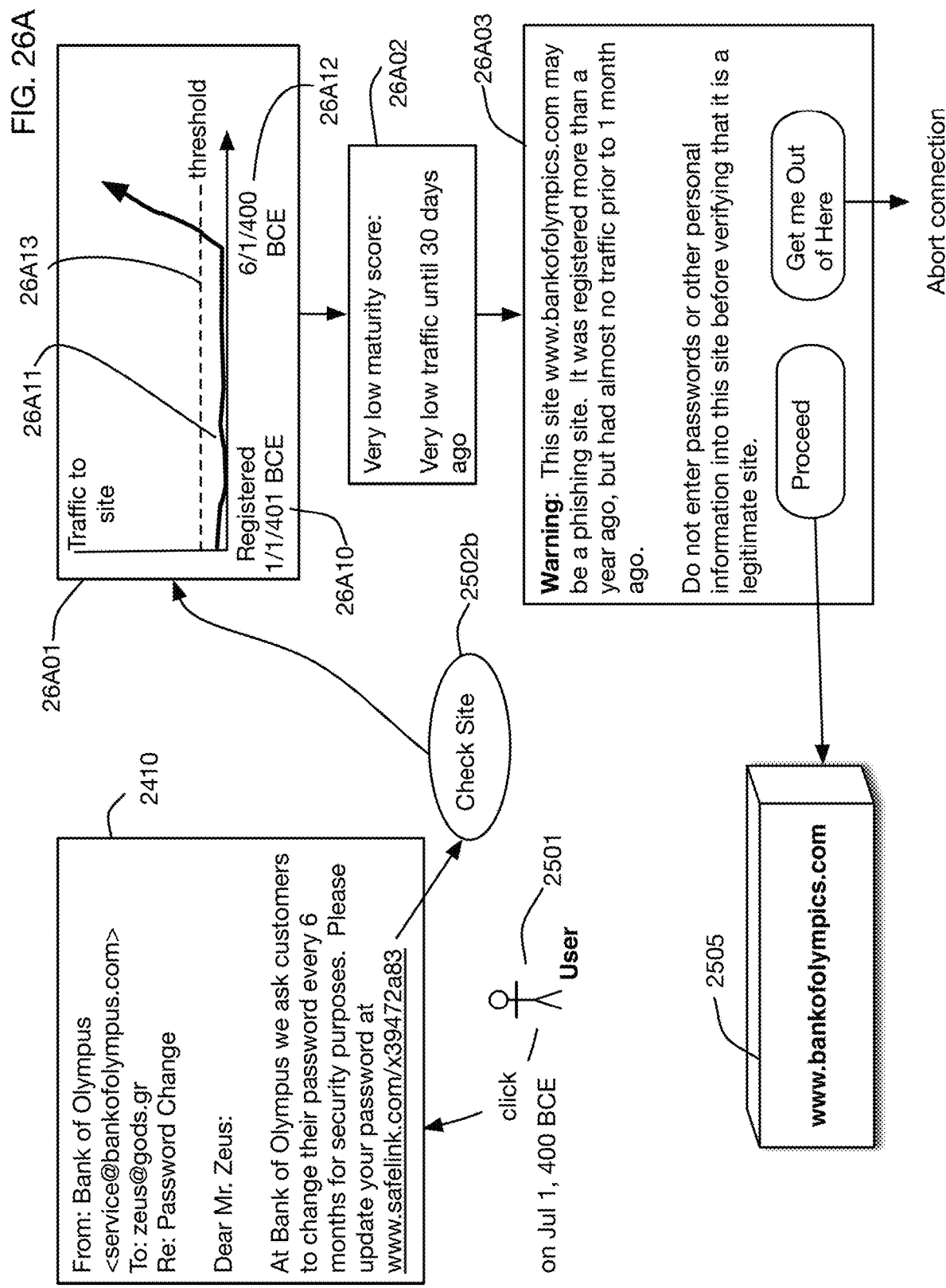

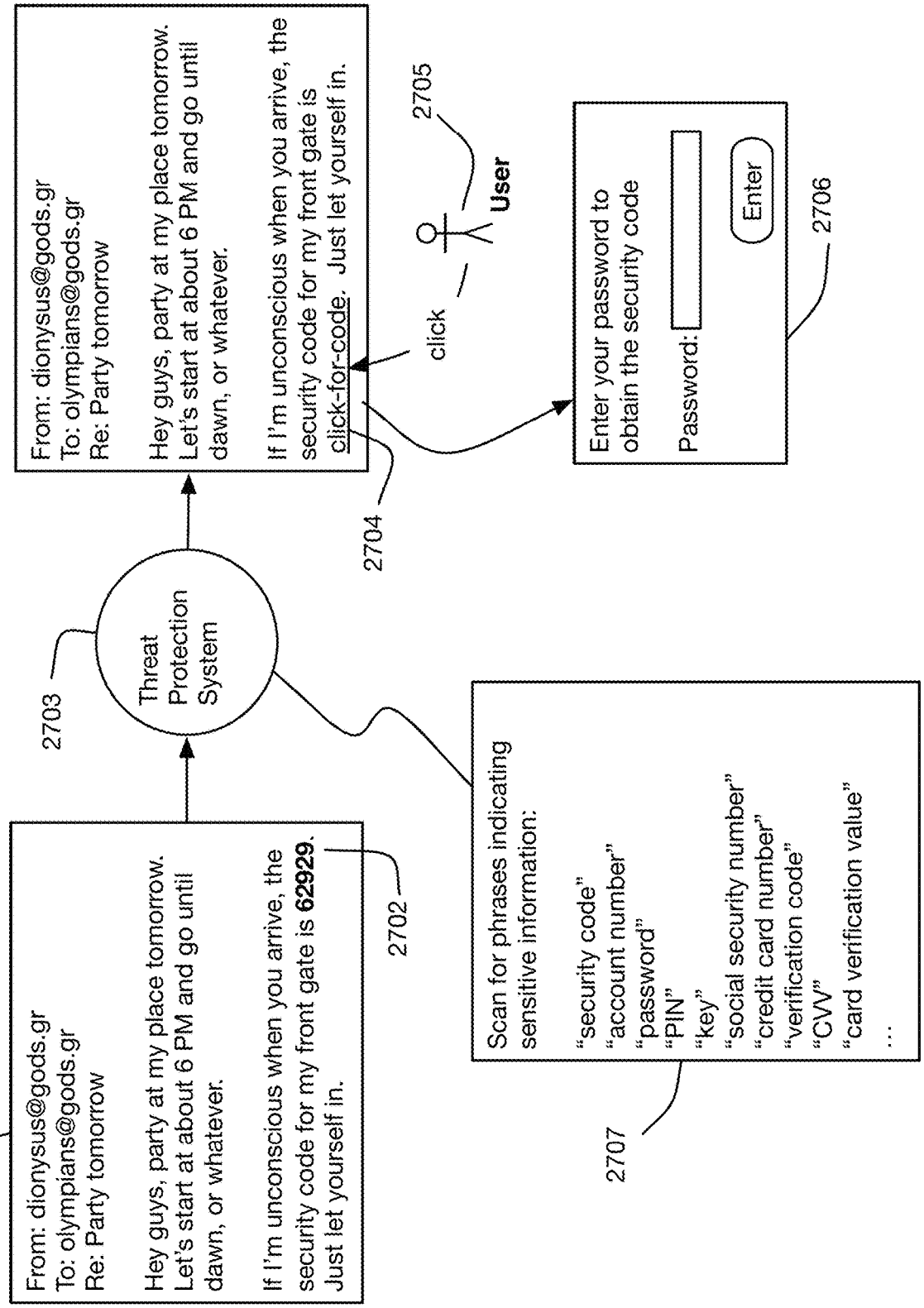

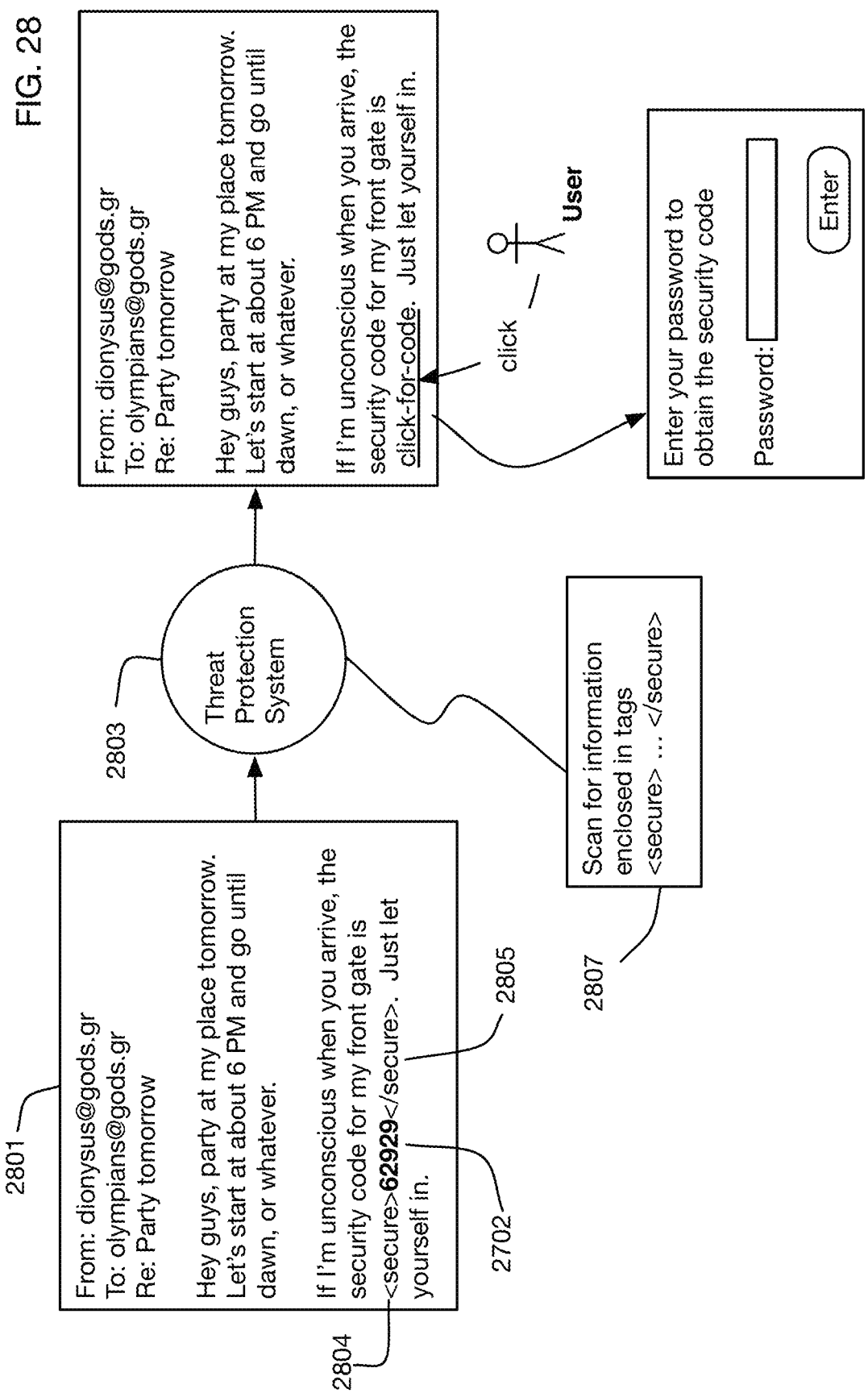

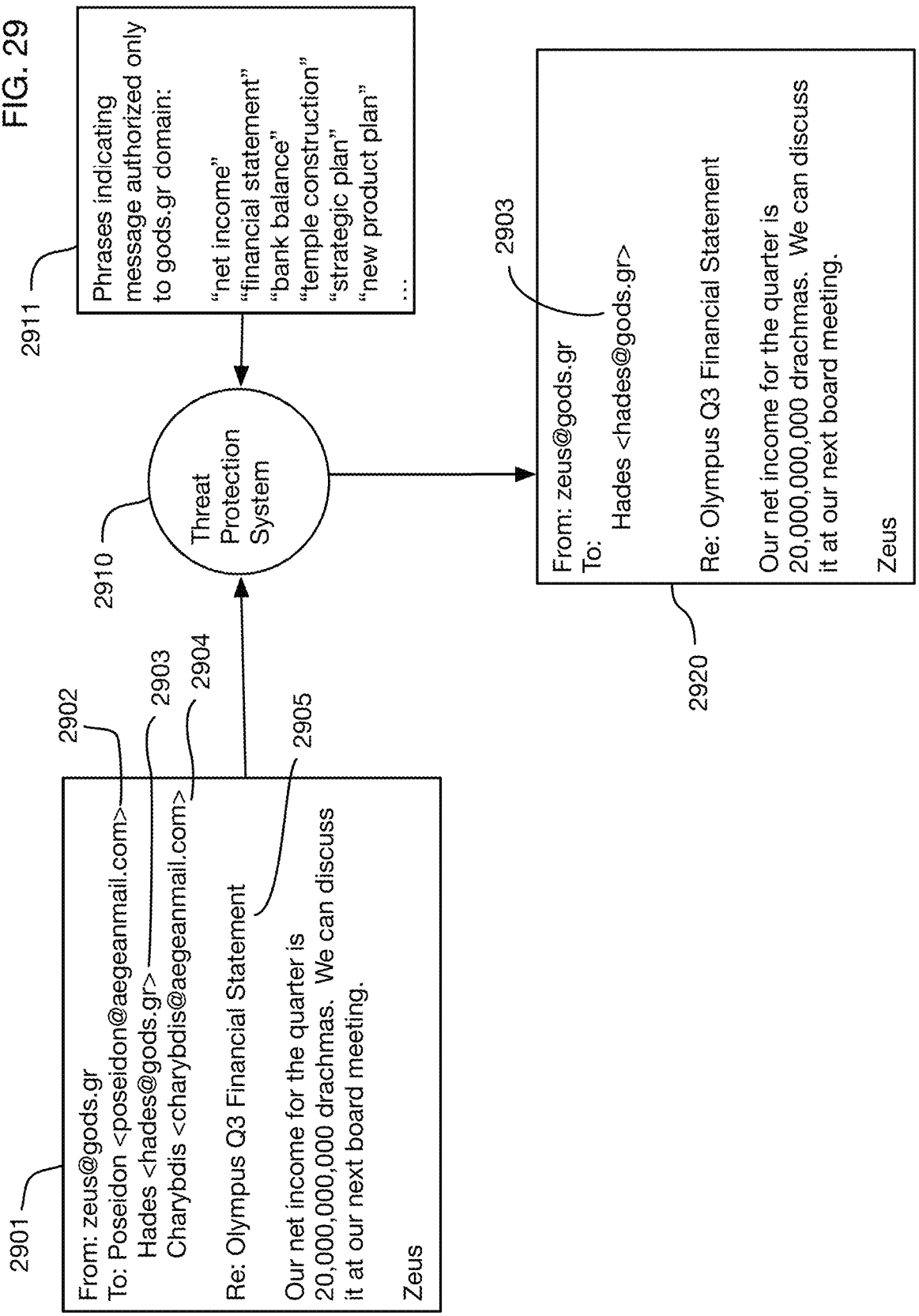

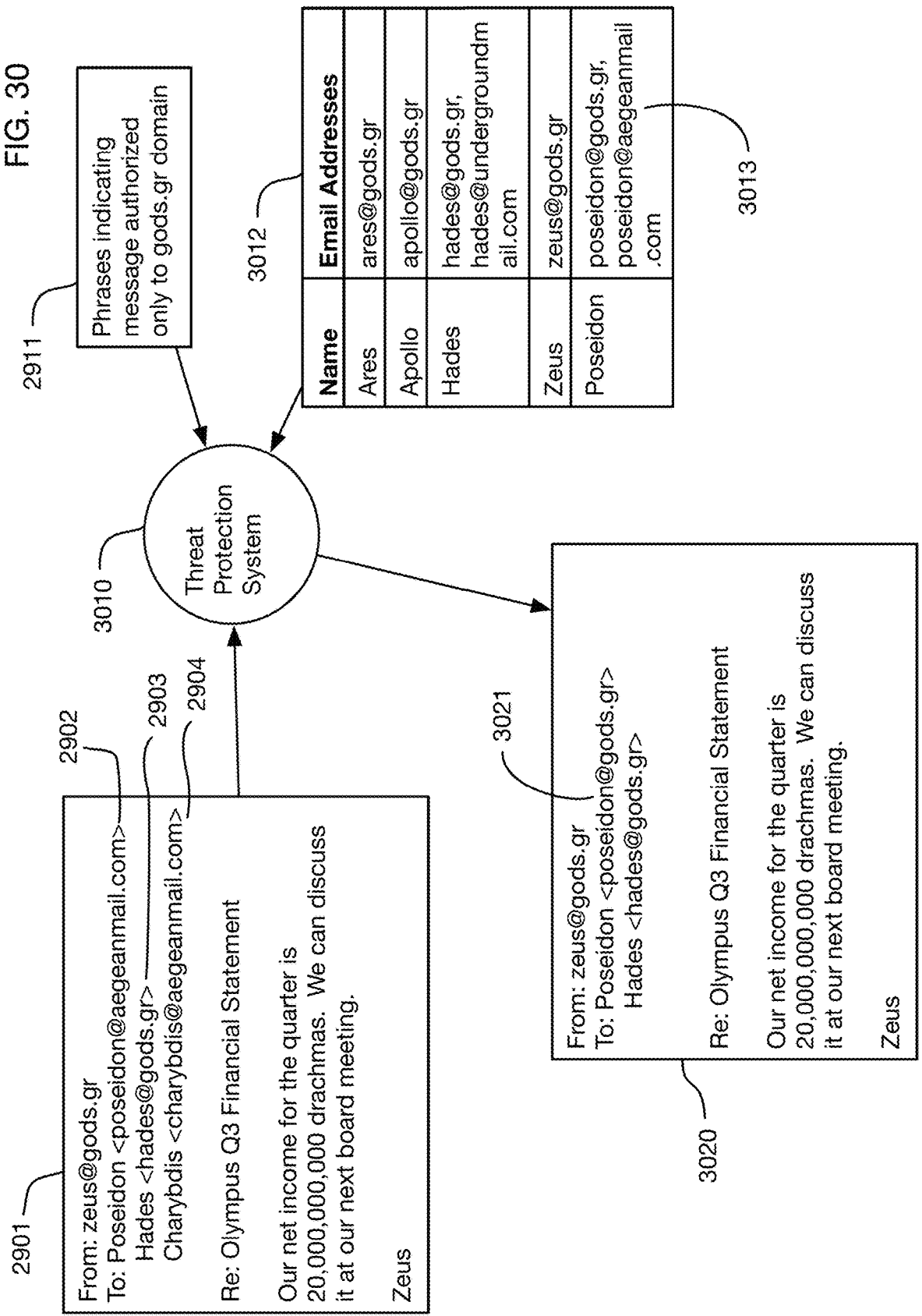

SYSTEMS AND METHODS FOR MEDIATING ACCESS TO RESOURCES

CROSS-REFERENCE TO RELATED APPLICATIONS

This application is a continuation-in-part of U.S. Utility patent application Ser. No. 15/449,569, filed Mar. 3, 2017 (U.S. Pat. No. 10,728,239), which is a continuation-in-part of U.S. Utility patent application Ser. No. 15/010,023, filed Jan. 29, 2016 (now U.S. Pat. No. 9,654,492), which is a continuation-in-part of U.S. Utility patent application Ser. No. 14/855,200, filed Sep. 15, 2015 (now U.S. Pat. No. 9,467,435). The specification of each of the foregoing applications is hereby incorporated herein by reference.

FIELD

The present disclosure relates generally to the field of data processing and electronic messaging systems, and, more particularly, to systems and methods for mediating a user's access to a resource to thereby prevent potential security breaches, including phishing and impersonation, malware, and security issues, particularly with respect to websites and electronic communications.

BACKGROUND

The Internet is the global system of interconnected computer networks, consisting of private, public, academic, business, and government networks of local to global scope, linked by a broad array of electronic, wireless, and optical networking technologies. The Internet carries a vast range of information resources and services, and is a critical part of the communications infrastructure of the world. However, the Internet also represents an insecure channel for exchanging information leading to a high risk of intrusion or fraud. As such, it is important for individual users and enterprises to utilize some form of Internet security in order to decrease the risk of data breaches as a result of such threats.

Existing systems that enable communication of electronic messages include email, instant message, text message, calendar, and audio and video messaging systems. Electronic messages may contain security threats such as attachments with viruses, or phishing attacks with links to web sites that attempt to steal sensitive information or malware. Message recipients are often unable or unwilling to protect themselves sufficiently from these threats. Therefore, electronic message security systems have emerged in the art to provide a degree of protection against some threats embedded in messages. For example, systems that automatically scaFIGn message attachments for viruses are known in the art.

Malicious actors on the Internet often try to fool users into thinking that they are interacting with known, trusted entities. When a malicious actor garners some amount of trust from the user, such trust may be exploited to the detriment of the user. For example, one common threat is a phishing attack, which is a criminal fraud procedure that attempts to obtain personal sensitive information, such as login credentials (i.e., usernames, passwords, PINs, etc.), personal details (i.e., name, address, phone number(s), email address(es), etc.) and payment information (i.e., credit card details, electronic payment information, bank account numbers, etc.) by using electronic communications to disguise as legitimate and trustworthy content.

A phishing attack may commonly involve a fake website or application (i.e., a website or software application constructed to resemble a legitimate and trustworthy website or application) or a communication linking to a fake website or application (e.g., an email, text message, or the like) in an attempt to obtain the trust of a user and prompt the user to enter personal sensitive information. Domain name or certificate impersonation or masquerading is a technique in which a domain name of a trusted entity, which would normally direct to a legitimate and trusted Web page or content, has been altered in such a manner that an internet user can be fooled into believing that the altered domain name is associated with the trusted entity. However, clicking the altered domain name may instead cause downloading of software (or allow other forms of entry) that is of malicious intent, such as phishing, online viruses, Trojan horses, worms, and the like.

For example, a domain name may be altered by one or more characters, but may still visually appear to be associated with the trusted party, thereby tricking an internet user into believing that it is authentic. A user is more likely to click on an altered link if said user believes that the link is associated with a trusted party. For example, the domain name "www.citibank.com" may be altered by one or more characters to form a masquerading domain name, such as "www.cit1bank.com", and may invite trust from a customer of the trusted party (i.e., Citibank), despite the change of the "i" to a "1" in the domain name. Similarly, email falsely purporting to be from Mimecast (the trusted company) will be more believable with a return address of "@mrncast. com", than with a generic "@yahoo.com". Additionally, a masquerading domain name may use the correct characters or word of the trusted domain name, but may include characters or words in a different order or context, such as, for example, "mimecast.nl", which at one time was not registered or associated with the trusted entity Mimecast. The detection of such subtleties in domain names can be especially difficult, thereby presenting a challenge for current security systems.

Attackers may further design a website, application, or communication to have a strikingly similar appearance as a trusted and legitimate website. For example, malicious characters usually construct a fake website utilizing the resources of a legitimate website to carry out their attacks. In particular, the web page resources of a fake website (e.g., styles, images, and links) will be acquired from the trusted and legitimate website, such that the user interface appearance of the fake website is highly similar to the legitimate website, which will likely deceive a user. The attacker will design the fake web site in such a manner so as to direct the user to input and submit personal sensitive information, thereby allowing the phishing attack to occur.

In addition to websites, attackers also rely on electronic messages, including email, instant messaging, text messaging, as well as calendar, audio, and video messaging systems, for phishing attacks. For example, such electronic messages may contain security threats such as attachments with viruses, or phishing attacks with links to web sites or malware that attempt to steal sensitive and/or confidential information or malware (e.g., sensitive information that is personal to an individual and is intended to remain confidential and private and/or, in the instance of an entity, such as a business or the like, sensitive information that the entity wished to remain confidential and private).

Threats in web page links, such as phishing attacks, present a complex challenge. Blocking all links may be impractical. Checking a link prior to sending a message to a recipient provides incomplete protection, since it is possible for a site to become malicious or to be recognized as malicious after the initial check. For improved security there is a need for a system that checks links, and other resources or resource references embedded in electronic messages, at the time the message recipient accesses them. However, this solution presents an additional challenge since message recipients can easily copy and share protected resource references that incorporate security checks. The security checking resources and benefits are therefore made available to anyone. Moreover, security checking resources are consumed on each access to a protected reference; widespread distribution of copies of these protected references can therefore overwhelm security checking system resources such as processor capacity, memory, or network bandwidth. Social media sites and social messaging systems compound this problem because links or other references may be shared instantly with many thousands of users. Ideally the protection offered by a security system should be available only to authorized users of the system.

Existing threat protection systems generally analyze electronic messages using rules or threat signatures configured by administrators or obtained from security firms. For example, administrators may configure lists of websites known to be legitimate or otherwise acceptable (which sometimes have been referred to as "whitelists"), and lists of websites known to be malicious or otherwise unacceptable (which sometimes have been referred to as "blacklists"). This approach is time-consuming and resource intensive. Moreover, rules and signatures are frequently out-of-date, providing inadequate threat protection. There are no known systems that create threat rules and signatures dynamically based on the messages previously received or the contacts added to a messaging system database.

For at least the limitations described above, there is a need for a threat detection and warning system that protects against potential threats or malware in websites, electronic communications, and software applications based, at least in part, on stored data, such as contacts and message archives of a messaging system database.

SUMMARY

The present invention is directed to systems and methods for assisting a user in maintaining data security, specifically systems and methods for mediating a user's access to certain content (also referred to herein as resources) to thereby prevent potential security breaches, including phishing and impersonation, malware, and other types of security issues, particularly with respect to websites and electronic communications.

The content may include, but is not limited to, a website, email, instant message, text message, a voice mail, a social media message, a syndication feed such as RSS and ATOM, as well as telecommunications, such as a phone call. Such forms of content (i.e., web pages, emails, text messages, documents, etc.) may include clickable objects, such as a hyperlink, icon, attachment, or other representation of an information resource and/or fields that prompt a user to enter information. Computer users are often faced with the opportunity to select a link or icon or interact with input texts with the thought that interaction with such content (i.e., clicking on links or icons or entering certain information) will lead to some intended event to occur, such as redirecting a user to a safe web page or downloading of a safe file (i.e., web pages or files that do not pose security threats). However, in some instances, the content may have been designed to fool the user into thinking that this content is trusted and safe, but in reality, such content actually could cause serious harm once selected, as such content may cause phishing and impersonation, malware, and/or domain name security issues.

In particular, one or more embodiments of the invention provide a malware detection system utilizing stored data that, for example, includes prior website lists or browsing history, contact lists, and message archives of a messaging system database to determine whether a message presents a potential threat, such as for example a phishing attack.

A resource or a reference to the resource can be rewritten by a pre-delivery threat analysis and intervention system in order to protect a user from a threat posed by the resource. But a resource can change from the time it is rewritten and delivered to the user as a protected resource, referred to as the "delivery time", and the time the user accesses the resource, referred to as the "display time". For example, at delivery time, a resource may not be suspected of being a threat based on current information known about the resource (there may even be no information about the resource), but the resource may be "hijacked" between deliver time and display time. Thus, as time goes on and more is known about the resource, further analysis might determine that the resource has become a threat such that, at display time, the resource is a known threat based on updated information. Accordingly, a technique for mediating a user's access to a resource based on updated information or analysis is provided.

The technique includes querying for updated information about the resource, for example, in response to the user accessing the protected resource or at another appropriate time which need not be based on a deliberate user action (e.g., performing an updated analysis periodically), and mediating the user's access to the protected resource based on the updated information. One example of the technique mediates the user's access by creating and returning an intermediary page that provides a warning to the user prior to connecting the user to the protected resource. The warnings can say which user action is allowed or banned with respect to the protected resource and or that the protected resource is suspicious based on the updated information.

The technique can include looking up a list of known resources in which each resource is associated with an allowed user action and/or banned user action. The user's access to the resource is then mediated based the whether the resources is found in the list and which user actions are allowed or banned. The updated information about the protected resource can be looked up using a wildcard or subdomain matching.

The technique can also include comparing a suspicion score associated with the protected resource to a threshold value. The user's access to the protected resource is then mediated based on the comparison. In a convenient example, the suspicion score can be determined by graphically comparing a screen image of the protected resource to screen images of trusted resources.

Many online services require a password, making stolen passwords a very big concern for everyone, and also making a very lucrative business for scam artists and criminals. One deceptive approach is to trick a user into thinking they are dealing with a legitimate entity and ask the user to give them their password and other personal information (e.g., answers to security questions). Another way takes advantage of a user having poor password hygiene like reusing their passwords. It's much less taxing to a user's overburdened memory to use the same password for anything and everything from their online banking accounts to music streaming and credit card accounts, to their social media accounts.

Accordingly, when the protected resource is a form asking the user to provide a password, the technique can determine whether the password entered by the user is allowed or banned. If the entered password is banned, then the user is blocked from submitting the password. The technique can also include determining whether the entered password is associated with a known resource, and then based on that determination identify the entered password as a banned password.

The technique and its examples can also mitigate damage caused by a "zero day attack". In many cases, at the time of the attack, the zero day attack is not even recognized as an attack at all. The technique creates and returns an intermediary page for a user notifying them to use caution when it is not known whether a resource the user seeks to access is safe or not. Advantageously, when more information in known about an attack, the technique can provide an intermediary page to a user with updated information or even block the user from accessing an unsafe resource.

BRIEF DESCRIPTION OF THE DRAWINGS

Features and advantages of the claimed subject matter will be apparent from the following detailed description of embodiments consistent therewith, which description should be considered with reference to the accompanying drawings.

FIG. 12A illustrates a variation of the embodiment of FIG. 12 that limits the maximum number of users that may access a resource.

FIG. 17B illustrates an embodiment that detects a potential threat if a message sender appears to match a distribution list, which typically can only receive messages rather than send them.

FIG. 19 shows a variation of the example of FIG. 18, where similarity of a sender to a known contact may include having the same email display name but a different email address.

FIG. 20 shows a variation of the example of FIG. 19 that compares the sender of a message to previous senders in the Message Archive.

FIG. 26 illustrates an embodiment that checks the domain registration information for a website to assess whether the site presents a potential threat.

FIG. 26A illustrates an embodiment that checks history of traffic levels to a website to assess whether the site presents a potential threat.

FIG. 27 illustrates an embodiment that transforms a message to encode and hide potentially sensitive information.

FIG. 28 illustrates a variation of the embodiment of FIG. 27, where a message sender may explicitly tag sensitive information that should be encoded by the system.

FIG. 29 illustrates an embodiment that transforms a message containing confidential or sensitive information by deleting receivers whose email addresses are not in a domain authorized to receive the information.

FIG. 30 extends the example of FIG. 29 with an embodiment that substitutes an email address in an authorized domain for an email address of the same user in an unauthorized domain, when the user has an email address in an authorized domain.

DETAILED DESCRIPTION

By way of overview, the present invention is directed to systems and methods for assisting a user in maintaining data security, specifically systems and methods for mediating a user's access to certain resources and thereby prevent potential security breaches, including phishing and impersonation, malware, and security issues, particularly with respect to websites, electronic communications, and software applications.

In particular, one or more embodiments of the invention provide a malware detection system utilizing stored data that, for example, includes prior website lists or browsing history, contact lists, and message archives of a messaging system database to determine whether a message presents a potential threat, such as for example a phishing attack.

In one or more embodiments, the invention provides a malware detection system utilizing stored data that, for example, includes prior website lists or browsing history, contact lists, and message archives of a messaging system database to determine whether a message presents a potential threat, such as a phishing attack, thereby enabling threat protection with respect to web sites, electronic communications, and software applications.

In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
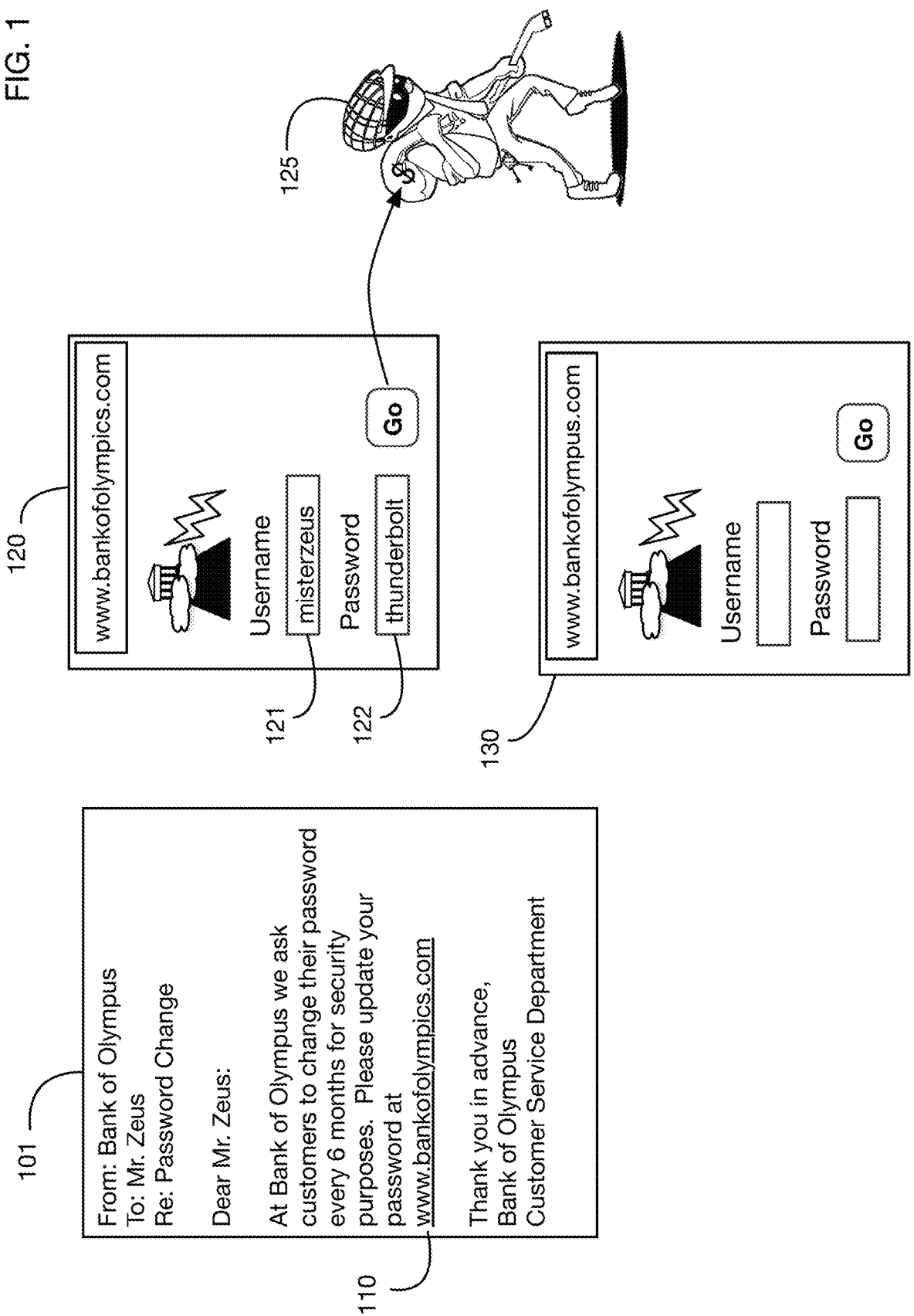
FIG. 1 illustrates an example of a problem addressed by one or more embodiments of the invention: an email contains a link that appears to refer to a legitimate web page, but is in fact a phishing attack designed to steal a user's credentials.

FIG. 1 illustrates an example of a problem that one or more embodiments of the invention address. This problem is that electronic messages may contain resources or references to resources that contain threats. Resources may present many different kinds of threats, such as for example viruses, worms, Trojan horses, or malware. FIG. 1 illustrates a particular example of a phishing attack threat embedded in a link reference to a web page. Electronic message 101, an email message, contains a link 110, and it asks the receiver to click on the link. As is typical of spear-phishing attacks, the message 101 is addressed to a specific receiver and it includes enough plausible information to make the receiver believe that the message is legitimate. The link 110 actually points to a malicious web site 120, which is designed to look very similar to the legitimate web site 130 that the recipient believes he is viewing. The URLs of the malicious site 120 and the legitimate site 130 are only subtly different, reinforcing the illusion. If the recipient enters his name 121 and password 122 into the malicious web page, they are sent to a thief 125 who can then use these credentials as desired.

This example illustrates a particular type of threat addressed by one or more embodiments of the invention. One or more embodiments may address any type of threat embedded in any type of electronic message. Threats may be incorporated for example, without limitation, into email messages, instant messages, text messages, personal messages, chat messages, Twitter™ messages, Instagrams™, voicemails, video messages; and postings onto social media sites, blogs, forums, newsgroups, wikis, or databases. Threats may include for example, without limitation, viruses, worms, spam, phishing attacks, spear-phishing attacks, social engineering attacks, denial of service attacks, advertisements, malware, adware, and ransomware. Threats may be embedded into any types of resources included in or referred to in an electronic message, including for example, without limitation, attachments, files, links, media, forms, workflow automation mechanisms, or embedded or linked code in JavaScript or any other language.

Figure 2:
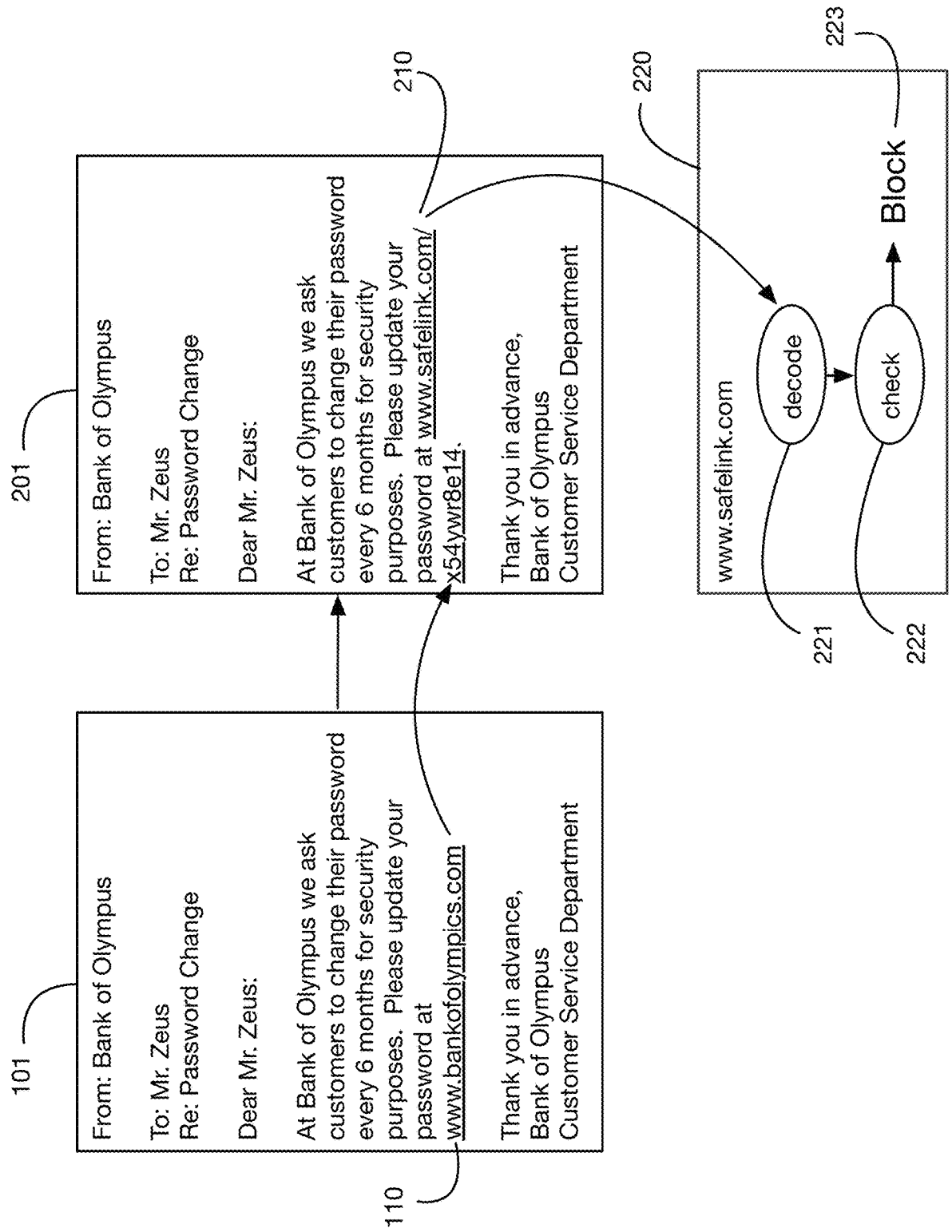
FIG. 2 illustrates a potential solution to the problem shown in FIG. 1 that is used in one or more embodiments of the invention, where a link is rewritten into an encoded form with threat checking added when a user clicks the encoded link.

FIG. 2 illustrates an example of a solution to the problem shown in FIG. 1 that is provided by one or more embodiments. Instead of sending email message 101 with malicious link 110 directly to the recipient, an email security layer transforms the message 101 into message 201, which transforms the link 110 to a protected, encoded link 210. The encoded link 210 does not connect directly to the web page 120. Instead it provides a level of indirection that incorporates a security check before opening the target web page. For example, the encoded link 210 points to a proxy server 220 (with URL "www.safelink.com"), and the encoded link 210 has a path ("x54ywr8e14") that is used internally by the proxy server to identify the original web page referred to by link 110. The proxy server 220 executes a decode step 221 to recover the original link, and it performs a check 222 on the web page before opening it and sending its contents to the user. In this example the check 222 shows that the web page is malicious, so the proxy server blocks access 223 rather than allowing the user to see the malicious web page. One or more embodiments may use any desired methods to encode and decode links or other resource references. Any form of encoding may be used as long is enough information is available in the encoded link or encoded resource reference to recover the original link or reference. For example, one or more embodiments may use an invertible function to convert a link to an encoded form, and apply the inverse function to recover the original link. One or more embodiments may store an original link in a memory or database accessible to the proxy server, and generate a reference to the saved link address as the encoded link. One or more embodiments may for example keep a copy of the original message with the original resource references, and generate an encoded resource reference as a reference to the original message along with for example an offset identifying the location of the original reference in the original message.

Figure 3:
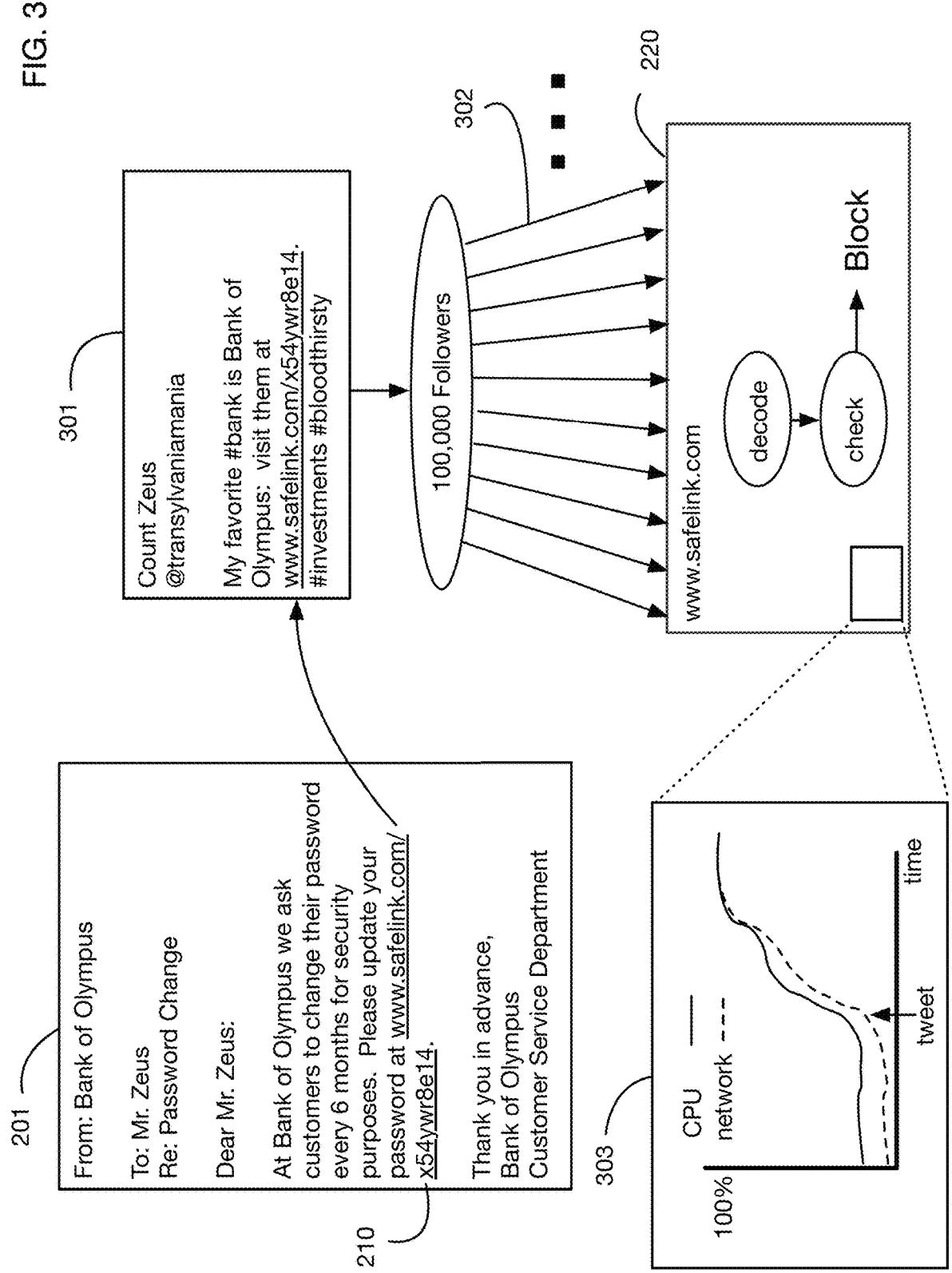
FIG. 3 illustrates a potential problem of the solution shown in FIG. 2, where an encoded link may be shared with a large number of people, many of whom may not have purchased threat protection, potentially overloading the threat protection system resources.

While the solution illustrated in FIG. 2 addresses the original threat of FIG. 1, it may create an additional problem, as illustrated for example in FIG. 3. Users can often copy resource references from electronic messages and redistribute or post them elsewhere. For example, users may copy and paste links, or forward messages to other users. If a resource reference is rewritten in a protected form, as illustrated in FIG. 2, the protected reference will be copied and distributed instead of the original reference. The protection provided by the system will then be available to any user of the copied protected references. This uncontrolled copying may create several problems, including an economic problem that the services provided by the system are available for free to users who did not pay for the services. In addition, FIG. 3 illustrates that widespread copying may create extreme system utilization problems. In FIG. 3, transformed message 201 has a protected link 210. The recipient of the message copies this link and widely distributes it, here in a tweet message 301. In this illustrative example, the user posting tweet 301 has a very large number of followers, each of whom receives a copy of the protected link 210. If many of these users attempt to access the protected link simultaneously, a very large number of requests 302 will be sent to proxy server 220. These requests may cause the resource utilization 303 of the proxy server to spike, potentially to the point that the server becomes unresponsive and unusable.

Uncontrolled copying of protected references may create additional problems. For example, in one or more embodiments protected references such as protected links may include information about the sender or recipient of the electronic message. This information may then be leaked along with the protected reference. Moreover, these leaks may be unintentional since the message recipient may not realize that this sensitive information is embedded in the protected reference. As an example, one or more embodiments of the system may provide an interface that shows personalized messages to a recipient when the recipient clicks on a protected link; these messages may for instance include sensitive information about the recipient or about the recipient's organization that should not be shared with others.

Figure 4:
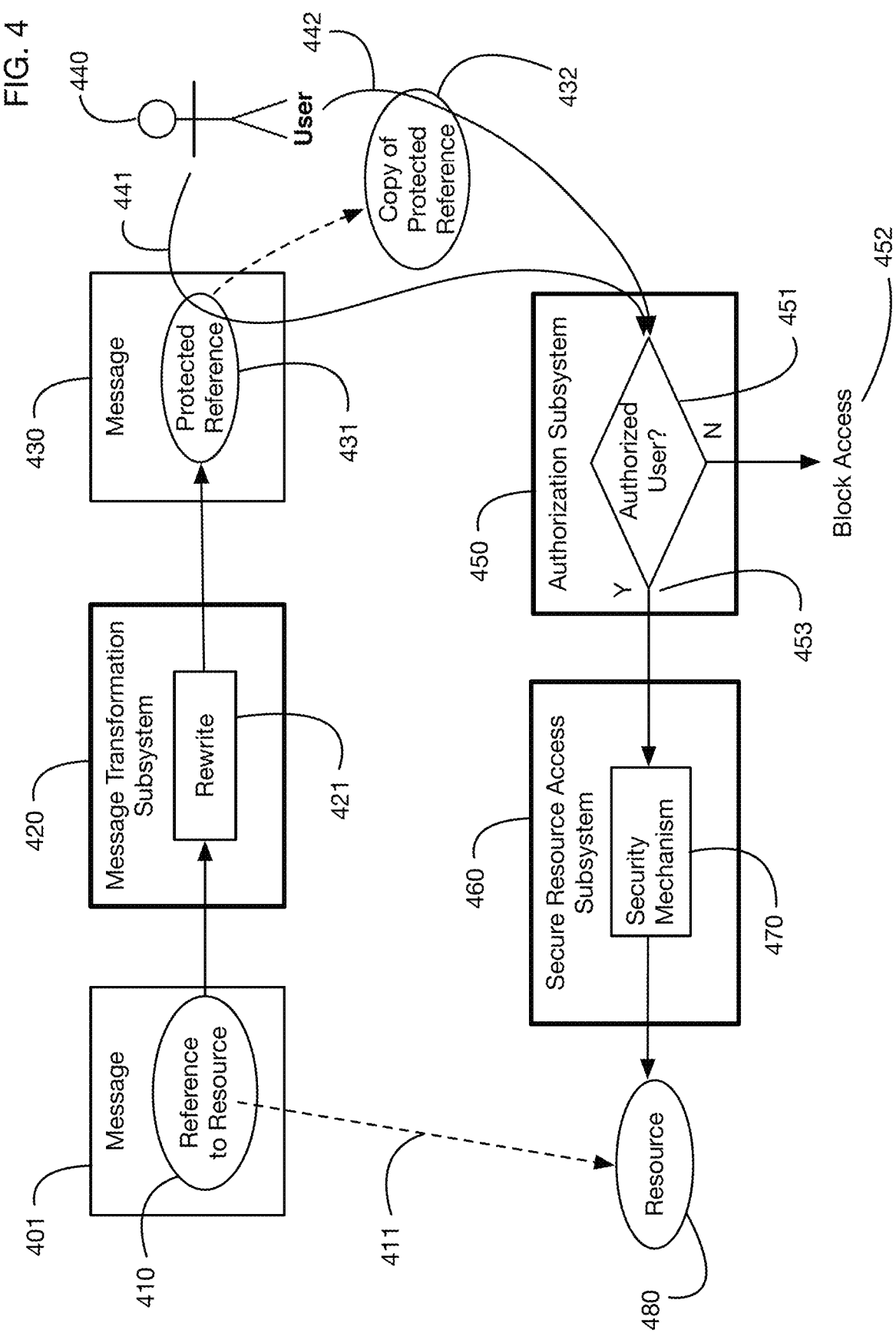
FIG. 4 illustrates an architectural block diagram of an embodiment that addresses issues like those shown in FIG. 3 by providing threat protection only to authorized users.

FIG. 4 illustrates an architectural block diagram of one or more embodiments of the invention that address the types of problems illustrated in FIG. 3. These embodiments add a user authorization check to the system to ensure that only authorized users receive the benefit of the threat protection transformations and checks. The system receives as input an electronic message 401 that contains a reference 410 to a resource. The reference 410 conceptually provides a link or a pointer 411 to a resource 480. In one or more embodiments the resource itself may be included directly in a message, rather than indirectly via a reference; in this case the reference 410 and the resource 480 may be considered identical. This link or pointer may have any form, such as for example, without limitation, a name, a directory name, an attachment, an address, a memory location, a key, an index, a virtual address, a URL, a URI, or a URN. The message may also have one or more senders and one or more recipients, as well as any other content or message parts. As discussed above, one or more embodiments may receive electronic messages of any type, which may include resource references of any type. The single reference 410 in message 401 is for illustration only; one or more embodiments may accept and process messages with any number of resource references. An electronic message with multiple resource references may have resources or references of multiple types; for example, a message may include one or more embedded links and one or more attached files. The system illustrated in FIG. 4 transforms the original message 401 to a transformed message 430 via Message Transformation Subsystem 420. Message Transformation Subsystem 420 includes a resource reference rewriting module 421 that transforms an original reference 410 to a protected reference 431. The transformed message 430 is then delivered to one or more message recipients.

One or more embodiments may execute Message Transformation Subsystem 420 on any computer or set of computers. For example, without limitation, a Message Transformation Subsystem or modules thereof may be embedded in an email client, in an email server, in an email gateway, or in any computer or computers attached to or reachable from any of these. Any system or systems in a communication path between a sender and a recipient may execute all or part of the functions of a Message Transformation Subsystem.

Protected reference 431 in message 430 may be copied in some situations to form a copy of the protected reference 432. While FIG. 4 shows only a single copy, in one or more embodiments any number of copies of a protected reference may be generated. Copies may be generated in many ways; for example, without limitation, a user may copy and paste a reference or a portion of a message, forward a message, forward a reference as a text message or as part of a text message, post a reference on a social media site, enter a reference into a database accessible by other users, post a reference in a wiki or a blog, send a Twitter® message including the reference, encode a reference in a QR code and distribute the QR code, reply to a message, print a message, or take a screenshot of a message. Multiple copies of a message may be sent to a distribution list or mailing list, generating multiple copies of a reference. A user 440 may attempt to access the resource via protected reference 431 or via a copy 432. User 440 may or may not be the recipient of the message 430. Access 441 of the protected reference 431, or access 442 of the copy of the reference 432 each cause the system to execute various authorization and security procedures before providing user 440 with access to the resource 480. In the embodiment illustrated in FIG. 4, the system includes Authorization Subsystem 450 that performs check 451 to determine if user 440 is an authorized user. This check prevents the type of problem illustrated in FIG. 3, where multiple unauthorized users can use copies of protected references to access the resource. If authorization check 451 indicates that the user is not an authorized user, the system blocks access 452. If the user is an authorized user, access is allowed 453, and control passes to the Secure Resource Access Subsystem 460. This subsystem of the embodiment of the system provides access to the resource 480 via a Security Mechanism 470. The specific security and threat protection services provided by the Security Mechanism 470 depend on the type of resource and on the types of threats anticipated and thwarted. For example, without limitation, Security Mechanism 470 may perform malware detection, identity confirmation to prevent phishing attacks, modification of a resource to eliminate potential threats, behavior monitoring to look for suspicious behavior, limiting of permissions, or execution of code in a sandbox environment. One or more embodiments may employ any type of Security Mechanism that allows access to a resource while mitigating one or more threats. One or more embodiments may employ multiple security mechanisms to address multiple types of threats, or to provide additional security.

In one or more embodiments, the Authorization Subsystem 450 and the Secure Resource Access Subsystem 460 may execute on the same computer or same group of computers. In one or more embodiments these subsystems may be separate and they may communicate over one or more network connections. Modules of these subsystems may execute for example on a client computer, such as the computer of a message recipient. They may execute for example as part of an email server that serves email messages to clients. They may execute for example on a server on which the resource is located. They may execute for example on a proxy server that is accessed by an email client, and which then communicates with a server that contains the resource. Any configuration of the functions of these subsystems on any computer or computers accessible to a user or to a resource, or on any path between a user and a resource, is in keeping with the spirit of the invention.

Figure 5:
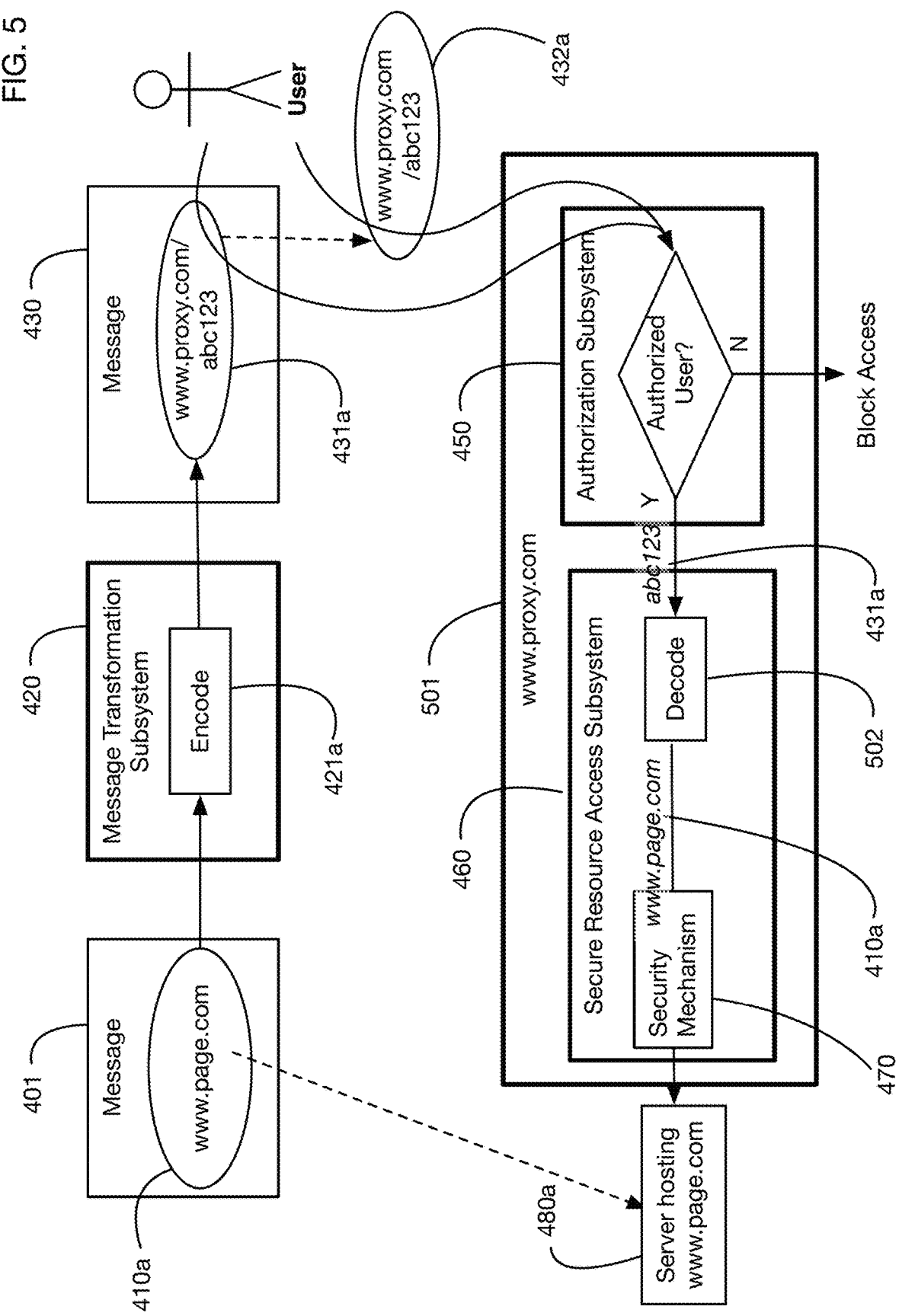
FIG. 5 illustrates an architectural block diagram of an embodiment that provides threat protection against links to malicious web pages embedded in electronic messages.

FIG. 5 illustrates an embodiment of the system that provides protection to authorized users for resource references that include links to web pages. This embodiment follows the general architecture illustrated in FIG. 4, with specific components to handle links. In this embodiment, message 401 contains a link 410*a* to a web page. One or more embodiments may accept messages with any types of links to any types of resource. Links may be for example, without limitation, any uniform resource locator (URL), uniform resource identifier (URI), or uniform resource name (URN) that reference any type of resource, including but not limited to web pages. URIs for example may use any URI scheme, including for example, without limitation, file, http, https, ftp, rtsp, telnet, imap, dns, smtp, mailto, news, or sms. Any method of referring to resources may be used by one or more embodiments. One or more embodiments may accept and rewrite messages with resources included directly in a message, rather than indirectly via a link or reference.

Message Transformation Subsystem 420 includes an Encode module 421*a* that rewrites the link 410*a* into an encoded form 431*a*. In the illustrative embodiment shown in FIG. 5, this encoded link 431*a* provides an indirect and encoded link to the resource through proxy server 501. Access by a user to the encoded link 431*a*, or to a copy thereof 432*a*, accesses the proxy server 501; the proxy server uses the path name ("abc123") after the proxy server's hostname ("www.proxy.com") to determine which resource is referred to. This scheme is illustrative; one or more embodiments may encode links or other resources or resource references in any desired manner. As discussed for FIG. 4, the proxy server first applies a check for authorized users via the Authorization Subsystem 450. If the user is authorized, the encoded link 431*a* is decoded by Decode module 502, yielding the original link 410*a* to the web page.

Any method may be used to encode and decode links. For example, one or more embodiments may use a bijective cryptographic function using a key shared between the Message Transformation Subsystem and the Secure Resource Access System. As another example, in one or more embodiments the Message Transformation Subsystem may generate random encoded links and share a table associating encoded and decoded links with the Secure Resource Access Subsystem.

After user authorization, the Secure Resource Access Subsystem 460 provides access to the web page 480*a* via Secure Mechanism 470 in order to detect potential threats posed by the web page. FIG. 5 illustrates the Authorization Subsystem 450 and the Secure Resource Access Subsystem 460 executing on the same proxy server 501. This is an illustrative configuration; one or more embodiments may distribute these subsystems or modules of these subsystems across servers or other computers in any desired manner.

Figure 6:
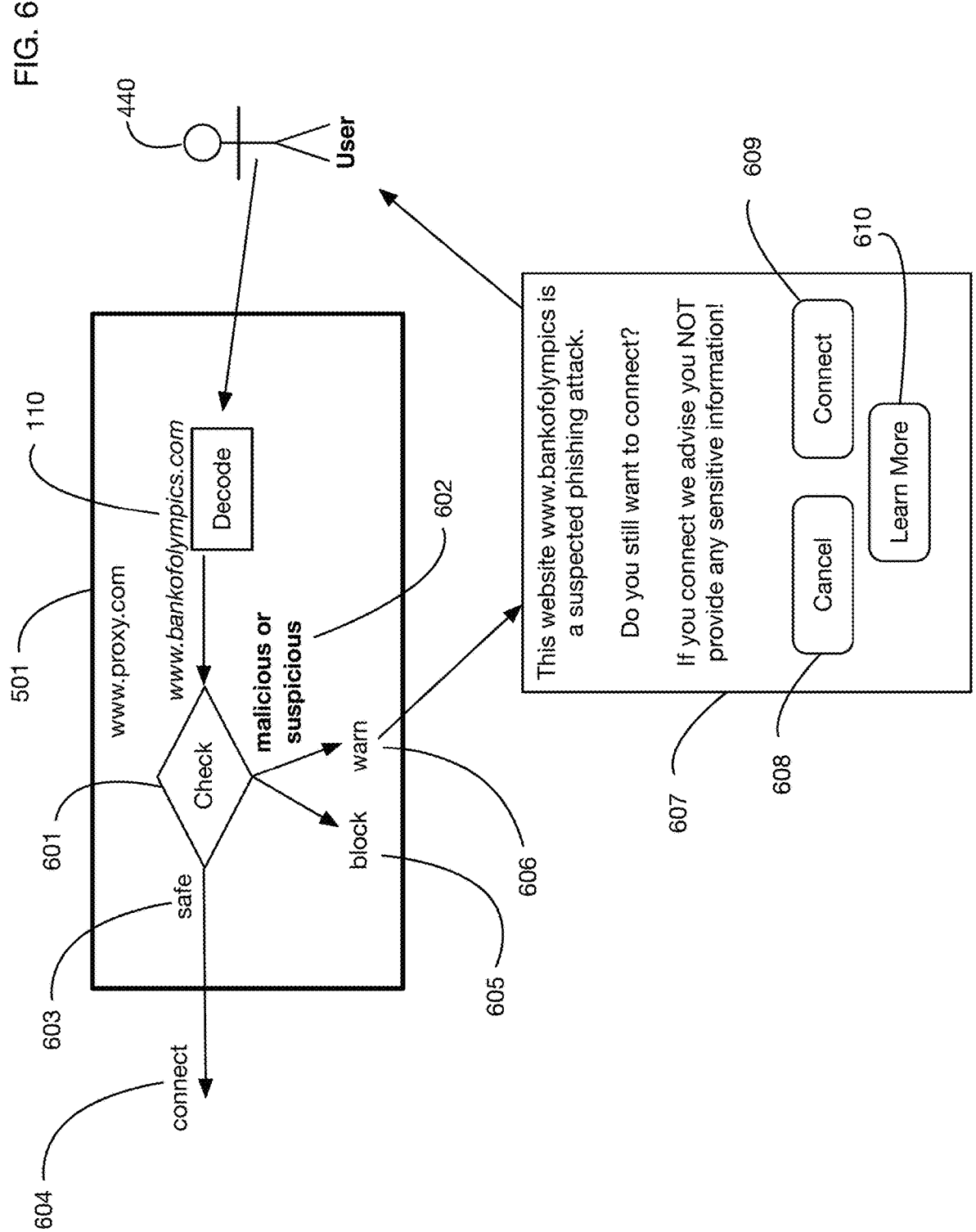
FIG. 6 illustrates possible outcomes of checking a link in an embodiment of the invention, which include connecting, blocking, or warning the user.

One or more embodiments may use various techniques to provide secure access to a link or other resource via a Security Mechanism. FIG. 6 illustrates an embodiment of the system that screens a web page first for possible threats, and then connects if the web page is deemed safe. Proxy server 501 receives a decoded link 110 from the Decode module. It then performs a safety Check 601 on the web page. This check may use any desired method to determine whether the web page presents known or suspected threats of any kind. Below we discuss a check method that uses lists of acceptable and unacceptable resources. Other examples of potential check methods that may be used by one or more embodiments include, without limitation, checking for a valid certificate from a recognized certificate authority, verifying the identity of the sender of a message using for example DomainKeys Identified Mail (DKIM) or Sender Policy Framework (SPF), checking whether the name of a web page or domain is suspiciously similar to that of a known legitimate site, checking the length of time a web page or domain has been registered (under the presumption for example that many phishing sites for instance may be recent or short-lived), checking the IP address associated with a domain for suspicious geographical locations, and using a recommender system to determine a web page's safety reputation.

In the embodiment shown in FIG. 6, Check 601 determines that the link 110 is either safe 603 or malicious or suspicious 602. If the link is deemed safe, the system proceeds to connect 604 to the web page. If the link is deemed malicious or suspicious, one or more embodiments may either block access 605, or warn the user 606. An illustrative warning 607 is presented to the user 440 who requested access to the link. This warning may for example explain to the user why the link is or may be dangerous. It may also provide user education on potential threats and how to avoid them. In this illustrative example the warning presents the user with three options: Cancel 608, which blocks access; Connect 609, which ignores the warning and connects; and Learn More 610, which may present more detailed information about the threat or about threats in general. One or more embodiments may always block 605 rather than warning a user. One or more embodiments may always warn 606 and never block 605. One or more embodiments may block certain links and warn the user about other links. One or more embodiments may automatically recommend or trigger a browser isolation session, e.g., to allow access to the link in a protected environment, to provide restricted access to the resource such as, for example, blocking downloads, blocking inputs, blocking credential inputs, etc., and/or enforcing other types mediated access to the protected resource as discussed herein), either with or without warning the user. In one or more embodiments a user warning may for example ask the user one or more questions about the link or about the message in which the link was included; the system may then determine whether to allow access to the link based on the user's response to the questions (and, again, if access is allowed to the link, then the system may automatically recommend or trigger a browser isolation session so that access to the link would be provided in a protected environment). In this way, whether or not to recommend or trigger a browser isolation session is determined dynamically based on one or more of the risk evaluations as discussed herein.

It should further be noted that, in addition to providing a warning to a user regarding the legitimacy, or lack thereof, of a resource (e.g., link, connector, reference, button, etc.), and/or entirely blocking user access to a resource, systems consistent with the present disclosure are further configured to proactively provide a user with security-related information, as well as training, associated with the content on their computing device prior to, and, in some instances, during user interaction with such content, particularly when the user is browsing a web page, emails, documents, or other forms of content displayed on a user interface of the device.

For example, in the event that content falls within a certain level of risk, but is not blocked (i.e., the user is merely warned of the perceived threat but still able to interact with such content), the system may provide the user with training to further educate the user as to the risk of interacting with such content. The training may include, for example, image-, text-, video-, and/or audio-based information modules provided on the user's computing device providing information such as an overview of best practices, permitted/non-permitted actions, a recommended action, etc., for example, with regard to security-related activities and how best to avoid accidental or unintended disclosure of confidential or sensitive information and the subsequent consequences of such disclosure. Training may be mandated prior to providing user access to the content, e.g., presenting training information to the user and receiving confirmation back from the user before providing user access to the content.

It should be noted, however, that certain content by its nature may not be static. For example, a website may not be static in that content of a webpage associated with a website may change over a period of time, and further change based on user interaction. The system is configured to monitor the webpage and account for webpage changes, thereby allowing the system to perform an analysis on the webpage to account for any changes (i.e., new page loads) and subsequently provide security-related information to a user associated with a webpage and the displayed content every time new content is loaded. For example, fields may be presented in a webpage at a certain time and then may change or become absent at a certain point. Accordingly, the system is able to monitor the changes to a webpage and alert the user of such changes and any associated perceived threats each time to page changes. Training (or further training) may be provided to the user based on such changes, e.g., based on a new or changed actual or perceived threat.

Figure 7:
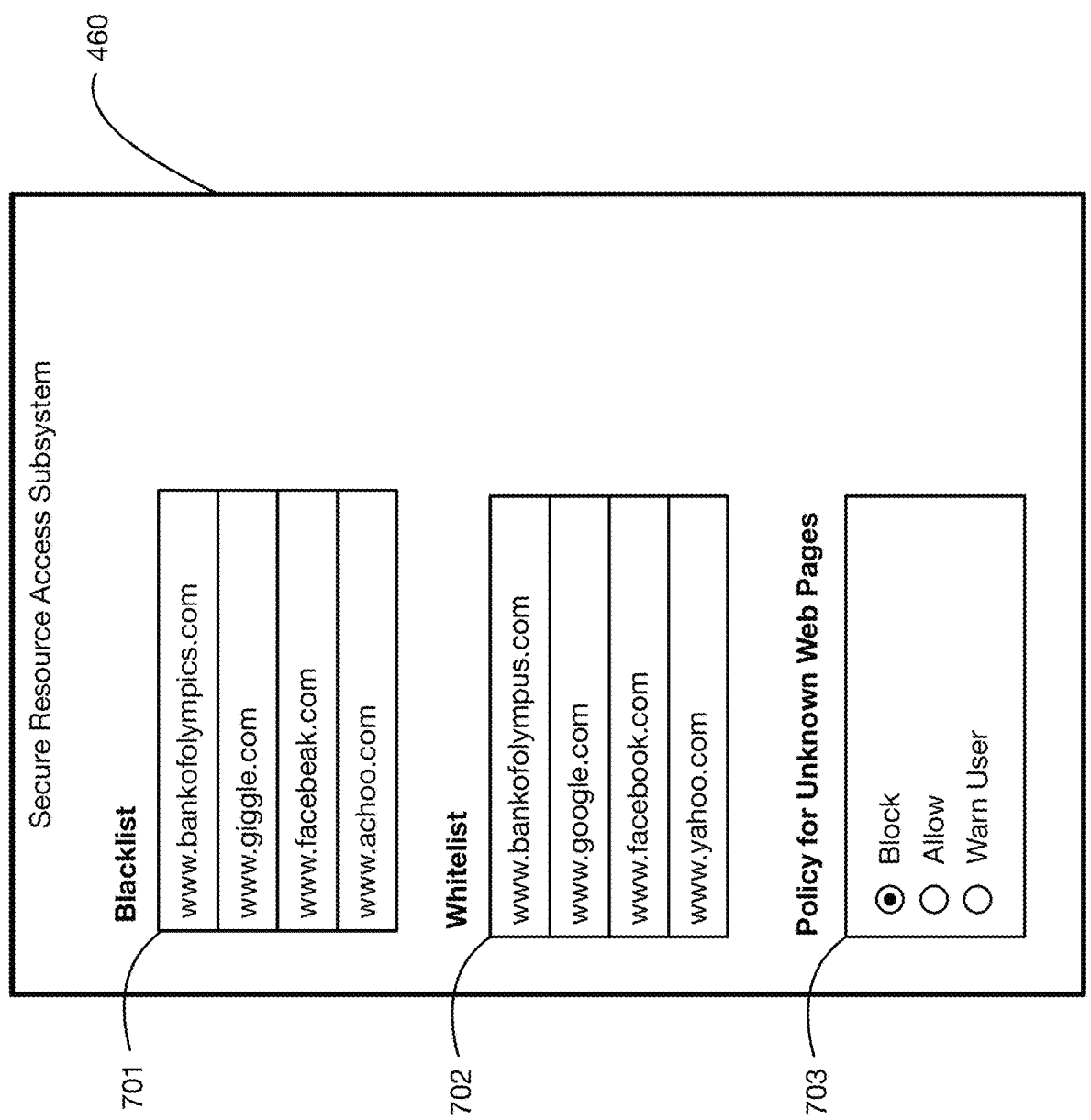
FIG. 7 illustrates an embodiment of a Secure Resource Access Subsystem that has tables listing acceptable and unacceptable resources, and a policy for web pages in neither list.

FIG. 7 illustrates an embodiment of the system that uses a list of unacceptable resources and a list of acceptable resources to determine whether to allow access to a link. The Secure Resource Access Subsystem 460 contains a list of unacceptable resources 701 of domain names that are known or suspected to be malicious, and a list of acceptable resources 702 of domain names that are known or presumed to be safe. An illustrative checking method is to allow access to all links with domains in the acceptable list, and block access to all links with domains in the unacceptable list. One or more embodiments may have only one of an acceptable list or an unacceptable list. One or more embodiments may use any form of identity for a web page instead of or in addition to a domain name. A web page identity may include for example, without limitation, a domain name for the associated web site, complete URLs for the web page, an IP address for the web site, or information associated with or derived from a certificate associated with the web site. The embodiment shown in FIG. 7 also has a Policy for Unknown Web Pages 703 that determines the action for a link that appears in neither the acceptable list 702 or the unacceptable list 701; options shown are to Block these links, to Allow these links, or to Warn User about these links. One or more embodiments may apply other policies or have other configurable policy options for unknown web pages that appear in neither list.

It should further be noted that, in addition to utilizing an unacceptable list and/or an acceptable list of resources (e.g., domain names, Universal Record Locators, Universal Record Identifiers, Internet Protocol addresses, or other connectors) to determine whether a resource (e.g., link, connector, reference, button, etc.) poses a security threat, systems of the present invention may further provide threat detection services (i.e., determine whether content, such as a link, poses a threat) based, at least in part, on the categorization of a given link. In particular, in addition to referring to an unacceptable list and/or an acceptable list, the threat detection systems of the present invention may further identify one or more categories to which content associated with the resource belongs (e.g., via URL categorization or filtering such as through analysis of URL or other connector patterns, which may indicate a likely threat). Depending on a specific policy, which may be set by the enterprise (company, organization, business, etc.), access to certain websites and website categories can better controlled. For example, the systems of the present invention may further take action on certain "bad" categories (e.g., depending on a specific policy) which may, for example, be associated with malicious or dangerous websites, such as websites featuring adult-themed content, violence, gaming, drugs, politics, or job portals. Furthermore, in the event that a link is tied to an unknown category, the threat detection systems of the present invention are further configured to identify the link as suspicious. Accordingly, the Secure Resource Access Subsystem 460 may further include one or more databases containing trusted and untrusted website categories, which are used in the determination of whether a link is legitimate or illegitimate.

One or more embodiments may calculate a suspicion score for a link, and use this suspicion score to determine the action when a user attempts to access the link. For example, links with high suspicion scores may be blocked, those with low suspicion scores may be allowed, and those with intermediate suspicion scores may trigger a user warning. Embodiments may use any desired methodology to calculate a suspicion score. For example, an illustrative suspicion score may be based on how closely the name of a domain from a link matches the domain name of a known legitimate website (while not matching it identically). An example name proximity score is the minimum number of letters that must be added to, deleted from, or modified in one name to obtain another name. An example suspicion score is then for example the inverse of the proximity score (possibly with scaling or offset constants). We take as an illustration the suspicion score: suspicion=10—name proximity. Using the links in FIG. 7 as an illustration, the name proximity score between www.bankofolympics.com and www.bankofolympus.com is 2, since the former can be derived from the latter by replacing "u" with "i" and adding "c". Presuming that www.bankofolympus.com is a known legitimate site, the suspicion score for www.bankofolympics.com is therefore 8. Another illustrative link, www.bankofoliphant.com, has a name proximity score of 6 and a suspicion score of 4; therefore it would be considered less suspicious than www.bankofolympics.com. These calculations and score definitions are illustrative; one or more embodiments may employ any desired methodology to rate or classify links or resources or resource references in order to determine actions when a user attempts to access the link or resource.

In one or more embodiments the suspicion score for an identifier (such as link domain name) may use similarity of a display representation of that identifier to the display representation of another identifier. Comparison of display representations rather than underlying textual representations may protect against homograph attacks using internationalized domain names, for example. Thus, for example, threat analysis can include a graphical comparison comprising either a full comparison or a partial comparison of a screen image of the identifier or other content to a screen image of trusted identifier or other content and using the graphical comparison to determine the suspicion score or take other action.

It should further be noted that a suspicion score or threshold may be based, at least in part, on the specific user. In particular, in addition, or alternatively, to the types of threat analyses and remediations discussed above (e.g., correlating the name of a domain from a link with the domain name of a known legitimate website), suspicion scores or thresholds may be based on characteristics of the specific user. Such characteristics may include, but are not limited to, the user's behavior, such as past user behavior with respect to accessing links, both legitimate links (i.e., safe and trusted links) and illegitimate links (i.e., unsafe and untrusted links), as well as any subsequent security threats or breaches occurring as a result of the user's prior behavior. For example, as previously described, the security mechanism 470 may be configured to monitor user behavior to identify any suspicious behavior (i.e., prior user interaction with legitimate and/or illegitimate links, user browsing history, user uploading or downloading of potentially sensitive data and protected resources, etc.). Accordingly, a user's behavior can be used as an indicator of the level potential risk that such a user poses with respect to the maintaining of the security of protected resources (e.g., if the user has a history of reckless behavior, then a suspicion score or threshold may be higher, and if the user has a history of good behavior, then a suspicion score or threshold may be lower, etc.). Training can be provided based on user-specific concerns.

The characteristics may further include a user's role or title within the particular enterprise (i.e., business entities, companies, organizations, departments, etc.) in which systems of the present invention are implemented. For example, depending on the particular role, a user may have more or less access to certain resources associated with the enterprise (i.e., sensitive data). Accordingly, the greater level of access to certain sensitive data that a given user has (as a result of their role), the greater risk is posed in the event that such a user accesses an illegitimate link. Accordingly, a suspicion score or threshold may be based, at least in part, on a user's role or title. Other user-specific risk indicators, as well as risk determined from behavior of other users, may be used in a similar manner to determine a suspicion score or threshold. Thus, for example, a given event may result in different suspicion scores or different thresholds for different users. Again, training can be provided based on user-specific concerns.

The system also may analyze and mitigate access to unwelcome disclosures that are not necessarily a security threat. For example, a particular user may be barred from accessing certain types of content (e.g., in certain business and legal contexts such as acquisitions, litigations, divorce, jury pools, etc., a particular user may be under instructions not to be "tainted" by accessing certain content, and the system could be configured to detect and mitigate access to such protected content such as by warning the user prior to access and/or blocking access to the content). In essence, such barred content might be considered to be "firewalled" content as opposed to being "untrusted" content, although the same types of mitigation could be applied to such firewalled content as can be applied to untrusted content, e.g., warning, blocking, training, etc. The system could associate a particular user with a list or description of firewalled content (e.g., content that mentions a particular matter or party or relates to a particular subject), analyze content prior to and/or after being sent to the user, and mitigate as needed. Without limitation, some possible examples include a juror on a high-profile trial being blocked from accessing information regarding the trial or parties involved in the trial, a person under a restraining order might be blocked from accessing content relating to the person who took out the restraining order including content relating to the person's family and workplace, or a party to a business or litigation might be prevented from accessing "attorney eyes only" communications that are inadvertently sent to the party. In any case, any receipt of, access to, or attempt to access firewalled content could be reported to an appropriate authority (e.g., a court or police officer).

Figure 8:
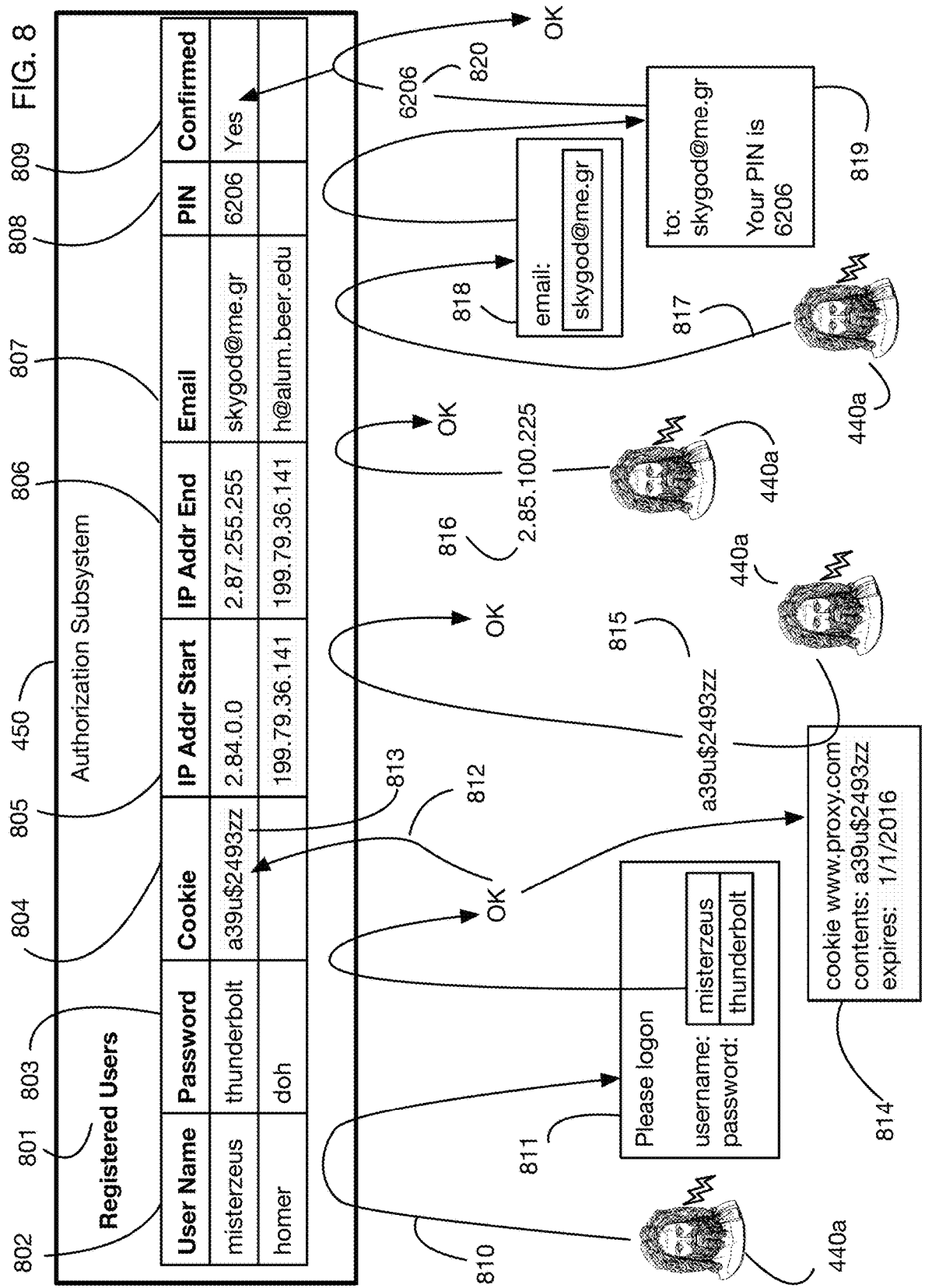
FIG. 8 illustrates an embodiment of an Authorization Subsystem that may obtain one or more types of user credentials to authenticate a user.

Turning now to the Authorization Subsystem, one or more embodiments may determine if a user is an authorized user by requesting credentials from the user and validating these credentials. FIG. 8 illustrates an embodiment in which the Authorization Subsystem 450 includes a table 801 of registered users and their credentials. This table may for example be created by an administrator. One or more embodiments may provide tools for administrators or other users to create or edit user registration entries and credentials, including for example tools to revoke user authorizations. The table 801 may for example be stored in a database or in any other format. One or more embodiments may use any type or types of user credentials. The Registered Users table 801 illustrates some possible credentials that may be used in one or more embodiments. The table has a User Name column 802 and a password column 803. One or more embodiments may use any type of password or PIN and may store these in any unencrypted, encrypted, or hashed form. One or more embodiments may use salted hashing. User 440a attempts access 810 to a protected resource, and the Authorization Subsystem responds with a logon prompt 811 requesting the user name and password; the password is checked against the table 801 and access is permitted. In this illustrative embodiment, after a successful logon credentials are cached in a cookie 814 stored on the user's local computer, and the value 813 of this cookie is added 812 to the table 801 in column 804. A subsequent access attempt by user 440a retrieves and transmits this cookie value 815 to the Authorization Subsystem; the Authorization Subsystem can check the cookie value against the stored value 813 and authorize the user without re-requesting a password. This implementation of stored and cached credentials using a cookie is illustrative; one or more embodiments may use any desired method to cache credentials after an initial validation. One or more embodiments may cache credentials in any memory accessible to a user or to a user's computer.

FIG. 8 illustrates another possible user authorization technique using the user's IP address. The Registered Users table 801 includes an IP address range for each user, stored in columns 805 and 806. When user 440a attempts access, the user's IP address 816 is automatically provided to the system, and the system can check it against the expected IP address range for the user. IP address checks may be particularly useful for example to ensure that employees only access resources from authorized computers with known IP addresses. One or more embodiments may use IP checking as the only or the primary authentication mechanism. One or more embodiments may require additional authentication information in addition to the IP address of the user. One or more embodiments may combine IP address checking with passwords, cookies, or any other scheme for checking user credentials. For example, one or more embodiments may check a user's IP address first, and then use a logon prompt for a password if the initial IP address check fails. One or more embodiments may use any type of user credentials, including for example, without limitation, passwords, PINs, biometric credentials, security certificates, access requests that result in a one-time PIN being sent to a user's registered email or texted to a user's registered mobile device, responses to challenge questions, single sign-on credentials, or security tokens such as USB keys or smart cards. One or more embodiments may use multi-factor authentication combining credentials in any desired manner.

FIG. 8 illustrates another possible user authorization technique that confirms a user's identity by sending a one-time PIN to the user's email address, which may be time limited, for example. User 440a attempts access 817 to a protected resource reference, and the system responds with a registration prompt 818 asking the user to provide his or her email address. This causes a one-time PIN to be sent to that email address in message 819, or sent via SMS or in any other manner. The system may first verify that the email address is a valid email for an authorized user of the system. The PIN is stored in column 808 of the Registered User's table 801. In one or more embodiments the stored PIN may be encrypted or hashed. The user provides the PIN 820 to the system, which then indicates that the authentication and user registration is complete in the Confirmed column 809. In one or more embodiments the PIN-based registration may be valid for a limited period of time, and it may for example need to be repeated with a new PIN after an initial registration and authentication has expired.

Figure 9:
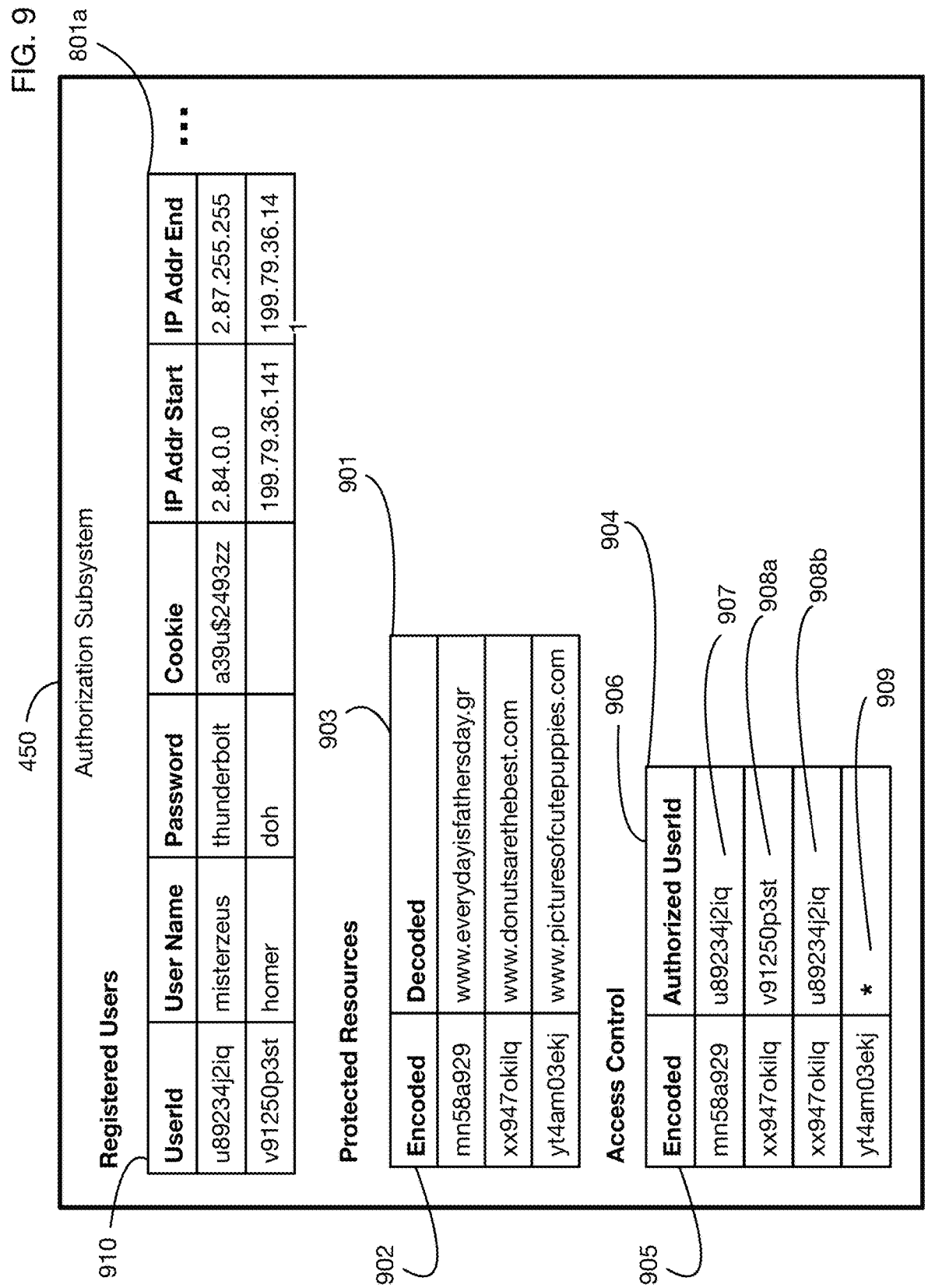
FIG. 9 illustrates an embodiment of an Authorization Subsystem that extends the user credentials illustrated in FIG. 8 to include access control lists for individual resources.

In one or more embodiments of the system, a user may require authorization for a specific resource (in addition to authorization for the system overall) in order to access the resource. FIG. 9 illustrates an embodiment that incorporates resource-specific access control into the Authorization Subsystem 450. In addition to the Registered Users table 801a that contains user credentials, this embodiment includes a Protected Resources table 901 that describes the protected resources, and an Access Control table 904 that indicates which users may access which protected resources. The Registered Users table 801a contains an additional column 910 with a unique ID for the user. The Protected Resources table 901 maps the Encoded links in column 902 into the corresponding Decoded links in column 903. The Access Control table 904 is a one-to-many table mapping the Encoded links in column 905 into the Authorized User Id 906 that may be for example a foreign key to the Registered users table 801a corresponding to column 910. This one-to-many mapping provides fine-grained access control that can grant or deny access of any user to any resource. For example, encoded link mn58a929 appears only in row 907, indicating that it may be accessed only by user u89234j2iq. Encoded link xx947okilq appears in rows 908a and 908b, indicated that users v91250p3st and u89234j2iq can both access the resource. Row 909 shows a "*" for the Authorized User Id associated with encoded link yt4am03ekj; this may indicate for example that all users authorized by the system may access this resource. One or more embodiments may use more complex access control lists that indicate for example specific permissions associated with each user and resource combination. For example, some users may have read-only access to a resource, while other users may have read and write access to a resource. In one or more embodiments an Access Control table may for example define access rules for groups of users in addition to or instead of individual users. In one or more embodiments an Access Control table may contain negative permissions that prevent specified users or groups from accessing specific resources or from performing particular actions. In one or more embodiments, use of the encoded resource reference 902 as the key to the Access Control table may provide an optimization since access authority for a user can be checked prior to decoding a link. In one or more embodiments Access Control tables or other access authorization mechanisms may use the decoded references rather than the encoded references, and decoding may be needed prior to checking authorization.

Figure 10:
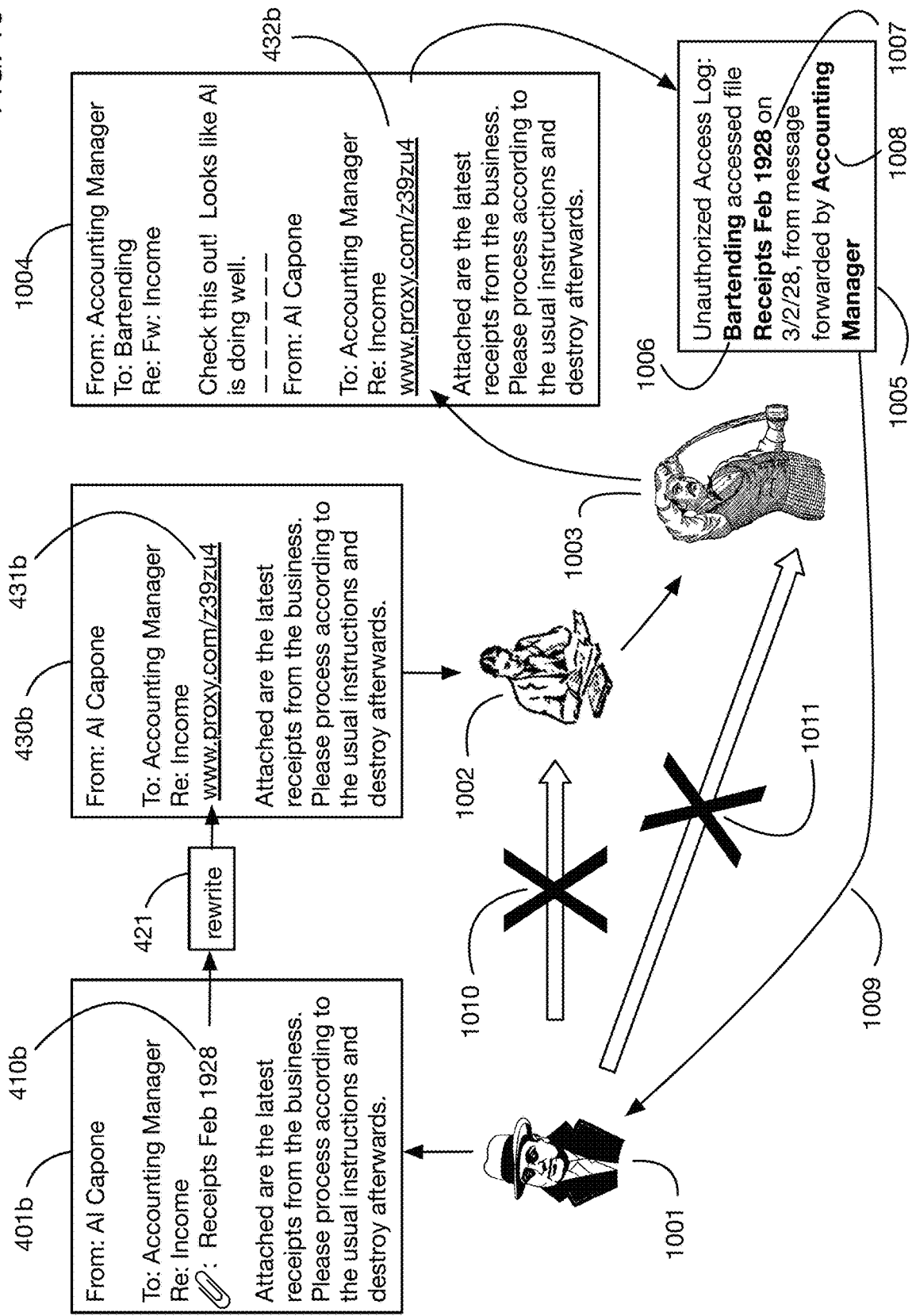
FIG. 10 illustrates an embodiment of the invention that provides access security for an email attachment, by logging unauthorized access attempts.

In one or more embodiments, the resources protected by the system may include message attachments. These attachments may include for example any kind of file or media, or any other item that can be attached to or included with an electronic message. FIG. 10 illustrates an example with message 401b from sender 1001 containing an attached file 410b. The system performs rewrite operation 421 on the attachment 410b and converts it to a protected reference 431b in protected message 430b. The protected message 430b is then delivered to the recipient 1002. Recipient 1002 makes a copy of the protected reference by forwarding the message 430b to another user 1003 as forwarded message 1004 with copy of the protected reference 432b. User 1003 then attempts to access the resource through this copy 432b of the protected reference to the resource. This example presumes that only recipient 1002 and sender 1001 are authorized users for the resource as defined for example in an access control list for the resource. User 1003 is an unauthorized user, and the system therefore blocks access, as described above. FIG. 10 also illustrates an additional feature of one or more embodiments wherein unauthorized access attempts may be logged with detailed information about the access attempt. The system generates Unauthorized Access Log entry 1005, which in this illustrative example describes the user attempting access 1006, the resource the user attempted to access 1007, and the source of the copy 1008. One or more embodiments may include any available information in an unauthorized access log entry, in order for example for senders or administrators to monitor communication paths, identify channels that may leak protected information, and monitor compliance with policies for secure information. In this example the Unauthorized Access Log 1005 is sent on path 1009 to sender 1001, who may then take corrective actions 1010 and 1011. In one or more embodiments access logs and notices of attempted unauthorized access may be sent immediately or periodically for example to senders, recipients, system administrators, security personnel, or any other relevant parties.

Figure 11:
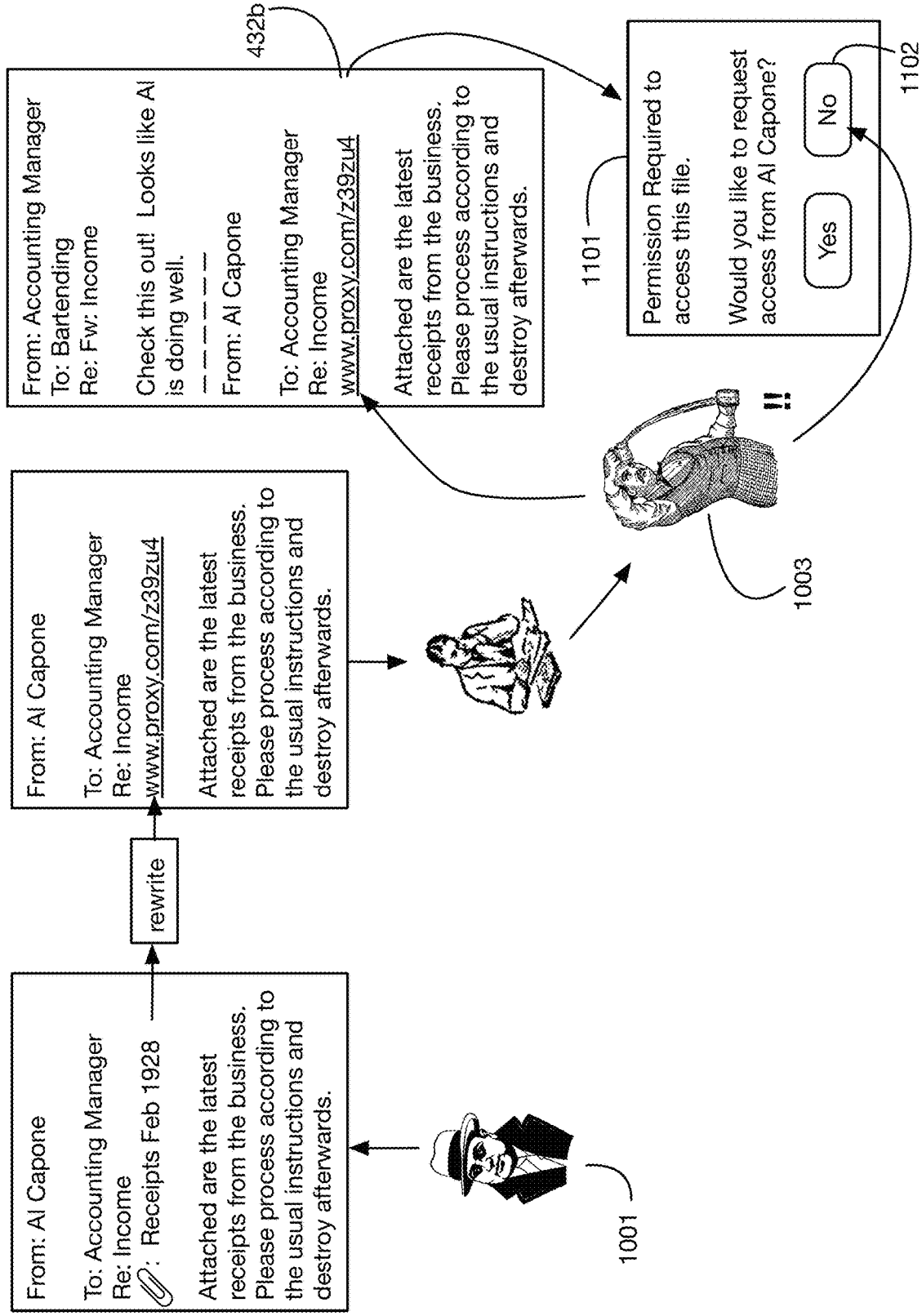
FIG. 11 illustrates a variation of the embodiment of FIG. 10 that asks an unauthorized user attempting to access a resource if he wishes to request permission to access the resource.

FIG. 11 illustrates an embodiment that is a variation of the example shown in FIG. 10. In this example, an attempt by unauthorized user 1003 to view protected resource reference 432b triggers a prompt 1101 to user 1003 informing him that permission is required to access the file, and asking him if he wants to request permission, in this case from the sender 1001. The user 1003 chooses the No option 1102 to indicate that he does not want to request permission. One or more embodiments may apply any desired policy to manage attempts by unauthorized users to access protected resource references. These policies may include for example, without limitation, blocking access, logging the access attempt (as illustrated in FIG. 10), informing the user that the resource is unavailable, asking the user if he or she wants to request permission to access the resource (as illustrated in FIG. 11), providing limited or restricted access, or any combination of these policies.

Figure 12:
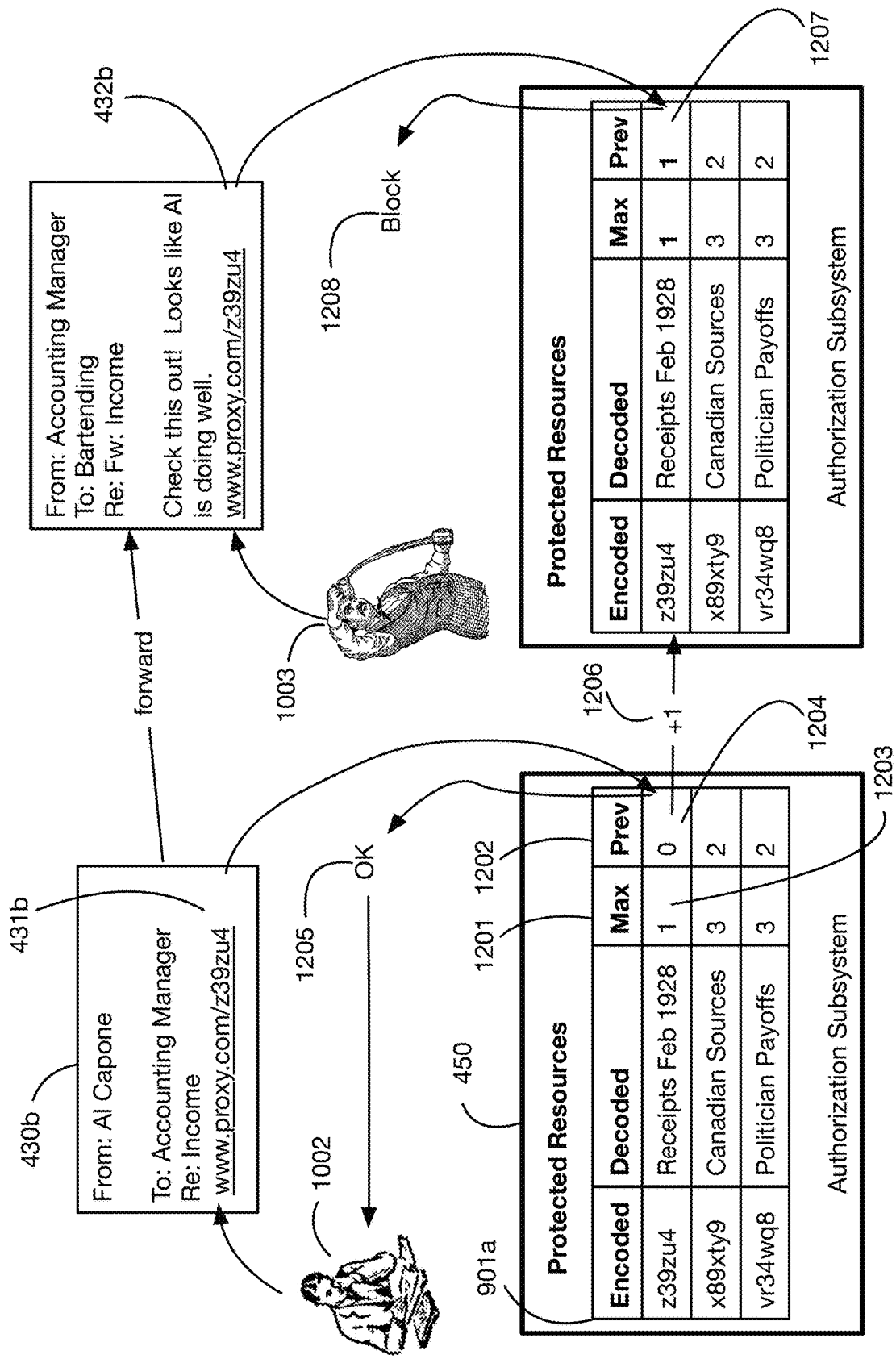
FIG. 12 illustrates an embodiment of an Authorization Subsystem that limits resource access by setting a maximum number of times a resource may be accessed.

One or more embodiments may limit access to protected resources by limiting the number of times a protected resource reference may be used. FIG. 12 illustrates an example of an embodiment that includes a maximum count 1201 for resource reference usage in the Protected Resources table 901a of the Authorization Subsystem 450. The table also tracks the number of previous accesses 1202 for each protected resource reference. In this illustrative example, protected message 430b contains an encoded reference 431b to a resource (here a file attachment), and the maximum number of accesses 1203 allowed for this resource is 1. Thus any attempts after the initial access to view this resource will be blocked. When recipient 1002 receives the message 430b and initially accesses the protected reference 431b, the previous access count 1204 is zero. Because this previous access count 1204 is lower than the maximum count 1203, access is permitted 1205. The Authorization Subsystem increments 1206 the previous access count to 1207 to reflect this access. If recipient 1002 then forwards the message to user 1003, generating copy 432b of the protected reference, an attempt by user 1003 to access 432b will be blocked 1208 since the resource has already been accessed for the maximum number of times. Similarly, one or more embodiments may limit the amount of time that a resource may be accessed. For example, the Authorization Subsystem may have a protected resource reference expiration date, after which no accesses of this protected resource are permitted. One or more embodiments may limit the total duration of access, for example if the time of access can be monitored by the system. One or more embodiments may combine maximum resource access counts or times with other authorization control mechanisms included those described above.

One or more embodiments may limit the number of users that are allowed to access a resource, instead of or in addition to limiting the total number of accesses or the total time available for access. FIG. 12A illustrates an embodiment that uses this technique to determine if users are authorized to access resources. Protected Resources table 901b has column 12A01 for the maximum users count for a resource; this count is the maximum number of distinct users that may access a resource before further access is blocked. Column 12A02 is an accessed-by list for each resource; this column tracks the identities of users who have previously accessed each resource. In this illustrative example arbitrary 3-character user identifiers are used to show user identities; one or more embodiments may use any user identifier to track which users have accessed which resources. User 1002 with illustrative user identifier 12A03 attempts to access protected link 431b in message 430b. This access attempt triggers a check of the Protected Resources table 901b. The accessed-by list 12A04 for this protected resource reference is empty, and the maximum user count 12A05 is 1; thus an additional access is allowed and the system allows access 12A06. This successful access causes the user's identity 12A03 to be added 12A07 to the accessed-by column, resulting in a new accessed-by list 12A08 for this resource. User 1002 then forwards the message to user 1003 with user identifier 12A09. User 1003 attempts to access the copy 432b of the protected resource reference. This triggers another check of the Protected Resources table. Now the number of users in the accessed-by column 12A08 for the resource is 1, which matches the maximum 12A05. Therefore the access attempt is blocked 12A10. However if the initial user 1002 attempts to access the resource again with access attempt 12A11, the authorization check determines that the user's identity 12A03 is already in the accessed-by list 12A08 for the resource, so the subsequent access is permitted 12A12.

Figure 13:
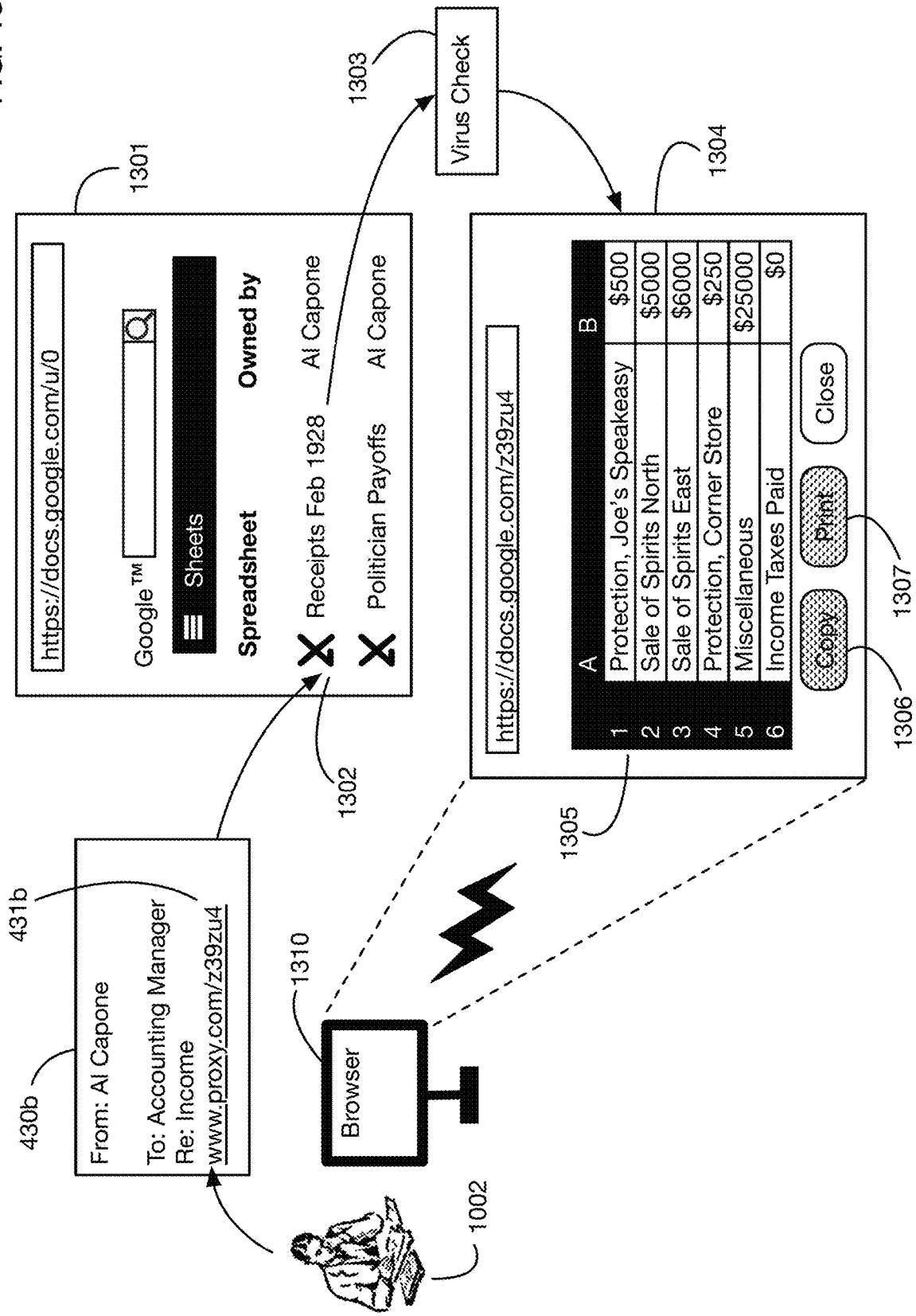
FIG. 13 illustrates an embodiment of the invention that provides secure access to a resource by opening it in a managed cloud application rather than on a user's local computer.

One or more embodiments may provide secure access to resources via a sandbox environment. The sandbox environment may for example allow users to open, view, manipulate, or execute resources in an environment that limits the effect of potential threats, or that limits users' ability to perform selected actions. Sandbox environments may for example include virtual machines, specialized applications, specialized electronic message clients, or managed cloud applications. FIG. 13 illustrates an embodiment that uses a managed cloud application to provide secure access to resources. When user 1002 accesses protected resource reference 431b, which here refers to an email attachment, the system provides access to a copy 1302 of the original attachment that is stored in a cloud-based file system 1301. A copy of the original attachment is never downloaded to the user's computer. The system opens the file using a managed cloud application (here a spreadsheet viewer 1305) that executes on a remote server 1304; the user views the file through his browser 1310. The managed cloud application 1305 and cloud-based file system 1301 provide a sandbox environment that limits the impact of potential threats on the user's computer (and on other systems connected to this computer). For example, a virus check 1303 may be performed automatically when opening the file 1302. Because the cloud-based system is managed, virus checking and other security features may be more complete and more up to date than the security capabilities of the user's local computer. For example, a cloud-based system may have the latest security patches and virus definitions, whereas a user may forget or choose not to install these. In addition, the effect of any threats embedded in the file are limited since the browser environment itself provides a sandbox. Moreover, the cloud application may be configured to limit the user's permissions for the resource. In this example, the Copy button 1306 and Print button 1307 of the managed spreadsheet application 1305 are greyed out, indicating that they are disabled for the user. Disabling these or similar features may for example limit leaks of sensitive information contained in the file. One or more embodiments may use any sandbox environment for access to protected resources, including but not limited to managed cloud environments such for example as Google™ Docs, Microsoft Office™ Online, or Dropbox™. One or more embodiments may configure a sandbox environment to associate any applications with any types of files. One or more embodiments may perform any desired security checking actions, such as for example virus checking, prior to opening a file or accessing a resource in a sandbox environment. One or more embodiments may provide any desired limitations on application features and permissions within a sandbox environment.

Figure 14:
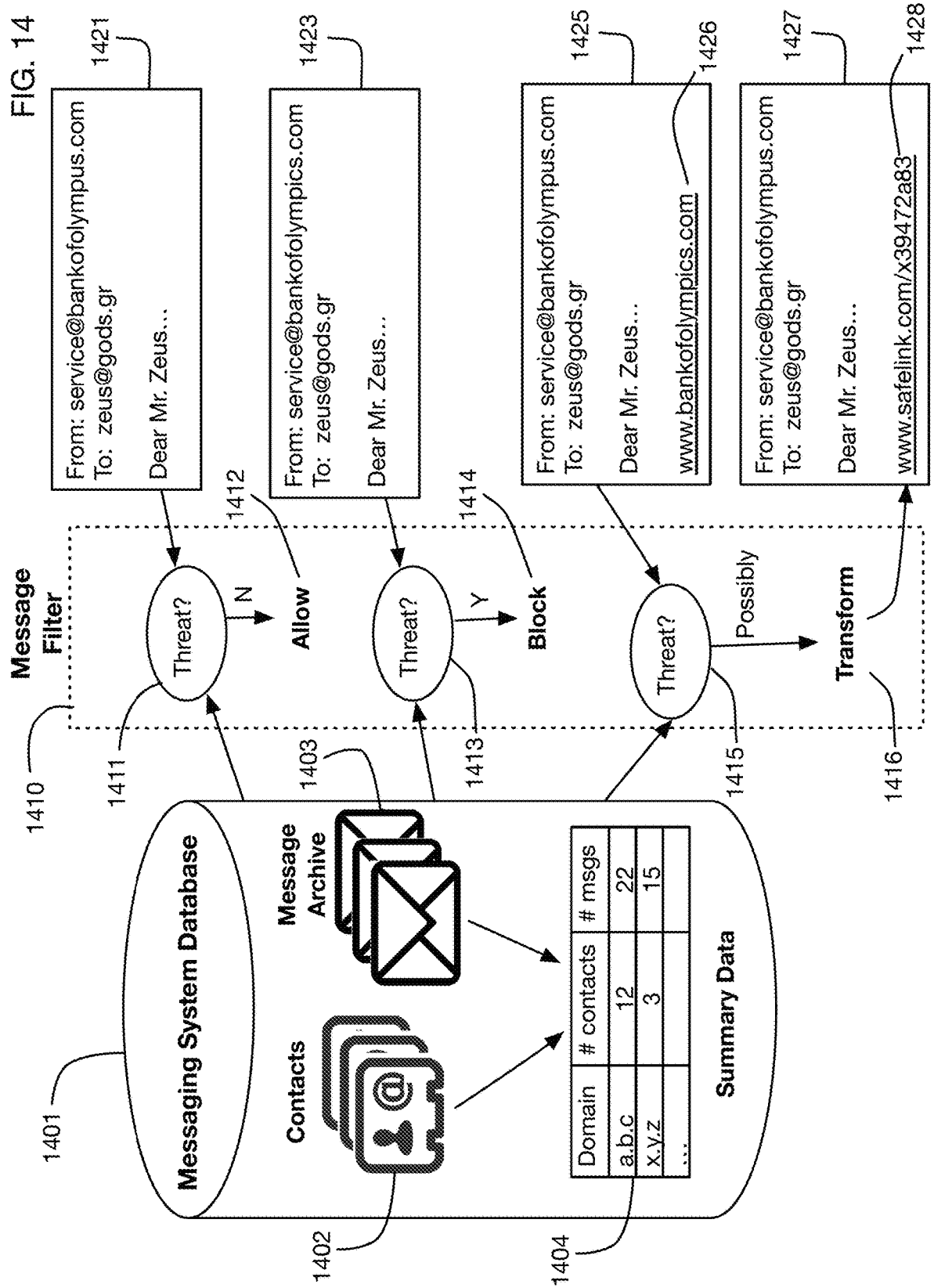
FIG. 14 shows an architectural overview of an embodiment of the invention that uses a messaging system database with Contacts and a Message Archive to determine whether a message presents or contains a potential threat.

One or more embodiments of the invention may use stored data such as a messaging system database to determine whether an electronic message contains or presents a potential threat. Threat detection rules may therefore be dynamically generated or modified based on actual communications and contacts made by a user or by an organization. FIG. 14 shows an architectural overview of an embodiment of a threat detection system that uses data in messaging system database 1401 to determine whether electronic messages contain potential threats. The message system database 1401 may contain any information related to messages, contacts, addresses, communications, connections, social or professional networks, or organizational structures. For example, in the embodiment shown in FIG. 14, database 1401 contains Contacts list 1402, Message Archive 1403, and Summary Data 1404 that for example may be derived from the Contacts list, the Message Archive, or both. Contacts 1402 may contain any information on persons, groups, or organizations; this information may include for example, without limitation, names, addresses, email addresses, identities, certificates, demographic data, social networking names or addresses, aliases, notes, nicknames, phone numbers, physical addresses, roles, titles, affiliations, and personal information such as birthdays or relatives. In one or more embodiments contact list information may be obtained from, augmented with, or validated against directories, registries, or databases that are organization-wide or that span organizations, such as for example Active Directory services. Information from multiple directories may be merged into or copied into a Contacts list, using for example utilities such as ADSync. A Contacts list may be a Global Address List, or it may include all or part of one or more Global Address Lists. A Contacts list may also include information from any public or shared lists of persons, addresses, organizations, or names. Message Archive 1403 may represent any archive of messages sent by, received by, drafted by, viewed by, or otherwise accessed by a user or any set of users. The messages in Message Archive 1403 may be any type of message, such as for example, without limitation, emails, text messages, voice messages, video messages, faxes, tweets, Instagrams, or postings on social network sites. A Message Archive may contain any list or lists of any types of messages over any time period. Messaging System Database 1401 may also contain Summary Data 1404, which may for example consolidate information from the Contacts and the Message Archive. Any type of summary information may be derived and stored. For example, Summary Data 1404 may include counts or sizes of messages sent to or received from each contact in the Contacts list, potentially grouped as well by organization or domain name. It may include the number of contacts associated with each domain name. Summary Data may also include temporal information, such as for example the time that each Contact was last contacted. These examples are illustrative; one or more embodiments may use any type of Summary Data that is derived in any fashion from the Contacts or Message Archive information.

In the embodiment illustrated in FIG. 14, data in the Messaging System Database 1401 is used to analyze electronic messages in order to determine whether the messages contain or may contain a threat. This analysis may check for any kind of threat, including for example, without limitation, phishing attacks, spear-phishing attacks, whaling attacks, malware, viruses, worms, Trojans, spam, adware, spyware, or denial of service attacks. Analysis may use any information in the messages combined with any information in the Messaging System Database to assess whether a message presents a potential threat. One or more embodiments may use any additional information to perform threat analysis, such as for example, without limitation, acceptable lists, unacceptable lists, or signatures of viruses or other malware; this information may be combined with information from the Messaging System Database in any manner.

One or more embodiments may apply a Message Filter 1410 to electronic messages, in order to check for potential threats and to respond to detected or suspected threats. A filter may check any or all of the message parts that comprise a message, such as for example, without limitation, the sender or senders, the receiver or receivers, the headers, the message text, the subject, the message thread, attachments, embedded links, embedded media, the path along which the message was transmitted, and timestamps associated with creating, sending, forward, receiving, and reading the message. The Message Filter may take any desired action when a threat is detected or suspected, such as for example blocking all or part of a message, or adding warnings that alert users to potential threats. FIG. 14 illustrates several illustrative actions taken by the Message Filter 1410. Message 1421 is analyzed 1411 for threats; because the filter does not detect a threat, the message is allowed 1412 with no modifications. Message 1423 is analyzed 1413 for threats; because a threat is detected, the message is blocked 1414. One or more embodiments may block only parts of a message instead of an entire message. Message 1425 is analyzed 1415 for threats; because the embedded link 1426 appears suspicious, the message filter transforms 1416 the message into a modified message 1427. In the modified message 1427, the link 1426 is replaced with an indirect link 1428 that applies additional checking or warnings when the link 1428 is clicked. These examples illustrate some possible actions of the Message Filter 1410: it may pass a message through unchanged; it may block all or part of a message; or it may transform all or part of a message to a modified message that for example incorporates additional checks or warnings.

Figure 15:
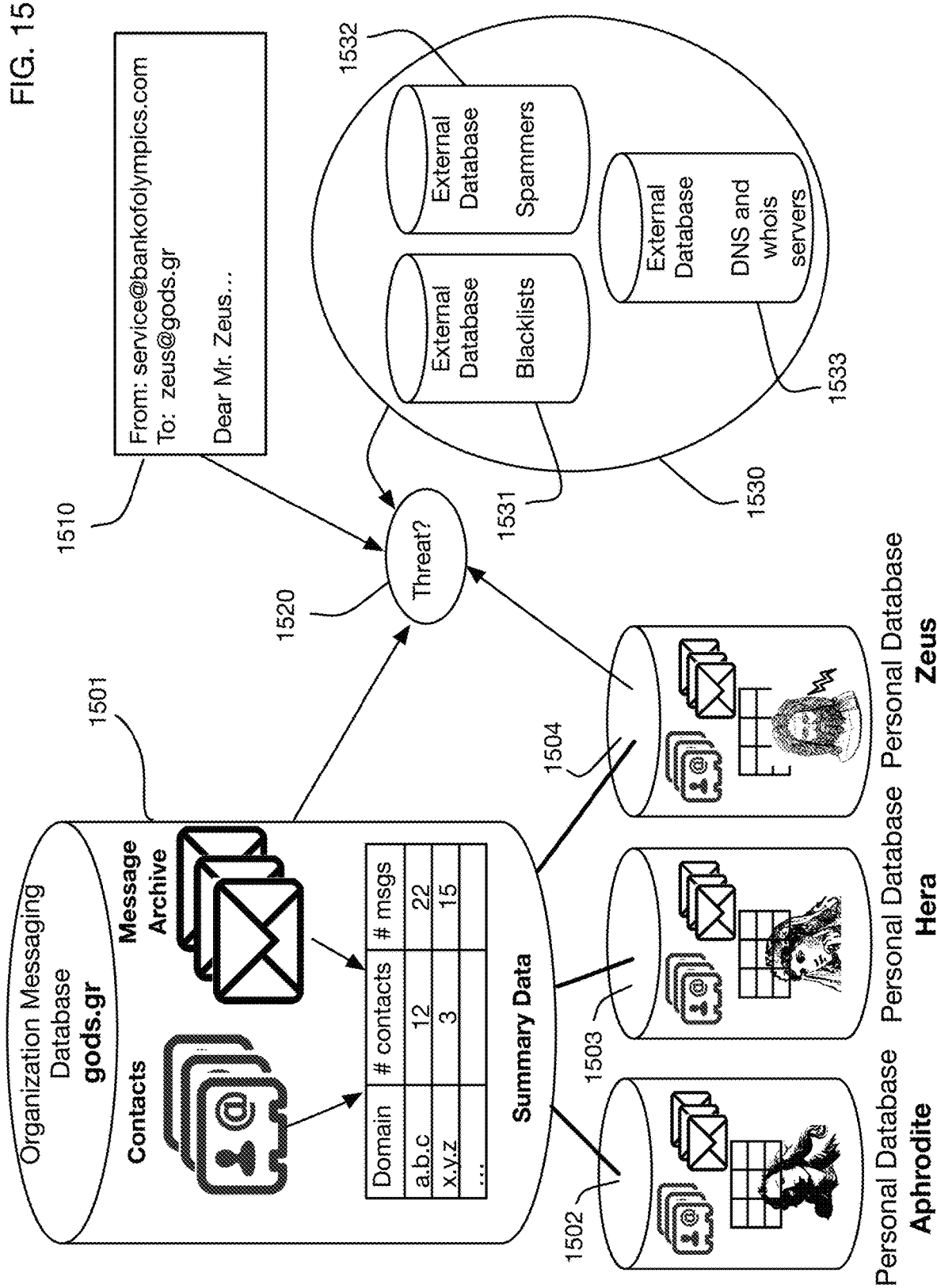
FIG. 15 illustrates an embodiment that performs threat detection using a hierarchical messaging system database that includes an organizational Contacts and Message Archive, as well as personal Contacts and Message Archives for each user within the organization.

A Messaging System Database 1401 may be associated with an individual, with a group, or with an entire organization. Message Filter 1410 may use multiple Messaging System Databases to perform threat checking and transformations. For example, in a message addressed to an individual, both the Messaging System Database of the individual and that of the individual's organization may be used for threat checking. FIG. 15 illustrates an embodiment with a hierarchically organized set of Messaging System Databases. Organizational database 1501 contains an aggregate Message Archive and Contacts for all individuals within the organization, and Summary Data derived from these aggregates. Each individual within the organization has an individual Personal Database, such as for example Personal Databases 1502, 1503, and 1504. The Personal Database for an individual may contain, for example, messages sent to or sent by that individual, and contacts entered by that individual. The Organizational Database 1501 may for example be a union of all of the Personal Databases, and it may include additional organization-wide information that is not associated with any particular individual. Threat detection 1520 for an incoming message such as 1510 may reference the Organizational Database 1501 as well as the Personal Database 1504 of the message recipient. This scheme is illustrative; one or more embodiments may use any set of Messaging System Databases in any manner to check messages for threats.

FIG. 15 also illustrates an embodiment that uses data from one or more external databases to supplement the analysis of the organization messaging database in order to perform threat detection. In the embodiment shown, external databases 1530 are accessed by threat check 1520. These databases may include for example database 1531 that may contain unacceptable senders or web sites, database 1532 that may contain known or suspected spammers, and database 1533 that comprises for example DNS and whois servers that provide information on website identity and registration. These examples are illustrative; one or more embodiments may access any available external databases in addition to internal organizational messaging databases to perform threat detection.

Figure 16:
FIG. 16 illustrates an embodiment that detects a potential threat if a message is from a new sender that does not appear in the Message Archive.

One or more embodiments may use any information in a Messaging System Database to check a message for threats. We will now describe several specific examples of threat detection techniques that use the Messaging System Database information. FIG. 16 illustrates an embodiment that checks for threats by comparing the sender of a message to the senders of all previously received messages in the Message Archive; if a sender is a new sender, the message is classified as a potential threat. In the example illustrated in FIG. 16, the Personal Message Archive 1601 of the recipient is used for the threat check 1603; one or more embodiments may also use an organizational message archive (for example, to classify a message as a potential threat if the sender has never sent a message to anyone in the organization). The email address of the sender of message 1602 does not appear in the From field 1604 of any message in the Message Archive 1601; thus the threat detection process 1603 classifies the sender as a "new sender" 1605. Based on this classification, one or more embodiments may consider the message to be a threat or a potential threat. Actions taken by the system for this potential threat may include blocking the message entirely, blocking parts of the message, or warning the user about the potential threat. In the example shown in FIG. 16, the system transforms message 1602 into modified message 1606; the transformation inserts a warning that the sender is new, and that the user should therefore be cautious, particularly in sharing personal information. In this example, the system inserts a warning 1607 into the subject line, and it inserts a preamble 1608 prior to the message contents that warns that the sender is new.

Figure 17:
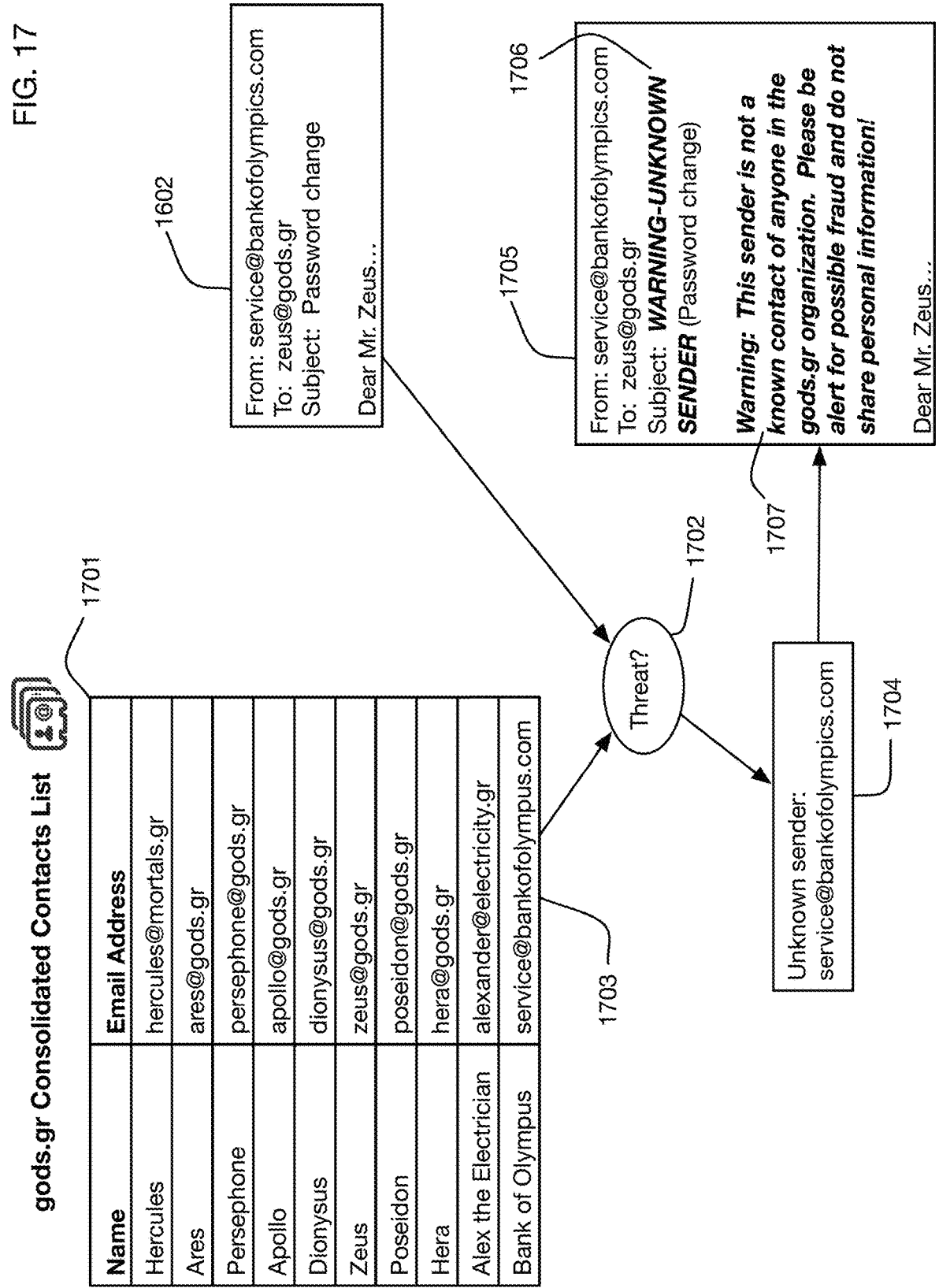
FIG. 17 illustrates an embodiment that detects a potential threat if a message is from a sender who is not in the Contacts list.

The example shown in FIG. 16 uses the Message Archive to determine if a sender is new, and hence potentially a threat. One or more embodiments may use a Contacts list for a similar purpose. For example, a sender may be considered "new" if the sender does not appear in the Contacts list. FIG. 17 illustrates an embodiment that uses a Contacts list to determine if a message sender is a known contact. For illustration, this example uses an Organizational contacts list 1701 instead of a personal contacts list. This is for illustration only; one or more embodiments may use any combination of personal contacts and organizational contacts to screen messages for potential threats. In the example of FIG. 17, message 1602 is checked 1702 for threats by comparing the sender of 1602 to the known contacts in 1701. Because the sender address does not match the email addresses 1703 of the contacts in database 1701, the message is classified as having an "unknown sender" 1704. In this example, the sender's email address is compared to the email addresses of known contacts in the Contacts list 1701. One or more embodiments may use any type of sender identity and contacts identity to determine whether a sender is a known contact, instead of or in addition to email addresses, such as for example, without limitation, names, nicknames, display names, aliases, physical addresses, phone numbers, certificates, or any other identifying information. One or more embodiments may use only parts of an email address, such as for example the domain name portion of the email address. Because message 1602 is from an unknown sender (one whose email address does not appear in Contacts 1701), the message filter of the system may block all or part of the message, or it may transform the message for example to add a warning. In the example of FIG. 17, the system transforms message 1602 to modified message 1705, with a warning 1706 inserted in the subject, and another warning 1707 inserted into the message contents. One or more embodiments may perform any desired transformation on messages that have suspected threats, including for example, without limitation, adding warnings, removing message parts, encoding links or other resources, rewriting message text, and adding levels of security or checking when users attempt to access the message or any of the message parts.

The example of FIG. 16 uses a Message Archive to determine whether senders are known; the example of FIG. 17 uses a Contacts list to determine whether senders are known. One or more embodiments may combine these techniques in any desired manner, using combinations of the Message Archive and the Contacts list to assess the threat potential from the sender of a message. For example, one or more embodiments may classify a sender as unknown if the sender appears in neither the Contacts list nor the Message Archive.

Figure 17A:
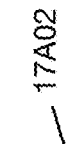
FIG. 17A illustrates a variation of FIG. 17, wherein a message from a sender who was only recently added to the Contacts list is considered a potential threat.

One or more embodiments may use the length of time a contact has been in a Contacts list to determine the likelihood that a message from that contact is a potential threat. This approach may assume, for example, that newer contacts may be less trustworthy since the user or the organization has less experience with them. FIG. 17A illustrates an embodiment that uses the time a contact has been known in a Contacts list to determine the threat potential of a message from that contact. Contact list 17A01 includes field 17A02 with the timestamp of when each contact was entered into the Contacts list. Message 17A10 is received from email address 17A11. This address matches the email address 17A12 of a contact in the Contact list. The sender is therefore a known contact, unlike the example illustrated in FIG. 17. The threat check 17A13 therefore checks how long the contact has been in the Contacts list. By comparing the timestamp 17A14 of when the message was received with the timestamp 17A15 of when the contact was added to the Contact list, the threat check 17A13 determines that the contact was recently added 17A16. This value is compared to threshold 17A17; since the age of the contact is below the threshold, the message is classified as a potential threat. In this example, the threat protection system modifies the message 17A10 by inserting warnings to form message 17A18; warning 17A19 is inserted in the subject line, and warning 17A20 is inserted in the message text. One or more embodiments may block the message or parts of the message instead of or in addition to inserting warnings.

Fraudulent messages such as phishing attacks are often constructed so that they appear to be sent by a known contact. In some cases, messages from senders that appear in the Contacts list may be recognized as fraudulent or potentially fraudulent if the apparent sender is not capable of sending messages. FIG. 17B illustrates an example with a message sender impersonating a distribution list in the Contact list. Contact list 17B01 contains several individual names and addresses, and a named distribution list 17B02 that contains multiple addresses 17B03. Distribution lists are typically configured as recipients of messages rather than senders of messages. Therefore, a legitimate message typically should not have a distribution list as a sender. In the example shown in FIG. 17B, message 17B04 has sender with identity matching the distribution list entry 17B02 in the Contact list 17B01. The threat check 17B05 flags the message as suspicious 17B06 because the sender's name matches the name of distribution list 17B02, which generally should only be a message receiver. Therefore, the system transforms message 17B04 to message 17B07, with warning 17B08 inserted in the message subject and warning 17B09 inserting in the message text. One or more embodiments may block a message from a distribution list instead of inserting warnings. One or more embodiments may use any desired method to detect and flag senders that appear in a Contact list but are not legitimate or typical sources of messages. For example, in addition to distribution lists, non-sending Contact list entries may include email addresses that have been configured by an organization as recipients for particular purposes (e.g., unsubscribe@gods.gr), but that are not used for sending messages.

In some cases, an impostor may use a sending address that is almost identical to that of a known contact, so that the receiver mistakes the sender for the real contact. One or more embodiments therefore may classify a message as a potential threat if the identity of the sender is similar to, but not identical to, that of a known contact in a Contacts list. Any type of identity may be used to compare a sender to a contact. For example, without limitation, an identity may comprise an email address, a partial email address, a domain name of an email address, a display name of an email address, a physical address, a last name, a full name, a nickname, an alias, a phone number, an extension, a PIN, a social security number, or an account number. One or more embodiments may use any method to define and calculate the similarity between two identities.

Figure 18:
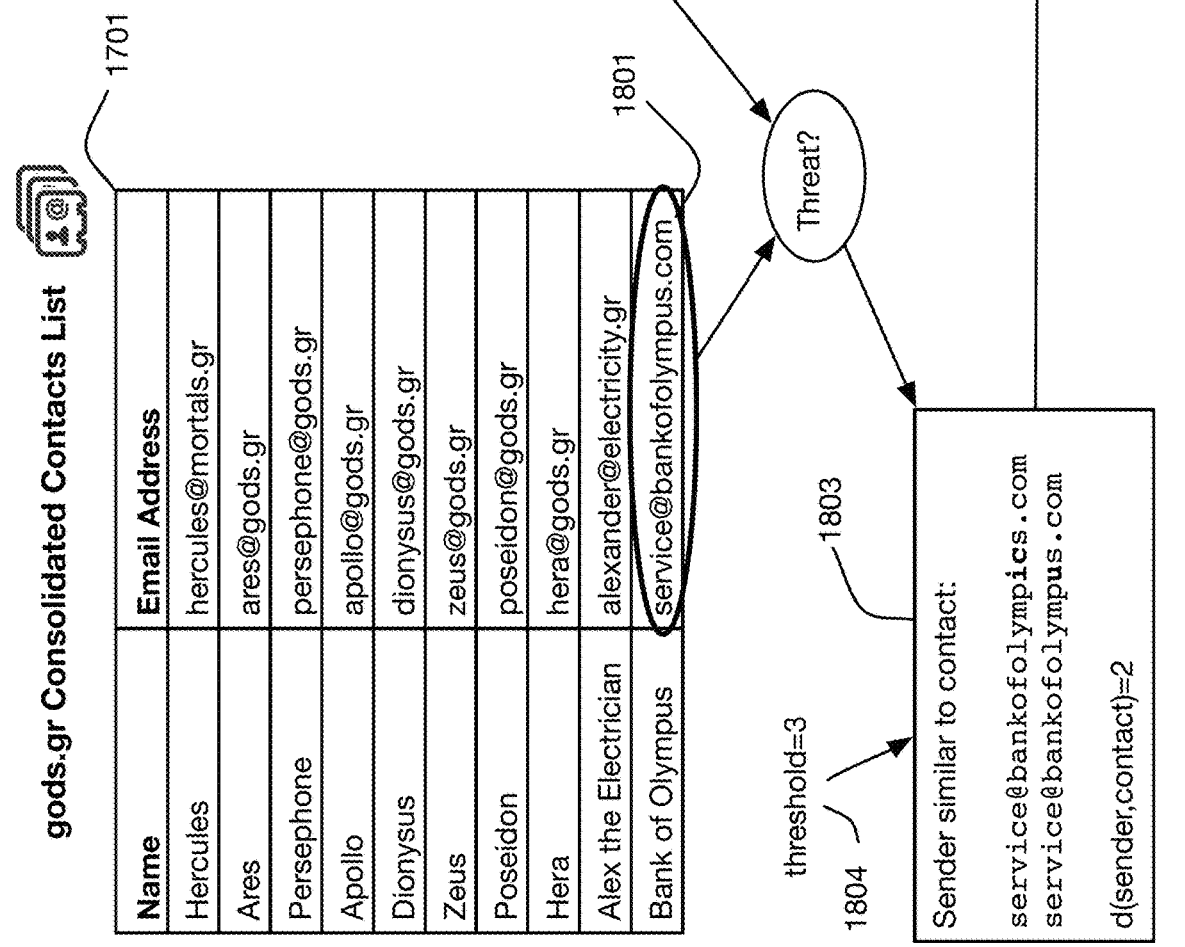
FIG. 18 illustrates an embodiment that detects a potential threat if a message is from a sender with an identity that is similar to, but not identical to, that of a known contact.

FIG. 18 illustrates an example of an embodiment that uses similarity of a sender to a known contact to determine whether a message is a potential threat. Message 1602 has sender with email address 1802. Contact list 1701 contains a similar, but not identical, email address 1801. The threat detection system compares these two identities (which in this example are email addresses) and determines that the sender's identity is similar to, but not identical to, the contact's identity. In this example the comparison uses a distance function between the two identities. One or more embodiments may use any distance function or similarity metric, or any other method to compare identities to determine the degree of similarity, including machine learning models and using, for example, cosine similarity or other similarity measures (e.g., argmax or softmax) to evaluate similarity. One or more embodiments may compare any form of identity, including for example any portion of the email address or any other name, identifier, number, string, or value associated with a sender or a contact. In this example the email addresses are compared using a Levenshtein distance function, which counts the number of character changes needed to transform one string into another string. The result 1803 is compared to threshold 1804; because the similarity metric is positive and below the threshold 1804, the message is classified as a potential threat. The threat protection system transforms message 1602 into modified message 1805, with warnings inserted into the subject line and the message text.

Phishing attacks and other threats may use names or addresses of senders or web sites that are similar to those of known, legitimate senders or websites. In addition to deliberate, minor spelling changes, such as the difference between address 1801 and address 1802 of FIG. 18, attackers may use homograph attacks that use different characters that look alike. For example, different Unicode characters may have identical or similar displays; hence names may differ in their Unicode representation even if they appear identical or very similar to a receiver. As an illustration, the Unicode character 0x0430 is a Cyrillic lower case "a"; this character may look identical to Unicode character 0x0061, which is a Latin lower case "a". Thus for example the domain name www.bankofolympus.com with the "a" in Cyrillic is a different domain from the identical looking name www.bankofolympus with the "a" in Latin. One or more embodiments may compare names for similarity using knowledge of homographs. For example, a distance metric may take into account the display of characters as well as their internal (e.g., Unicode) representation. As an example, each Unicode character may be mapped into a canonical representation character prior to calculating a distance. Thus for example, both 0x0430 and 0x0061 might be mapped to the same representation character "a". The homograph-aware distance between the www.bankofolympus.com name with Cyrillic "a" and www.bankofolympus.com with Latin "a" would then be 0, indicating that one may be an impostor posing as the other. Comparison of names that may include internationalized domain names (or similar identifiers) may first transform these names from an encoded internationalized representation to a Unicode character set, and then to a canonical form or other representation that reflects the display of the characters. For example, the internationalized domain name www.bankofolympus.com with a Cyrillic "a" may be encoded in ASCII as www.xn-bnkofolympus-x9j.com. For name comparison, one or more embodiments may first decode an encoded internationalized ASCII string (like www.xn-bnkofolympus-x9j.com) into the corresponding Unicode characters, and then compare the Unicode string to other names using canonical representations based on display, or based on other similarity scores that take display representations into account.

One or more embodiments may also calculate distances between names taking into account letter combinations that look similar; for example, the letter combination "rn" looks very similar to "m". Thus the name www.bankofolyrnpus.com may be easily confused with www.bankofolympus.com. An illustrative distance metric that takes these similar appearing letter combinations into account may for example use a variation of a Levenshtein distance function that counts a substitution of one combination for a similar looking letter as a fractional letter substitution to reflect the display similarity. For instance, a substitution mapping "rn" to "m" may count as a distance of 0.5, rather than as 2 in a standard Levenshtein distance function. One or more embodiments may extend this example using a table of substitutions between characters and character combinations, with an associated distance weight associated with each such substitution. This approach may also be used for the homograph similarity described above; substitution of one letter for a homograph (identical or similar appearing letter) may for example count as a fractional distance rather than as a full character edit.

Figure 18A:
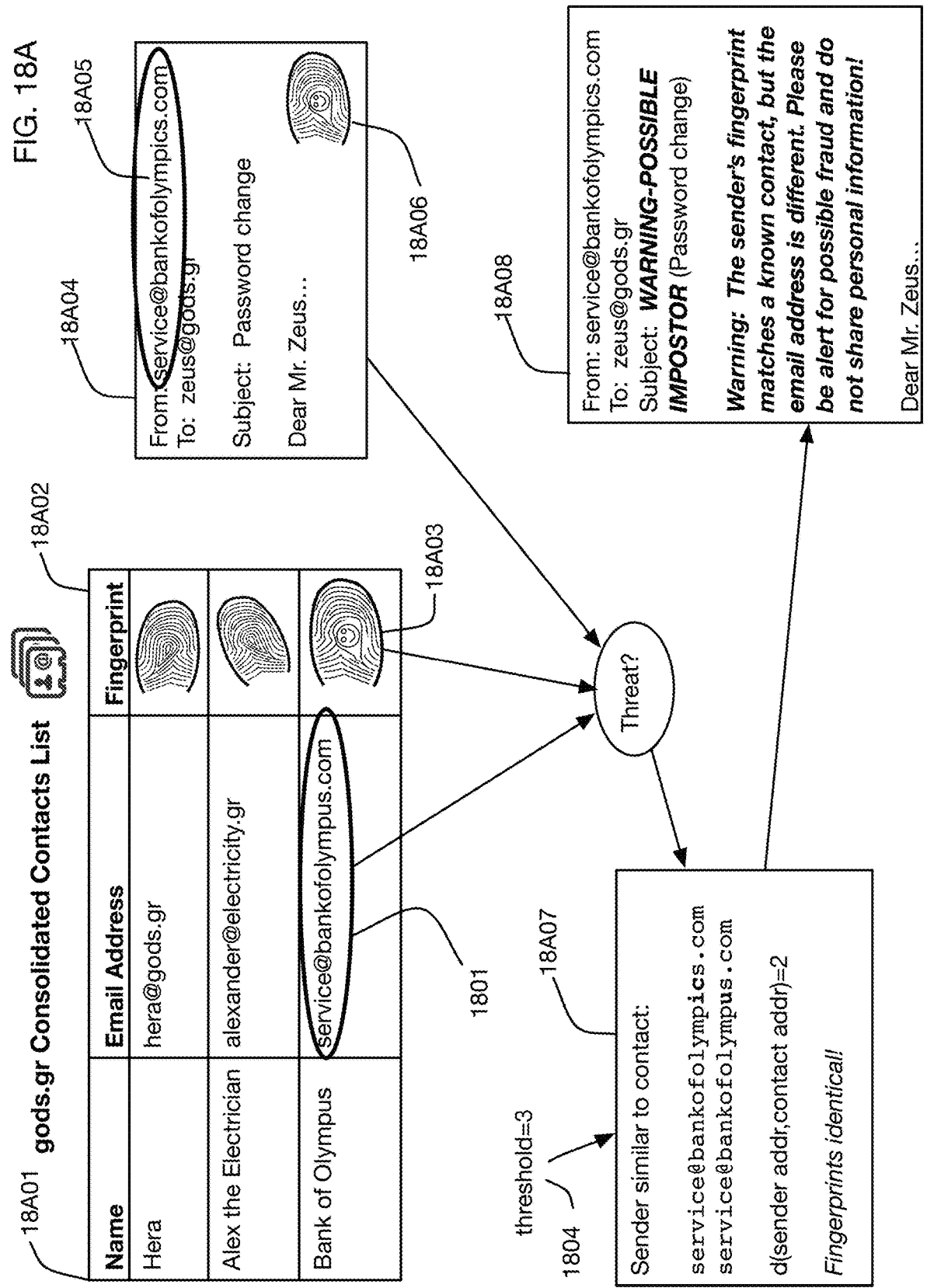
FIG. 18A illustrates a variation of the embodiment shown in FIG. 18; this variation compares biometric identifiers (fingerprints) of a sender with biometric identifiers of known contacts, in addition to comparing email addresses.

One or more embodiments may use any type of identity or identities to compare senders to known contacts or previous senders in order to flag potential threats. FIG. 18 illustrates a comparison using email addresses as identity. FIG. 18A illustrates an embodiment that further compares a sender biometric identifier embedded in a message with corresponding biometric identifiers of known contacts. One or more embodiments may use any form of biometric identifier to compare senders to contacts or to other lists of known senders, including for example, without limitation, a fingerprint, a palm print, a voice print, a facial image, or an eye scan. In FIG. 18A, contacts list 18A01 contains a column 18A02 with a fingerprint of each known contact. In this embodiment, incoming messages may include a fingerprint of the sender. Incoming message 18A04 has sender email address 18A05, and the message contains fingerprint 18A06 ostensibly from the sender. The threat detection system compares the sender email address 18A05 and the sender fingerprint 18A06 to identities of contacts in the contacts list 18A01. The fingerprint 18A06 matches fingerprint 18A03; however, the email address 18A05 differs from the corresponding contact email address 1801. Therefore, the threat detection system determines that the message may be a potential threat 180A07 since the sender's identity is similar to, but not identical to, that of a known contact, taking into account both the fingerprint and the email address. Transformed message 18A08 provides a warning that the sender may be an imposter who has, for example, stolen the fingerprint identity to appear to be the known contact, but who is using a falsified email address as part of an attack.

FIG. 19 illustrates an example that compares both the display name and the address portions of an email address to determine if a sender is a potential impostor. Message 1902 is from sender 1903 with the same display name ("Alex the Electrician") as contact 1901. However, the sender's address (alexander@grmail.com) is different from the address of the contact 1901. Threat analysis 1904 therefore flags the sender as a potential impostor 1905, and adds warnings to transformed message 1906. As this example illustrates, one or more embodiments may compare senders to contacts using any combination of identities or partial identities to determine if a sender may be imitating a known contact.

The examples of FIGS. 18 and 19 illustrate use of a Contact list to identify senders that have identities that are similar to, but not identical to, identities of known contacts. FIG. 20 illustrates an embodiment that checks for similarity of a sender to previous senders or receivers of messages in a Message Archive. Message 1902 is received from sender 1903. The sender identity 1903 is compared to senders that appear in Message Archive 2001. A similar sender is located in message 2002, and the identity 2003 of the sender of message 2002 is compared to the identity 1903 of the sender of the new message. As in FIG. 19, the threat detection system flags the sender as a potential impostor 1905 since the display name is the same but the address is different, and inserts warnings into transformed message 2004. One or more embodiments may use any combination of Contact lists and Message Archives to check the identities of senders and to perform threat analysis. For example, the techniques illustrated in FIGS. 19 and 20 may be combined, wherein a sender may be identified as a possible or probable impostor if the sender identity is similar to either a known contact or to a previous sender or receiver of a message in a Message Archive. One or more embodiments may calculate a similarity score for a sender identity using any combination of data from Contacts and Message Archives.

Figure 21:
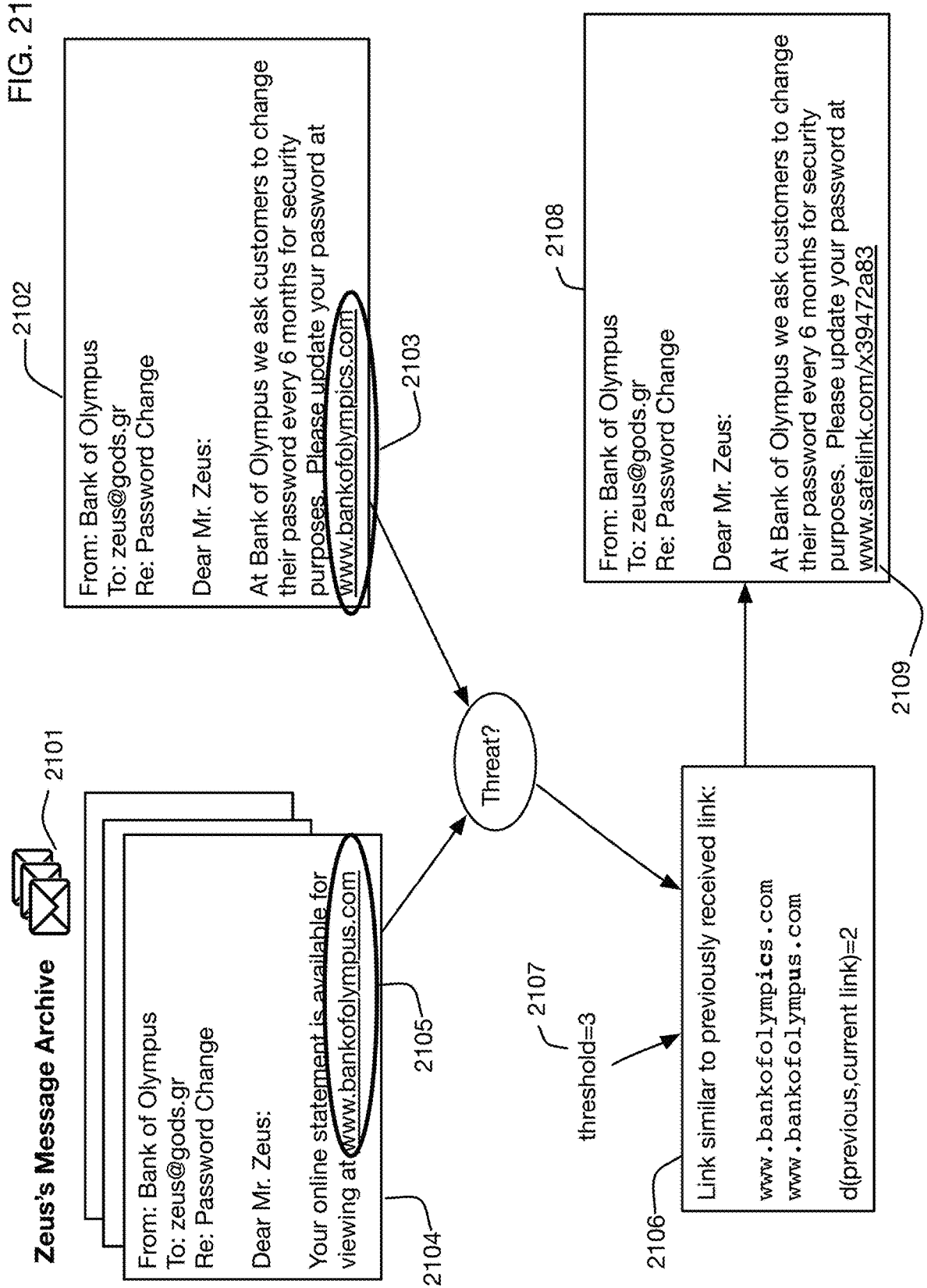
FIG. 21 illustrates an embodiment that detects a potential threat in an embedded link to a website if the link is similar to, but not identical to, a link in a previously received message.

One or more embodiments may apply any of the above techniques to other message parts of a message in addition to the message sender. For example, in phishing attacks a message may include a link to a malicious website that is a close replica of a legitimate website. One or more embodiments may analyze message links by comparing them to previously received links; if the link identities are similar but not identical, the system may flag the link as a potential threat. Any form of link identity may be used for the comparison, such as for example, without limitation, a domain name, an IP address, a certificate, a hyperlink display name, or any value obtained from or derived from the website that is the target of the link. FIG. 21 illustrates an example. Message 2102 contains link 2103 to a website. Message Archive 2101 contains a previously received message 2104 with a link 2105. Using a similarity metric like the one described with respect to FIG. 18, the domain names of the links 2103 and 2015 are compared; the result 2106 is compared to threshold 2107. Because the link 2103 is similar to, but not identical to the previously received link 2105, the message is flagged as a potential threat. One or more embodiments may insert a warning into the message, as for example was illustrated previously. In the example shown in FIG. 21, the threat protection system transforms message 2102 into modified message 2108, which changes link 2103 to an encoded link 2109. Clicking on the encoded link 2109 may for example perform additional checks or present a warning to the user.

One or more embodiments may compare any portion of a link or any portion of a domain name to the corresponding portion of other links or domain names in order to determine similarity. For example, the domain name 2105 (www.bankofolympus.com) includes a top-level domain (com), a second-level domain (bankofolympus), and a host name (www). One or more embodiments may compare domain names for similarity using only the top-level and second-level domains, for example, since organizations can easily assign or change host names (or add subdomains). Thus, a link with the same top-level and second-level domain, but a different host name or other subdomain likely does not represent a threat. As an illustration, if a link is received to www2.bankofolympus.com, the top and second level portions (bankofolympus.com) match the previously received top and second level portions of link www.bankofolympus.com; thus, the new link may not be considered suspicious even though the full domain name differs slightly from the previous full domain name. Additional subdomains may also be ignored in one or more embodiments. For example, a link to www.homeloans.bankofolympus.com may be compared for similarity using only the top-level and second-level domain portion (bankofolympus.com), with the subdomain "homeloans" and the hostname "www" ignored for similarity comparisons. Similarity comparisons in one or more embodiments may also ignore link path names after the domain name, for example. Thus, for example, a link to www.bankofolympus.com/support may be considered identical to a previously received link to www.bankofolympus.com/login, if the similarity comparison compares only the domain name portion of the link (www.bankofolympus.com), or only the top-level and second-level domain portion (bankofolympus.com). In general, one or more embodiments may compare names (including links, addresses, identifiers, domain names, etc.) using any desired similarity measure on either full names or any portion or portions of the names. Portions of names compared may include for example, without limitation, any subset, slice, field, extract, transformation, prefix, or suffix of a name.

Figure 22:
FIG. 22 shows a variation of the example of FIG. 21, where a link domain is compared to the domain of a sender of a previous message in the Message Archive.

One or more embodiments may compare a link in a message to any domain name referenced in any part of any message in a Message Archive. For example, the email address of the sender or receiver of a message generally contains a domain name; this domain name may be compared to a link address in an incoming message. FIG. 22 illustrates an example. Message 2102 contains a link to a website in domain 2203. Message Archive 2201 contains message 2204 from a sender from domain 2205. The system compares domain 2203 and domain 2205; the result 2206 shows that the domains are similar but not identical. The system therefore classifies message 2102 as a possible threat, and transforms it into message 2108 (as in FIG. 21) with an encoded link that provides additional protection or warnings.

Figure 23:
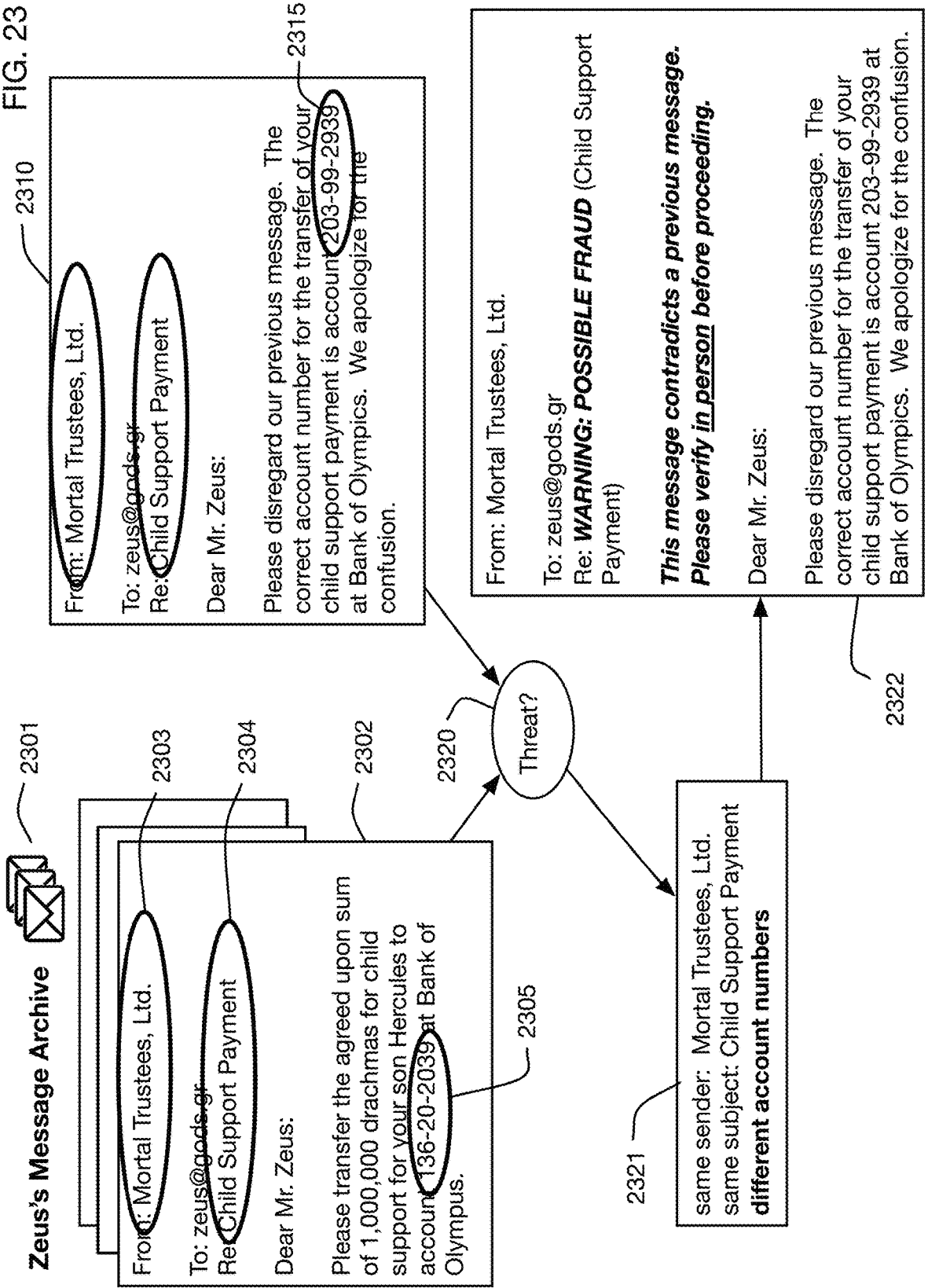
FIG. 23 illustrates an embodiment that detects a potential threat if a message contradicts a previous message; in this case the new message provides an account number that differs from a previously sent account number.

Another indication that a message may be fraudulent is that it is contradictory to or inconsistent with previous messages from the same sender, from a similar sender, with the same or similar subject, or on the same or a similar topic. One or more embodiments may compare the contents of a message with the contents of previous messages in the Message Archive to identify contradictions or inconsistencies. A contradiction may be for example an explicit or implied inconsistency between messages, or it may be an explicit instruction or indication to change or disregard information provided in a previous message. Analyses for contradictions may use any methods to determine the meaning or purpose of the messages, including for example natural language processing, pattern matching, statistical analysis, or artificial intelligence. FIG. 23 illustrates an example of an embodiment that detects a contradiction by observing deposit instructions to two different account numbers. Message Archive 2301 contains a message 2302 from sender 2303 with subject 2304 that instructs the recipient to deposit funds into account number 2305. Subsequent message 2310 is apparently from the same sender and has the same subject, but it references a different account number 2315. Threat detection system 2320 analyzes message 2310 against previous messages in archive 2301 with the same or similar sender or subject, including message 2302, and determines that the account numbers are different. For example, 2320 may search for numbers in a particular format, or for numbers following selected keywords such as "account." It may also search for key phrases that suggest a contradiction, such as "please disregard," "please change," or "use . . . instead." One or more embodiments may use any analysis method to identify account numbers or similar elements within messages, or to identify inconsistencies or possible contradictions. The threat analysis result 2321 therefore flags message 2310 as a possible threat, and the system transforms message 2310 into modified message 2322 by inserting warnings into the subject line and the message contents.

Figure 24:
FIG. 24 illustrates an embodiment that detects a potential threat if a message is unusual compared to a pattern of previously received messages from the sender.

FIG. 24 illustrates another example an embodiment that discovers an inconsistency that may represent a message threat. Message 2402 from sender 2403 requests the recipient to update a password, and it provides an embedded link to do so. Message archive 2401 contains several messages from the same sender. A threat protection system 2404 analyzes these previous messages and determines that the request is unusual 2405 since the sender has never used the phrase "update your password" and has never included an embedded link in a message. One or more embodiments may use any form of pattern analysis, parsing, classification, trend analysis, statistical analysis, or artificial intelligence to determine whether a message represents an unusual message that is inconsistent with previously received messages. Thus the system transforms the message 2402 into modified message 2410 with the link 2406 transformed into encoded link 2411, which provides additional checking or warnings. As described in previous examples, one or more embodiments may also add warnings to the message, or may block all or part of the message.

Figure 25:
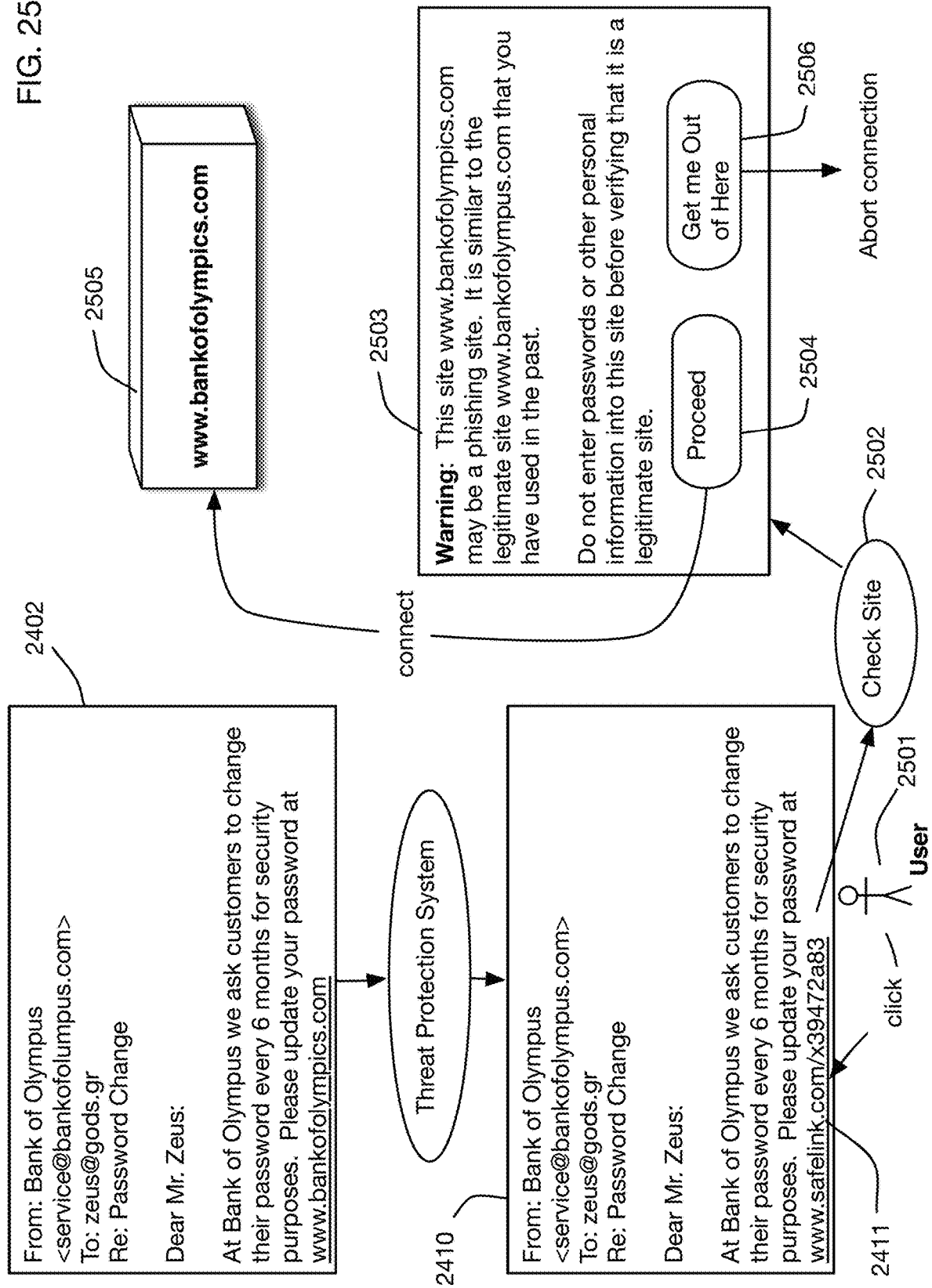
FIG. 25 illustrates an embodiment that transforms suspicious links into encoded links, where clicking on the encoded link performs additional checks and then presents a warning to the user.

FIG. 25 continues the example of FIG. 24 to show an illustrative warning embedded into an encoded website link. When user 2501 clicks encoded link 2411, the threat protection system may perform additional checks 2502 to determine whether the original link target is a potential threat. It may then display a warning message such as 2503. One or more embodiments may not perform any additional checks, but instead may directly display a warning when an encoded link is checked. One or more embodiments may block a site entirely if the check 2502 indicates that the site is a potential threat. Warning message 2503 may for example explain to the user why the link is a potential threat. It may also caution the user not to provide any personal or sensitive information to the site. The warning may provide the user with an option 2504 to proceed to the original site 2505, or an option 2506 to not connect. One or more embodiments may provide any desired information, education, warnings, caveats, or options to the user when the user clicks an encoded link or otherwise accesses a message that has been transformed by the threat protection system.

The check site process 2502 may perform any desired analysis of the site 2505 to determine if it is an actual, potential, or likely threat. FIG. 26 illustrates an embodiment that checks a site's domain registration records to determine the likelihood that the site is a threat. Check 2502a obtains registration information 2601 for the domain associated with the site. The system analyzes the elapsed time since the site was registered, and the length of time for which the site was registered, to determine how "mature" or stable the site is. The result 2602 indicates that the domain was registered recently (30 days ago) and was registered for only one year. This implies a relatively low "maturity score." Therefore, the system provides warning 2603 to the user. One or more embodiments may use any available domain registration information to determine whether a site may represent a threat. For example, one or more embodiments may calculate a maturity score for a website based on any combination of the duration of time since the domain for the site was registered and the length of time for which the domain was registered. One or more embodiments may apply a threshold value to the maturity score to determine whether the site represents a potential threat.

One or more embodiments may assess the maturity of a website, domain name, or other identity by analyzing the pattern of traffic associated with that identity over time. For example, a website may have been registered long ago, but kept "dormant" until recently, in which case it may have a history of little or no traffic until recently; this pattern of traffic may suggest a possible threat. Traffic may be measured for example by services that measure DNS queries, or by services that monitor IP addresses of packets flowing through the Internet. Traffic may also be measured as email to or from specific domains. FIG. 26A illustrates an embodiment that checks the traffic history of a website prior to allowing access to the site. As in the embodiment of FIG. 26, a link to a website received in a message is rewritten into an encoded link; when user 2501 clicks on the encoded link, check 2502b accesses traffic history 26A01 for the site. One or more embodiments may use any source of traffic history information to perform check 2502*b*. For example, without limitation, traffic history may comprise any measurements of incoming connections to a domain or website or IP address, outgoing connections from a domain or website or IP address, email messages sent from or to a domain or address, or DNS queries for a domain name. In the example of FIG. 26A, the website referenced in the original message was registered at time 26A10, which predates the clicking of the link by more than a year. However, traffic measure 26A11 associated with the website was very low or zero for some time after registration. This low traffic measure suggests that the website, although registered, was effectively dormant for a significant period of time after registration. At time 26A12, traffic increased dramatically and exceeded threshold value 26A13. The check 2502*b* therefore uses this time 26A12 as a relevant measure of the maturity of the website, since it indicates when the site stopped being dormant and became active. Since this time of significant activity was very recent, the maturity score 26A02 indicates that the maturity of the site is low. Thus message 26A03 provides a warning that the site may be a threat.

In addition to transforming messages to add warnings or to encode website links, one or more embodiments may further transform messages to encode personal, sensitive, or confidential information. The encoded information may for example only be decoded and presented to the user if the user presents specific credentials, or if the user's identity matches a set of authorized recipients. FIG. 27 illustrates an embodiment that transforms a message to hide a security code from unauthorized users. Message 2701 contains a security code 2702 that should only be available to authorized users. The system 2703 detects this security code in the message, and encodes it into a protected link 2704. When a user 2705 clicks the link, a password prompt 2706 is presented to the user prior to displaying the security code. In one or more embodiments the password prompt may be replaced by an automated check of the identity and credentials of the user, or by any desired authentication and authorization scheme. The threat protection system 2703 may for example locate personal, sensitive, or confidential information in messages using natural language processing, pattern matching, artificial intelligence, or any text processing scheme or algorithm. In the illustrative example of FIG. 27, the system 2703 searches messages for specific phrases 2707. For any of the located phrases, a number or string matching a specific format that is near the phrase may be considered sensitive information, for example. For example, a number of the format "ddd-dd-dddd" (where each "d" is a digit) near the phrase "social security number" or "social security" may be considered to be a social security number, and thus may be encoded by the system.

In one or more embodiments, the sender of a message may designate personal, sensitive, or confidential information explicitly. The threat protection system may then use these user designations to determine what information to encode. FIG. 28 illustrates an example where the sender of message 2801 (or an editor of the message) has inserted tags 2804 and 2805 around code 2702. The threat protection system 2803 searches for these tags 2807 and encodes information located within the tags. One or more embodiments may use any format for tags or other designations to identify information that should be encoded. In one or more embodiments the schemes illustrated in FIGS. 27 and 28 may be combined, wherein the sender may designate sensitive information and the system may in addition attempt to determine other sensitive information that has not been explicitly tagged.

One or more embodiments may transform messages containing personal, sensitive, or confidential information in various ways to protect this information. For example, transformations may delete or substitute message recipients in order to ensure that the personal, sensitive, or confidential information is only sent to authorized receivers or to authorized domains. FIG. 29 illustrates an example. The Threat Protection System 2910 is configured to ensure that confidential information is sent only to email addresses in the gods.gr domain. One or more embodiments may apply similar rules to confidential information for a company or organization, for example, to ensure that this information is only sent within the company. One or more embodiments may have a list of multiple domains that are authorized to receive messages, or may apply any other rules to determine which email addresses are authorized to receive which messages or which types of information. Key phrase list 2911 provides phrases that indicate that a message contains or may contain confidential information. One or more embodiments may also use explicit tagging of sensitive information, as illustrated for example in FIG. 28. In the embodiment illustrated in FIG. 29, Threat Protection System 2910 scans message 2901 for the phrases 2911. This scan may be performed for example when sending, forwarding, or delivering a message. It may also be performed during or after message composition, for example as part of an email client. Because the title 2905 of the message contains a sensitive phrase, the message is flagged as having confidential information. The policy in this illustrative example is that only recipients with email addresses in the gods.gr domain are authorized to receive this information. Of the original recipients 2902, 2903, and 2904 in message 2901, only recipient 2903 has an email address in the authorized domain. Therefore, in this example the system transforms the message to revised message 2920, with only recipient 2903 remaining; the other recipients are deleted by the system.

In one or more embodiments the threat protection system may also substitute a different email address when it transforms a message to remove a prohibited email address. FIG. 30 continues the example of FIG. 29 to illustrate email address substitution. As in FIG. 29, message 2901 is flagged as containing confidential information, based on the patterns defined in 2911, and email addresses 2902 and 2904 are removed from the recipients list because they are not in the authorized domain. In addition, contacts list 3012 is scanned by Threat Protection System 3010 to determine if a user whose email address is removed also has an email address in the authorized domain. In this example, user 3013 has two email addresses, one of which is the unauthorized address 2902 that is removed from the message, and the other of which is in the authorized domain. Therefore, the system 3010 may warn the user and/or make a substitution, and transform the message into message 3020 with address 3021 substituted for address 2902. The contact list 3012 has no matching authorized email address for the unauthorized address 2904; hence this address is simply removed with no substitution.

Information about a resource can change from the time the resource or a reference to the resource is rewritten and delivered to the user as a protected resource, referred to as the "delivery time", and the time the user accesses the resource, referred to as the "display time". For example, at delivery time, a resource is suspected of being a threat based on current information known about the resource. Later on, it's confirmed that the resource is harmful. At display time, the resource is a known threat based on the updated information. The following system mediates a user's access to a resource based on updated information about the resource.

Figure 31:
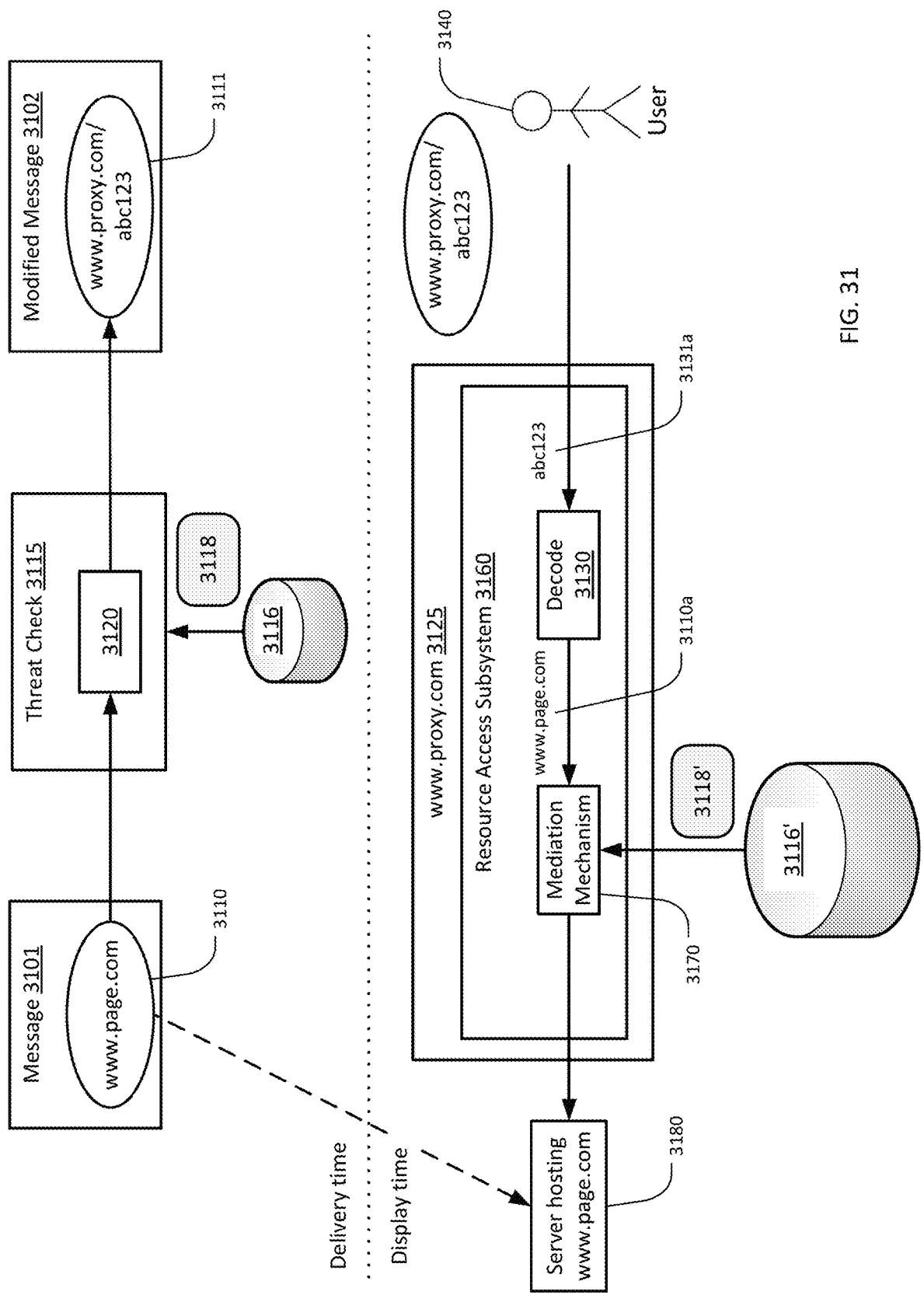
FIG. 31 illustrates an architectural block diagram of an embodiment that mediates a user access to a web page, the link of which is embedded in an electronic message, based on updated information.

FIG. 31 illustrates an example system that mediates a user's access to a resource, including a web page. This can reduce the likelihood that the user will do something harmful like give their password to an unsafe site or reuse their password. This embodiment follows the general architecture illustrated in FIG. 4, with specific components to handle links. In this example, a message 3101 sent to the user 3140 contains a link 3110 to a web page. One or more embodiments may accept messages with any types of links to any types of resource. Links may be for example, without limitation, any uniform resource locator (URL), uniform resource identifier (URI), or uniform resource name (URN) that reference any type of resource, including but not limited to web pages. URIs for example may use any URI scheme, including for example, without limitation, file, http, https, ftp, rtsp, telnet, imap, dns, smtp, mailto, news, or sms. Any method of referring to resources may be used by one or more embodiments. One or more embodiments may accept and rewrite messages with resources included directly in a message, rather than indirectly via a link or reference.

The system includes a Threat Check 3115 that uses information stored in a database 3116 to check the message 3101 for a threat. The database 3116 can include the Messaging System Database 1401, the Organizational Messaging Database 1501, and the other databases described above with reference to FIGS. 14 and 15. Information 3118 can include information that is known about the message 3101 (e.g., the senders of all messages previously received by the user 3140) at delivery time. The Threat Check 3115 can detect a threat based on the information 3118 using any one of the techniques described above with reference to FIGS. 16-30.

In response to detecting the threat, the Threat Check 3115 rewrites the link 3110 into an encoded form 3111 using a Message Transformation Subsystem 3120. The original messages 3101 is then delivered to the user 3140 as a modified message 3102 with the encoded link 3111. In the illustrative embodiment shown in FIG. 31, the encoded link 3111 provides an indirect and encoded link to resource 3180 (i.e., the web page) through a proxy server 3125. When the user 3140 accesses (e.g., clicks) the encoded link 3111 to see the web page at display time, the proxy server 3125 uses the path name ("abc123") after the proxy server's hostname ("www.proxy.com") to determine which resource is referenced.

The proxy server 3125 includes a Resource Access Subsystem 3160 that provides mediated access to the resource 3180 via a Mediation Mechanism 3170. The mediated access can reduce the likelihood that the user 3140 will do something harmful, such as provide their bank password to an unsafe site or reuse their company password for their social media account. At display time, the Mediation Mechanism 3170 consults a database 3116' and uses updated information 3118' for the mediation process, which is described in greater detail below. (The use of prime symbols indicates that the database 3116 and the information 3118 have changed.) The updated information 3118' includes information that is known about the resource 3180 at display time. Mediating the user's access based on up-to-date information is useful. In some cases, little or no information is known about the resource 3180 at delivery time and, as such, it is unclear whether the resource 3180 is a threat or not. By the time the user 3140 accesses the resource 3180 at display time; more information about the resource 3180 may be known resulting in a better threat determination.

For example, in a "zero-day" attack, typically a first group of users are harmed by the attack because it is new and unknown. This prompts security providers like MIMECAST to identify the attack, analyze it, and devise countermeasures. Additionally, information about the attack is disseminated among the security community and the public at large. The system can take advantage of such new information available at display time and can respond by blocking access to a resource, warning a user about accessing a resource, or dynamically triggering a browser isolation session to provide access to the resource in a protected environment. This feature is particularly useful because there is generally a significant time lag in between delivery and display time. The system can limit the number of users likely to be harmed to those who read an unsafe message most promptly, for example. Without the system, it is likely many more users would be harmed by a first wave of deliveries.

Figure 32:
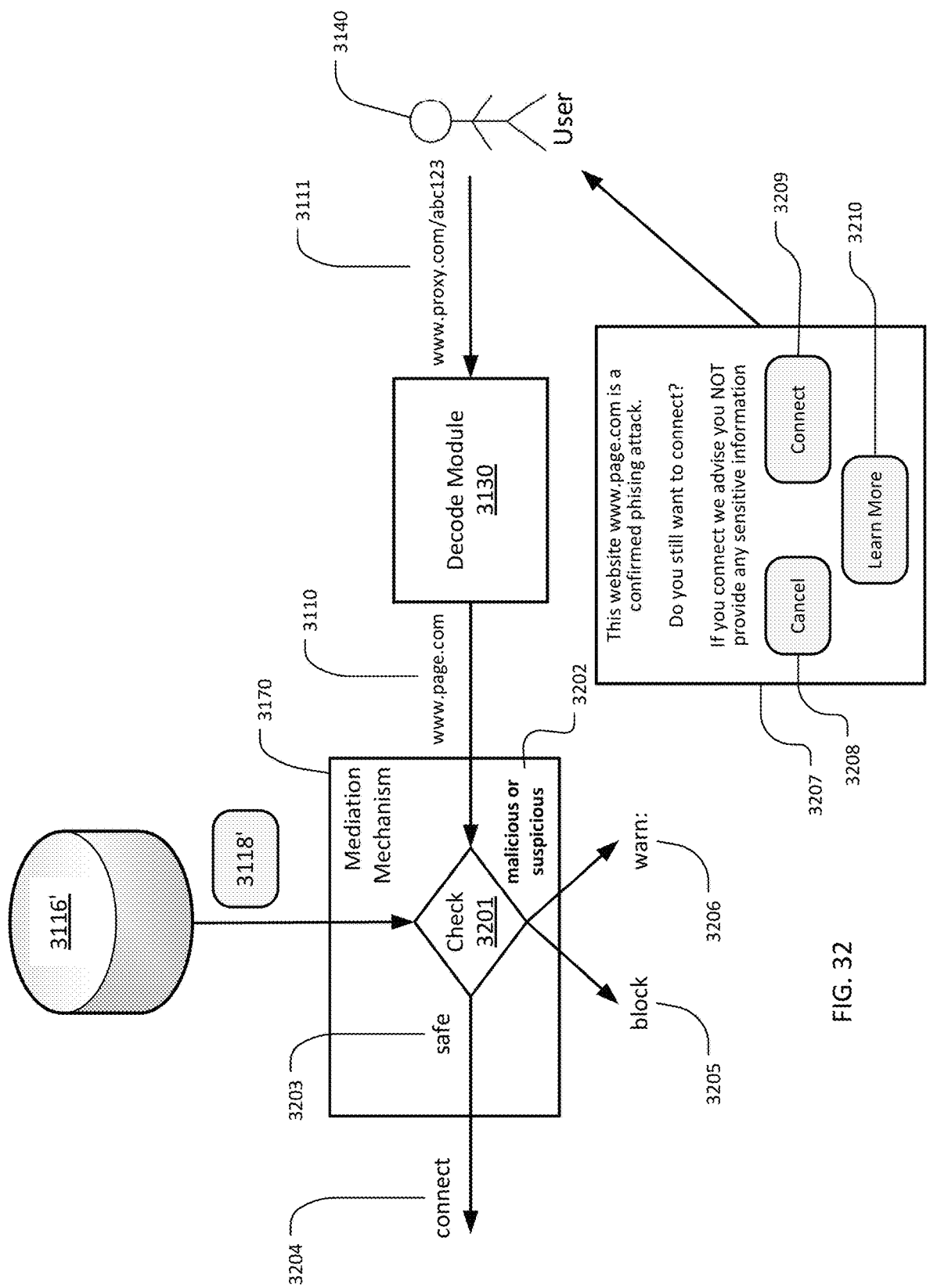
FIG. 32 illustrates possible outcomes of checking a link to a web page based on updated information, which include connecting, blocking, and warning the user.

The Mediation Mechanism 3170 can use a variety of techniques to mediate a user's access to a link. Turning to FIG. 32, Decode Module 3130 decodes the encoded link 3111 yielding the original link 3110 to the web page. (Any method may be used to encode and decode links as described above with reference to FIG. 4.) The Mediation Mechanism 3170 receives the original link 3110 and performs a Check 3201 on the web page. The Check 3201 may use any desired method to determine, at display time, whether the web page presents known or suspected threats of any kind based on the updated information 3118'. For example, a check method that uses updated acceptable and/or unacceptable lists can be used, the basis of which is described above with reference to FIG. 7. Other examples of possible check methods that may be used by one or more embodiments include, without limitation, checking for a valid certificate from a recognized certificate authority, verifying the identity of the sender of a message using for example DomainKeys Identified Mail (DKIM) or Sender Policy Framework (SPF), checking whether the name of a web page or domain is suspiciously similar to that of a known legitimate site, checking the length of time a web page or domain has been registered (under the presumption for example that many phishing sites for instance may be recent or short-lived), checking the IP address associated with a domain for suspicious geographical locations, and using a recommender system to determine a web page's safety reputation.

In one or more embodiments, the Check 3201 includes calculating a suspicion score for the encoded link 3111, and using the suspicion score to determine the action when the user attempts to access the encoded link 3111, as described above with reference to FIG. 7. For example, the suspicion score can be compared with a threshold. A "high" suspicion score is greater than the threshold and a "low" suspicion score is less than or equal to the threshold. Links with high suspicion scores may be blocked and those with low suspicion scores may be allowed and/or trigger a user warning.

The suspicion score can be calculated by a process for analyzing visual representations of the encoded link 3111 and of trusted sites. These visual representations can be webpage visual images and, for the ease of reference, are called "screens". The process represents "durable" or "stable" parts of a screen by ignoring areas of the screen that change from one visit to another, such as display ads. The ignorable areas of the screen can be determined by examining a model that defines the logical structure of data (documents) and the way data is accessed and manipulated, such as the Document Object Model (DOM). Ignorable areas of the screen can also be determined by retrieving a page multiple times and determining which parts of the page have and have not changed. The process can store the stable parts of the screen or can hashes these parts for quick evaluation and comparison.

With respect to trusted sites, the process stores the stable parts of top-level pages of these sites, called "trusted screens". When a user visits a page, for example, the process can hash its visual representation and compare the result to the hashes of the trusted screens. If the screen matches one of the trusted screens but the corresponding site is not one of the trusted sites, the process returns a suspicion score indicating that the link is suspicious. In turn, the link can be blocked or the user can be warned. In one or more embodiments, the user or an administrator of the system can determine (set) which sites are sensitive enough to be trusted sites and have the above-described process applied. While described in the context of analyzing visual representations of sites, the process can also be applied to a video/audio stream to authenticate a video/audio connection.

As previously described, additionally, or alternatively, the suspicion score or threshold may be based, at least in part, on the specific user. In particular, in addition, or alternatively, to the types of threat analyses and remediations discussed above (e.g., correlating the name of a domain from a link with the domain name of a known legitimate website and/or correlation of visual representations), suspicion scores or thresholds may be based on characteristics of the specific user attempting to access the link. Such characteristics may include, but are not limited to, the user's behavior, such as past user behavior with respect to accessing links, both legitimate links (i.e., safe and trusted links) and illegitimate links (i.e., unsafe and untrusted links), as well as any subsequent security threats or breaches occurring as a result of the user's prior behavior. For example, as previously described, the security mechanism 470 may be configured to monitor user behavior to identify any suspicious behavior (i.e., prior user interaction with legitimate and/or illegitimate links, user browsing history, user uploading or downloading of potentially sensitive data and protected resources, etc.). Accordingly, a user's behavior can be used as an indicator of the level potential risk that such a user poses with respect to the maintaining of the security of protected resources (e.g., if the user has a history of reckless behavior, then the suspicion score may be higher, and if the user has a history of good behavior, then the suspicion score may be lower, etc.). Training can be provided based on user-specific concerns.

The characteristics may further include a user's role or title within the particular enterprise (i.e., business entities, companies, organizations, departments, etc.) in which systems of the present invention are implemented. For example, depending on the particular role, a user may have more or less access to protected resources. Accordingly, the greater level of access to protected resource that a given user has (as a result of their role), the greater risk is posed in the event that such a user accesses an illegitimate link. Accordingly, the suspicion score may be based, at least in part, on a user's role or title. Again, training can be provided based on user-specific concerns.

In the embodiment shown in FIG. 32, the Check 3201 determines that the link 3110 is either safe 3203 or malicious or suspicious 3202 based on the updated information 3118' from the database 3116'. (The use of prime symbols indicates that the database 3116 and the information 3118 have changed.) If the link is deemed safe, the system proceeds to connect 3204 to the web page. If the link is deemed malicious or suspicious, one or more embodiments may either block access 3205, or warn 3206 the user 3140. An illustrative warning 3207 is presented to the user 3140 who requested access to the link. This warning may for example explain to the user 3140 why the link is or may be dangerous. It may also educate the user 3140 on potential threats and how to avoid them. In this illustrative example, the warning presents the user 3140 with three options: Cancel 3208, which blocks access; Connect 3209, which ignores the warning and connects; and Learn More 3210, which may present more detailed information about the threat or about threats in general. One or more embodiments may always block 3205 rather than warn a user. One or more embodiments may always warn 3206 and never block 3205.

One or more embodiments may block certain links and warn the user about other links. In one or more embodiments a user warning may for example ask the user one or more questions about the link or about the message in which the link was included; the system may then determine whether to allow access to the link based on the user's response to the questions. FIG. 31 illustrates the Resource Access Subsystem 3160 executing on the proxy server 3125. This is an illustrative configuration; one or more embodiments may distribute these subsystems or modules of these subsystems across servers or other computers in any desired manner.

Virtually everything online requires a password making stolen passwords a very big concern for everyone, and very lucrative business for scam artists and criminals. One deceptive approach is to trick a user into thinking they are dealing with a legitimate entity and ask the user to give them their password and other personal information (e.g., answers to security questions). Another way takes advantage of a user having poor password hygiene like reusing their passwords. It's much less taxing to a user's overburdened memory to use the same password for anything and everything from their online banking accounts to music streaming and credit card accounts, to their social media accounts. What is needed is a system for warning a user of unsafe sites for passwords and enforce good password hygiene.

Figure 33:
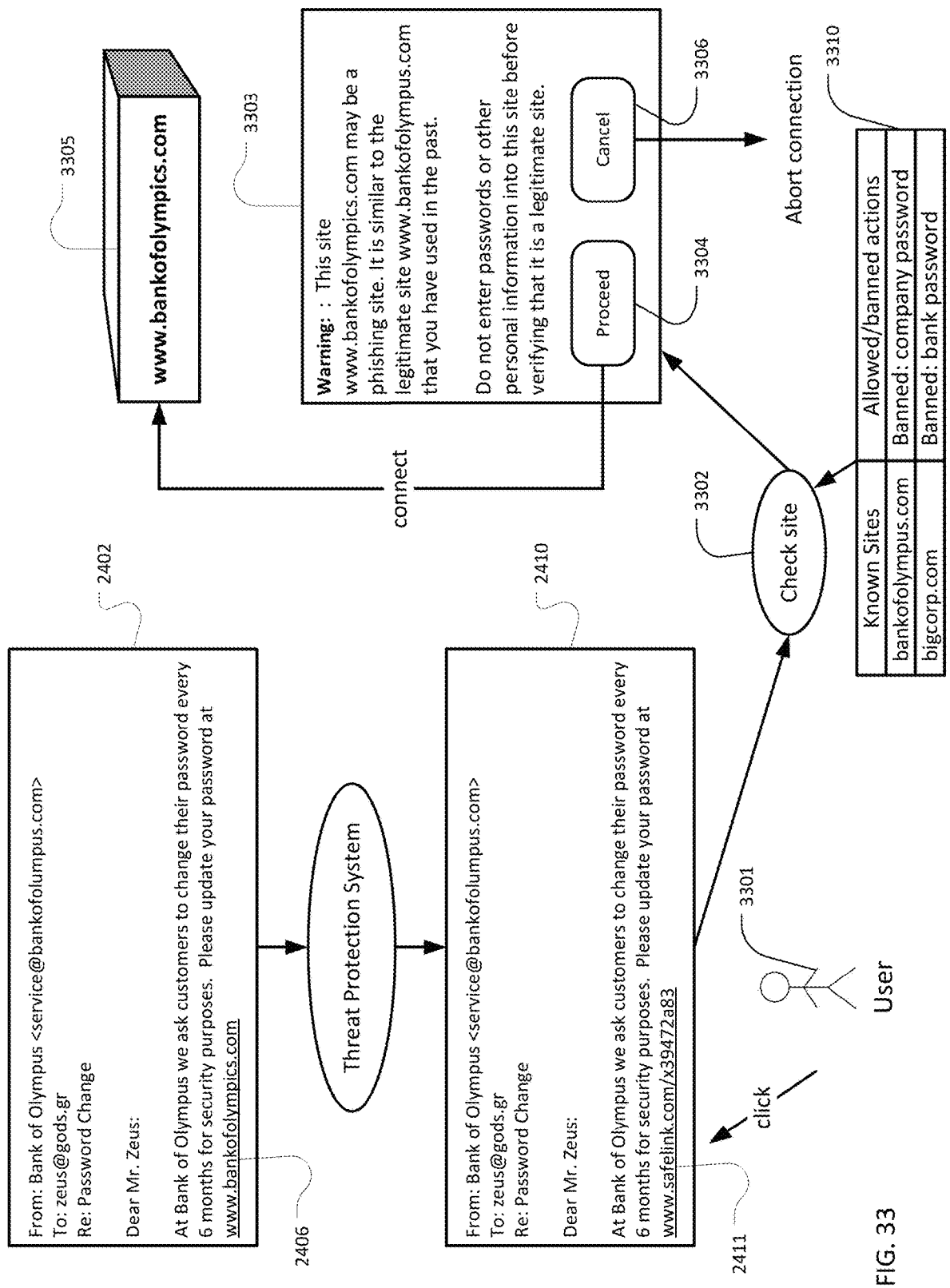
FIG. 33 extends the example of FIG. 24 and illustrates an embodiment that checks whether a site is safe for a user to enter their password and warns the user which actions are allowed or banned with respect to the site.

FIG. 33 continues the example of FIG. 24 to show an example embodiment that warns a user about unsafe sites for passwords. A pre-delivery threat analysis and intervention system, such as the threat protection system 2404 of FIG. 24, rewrites the link 2406 as the encoded link 2411 as previously described. The link 2406 is to the original site 3305 'www.bankofolympics.com'. When user 3301 clicks the encoded link 2411, the threat protection system performs an additional check 3302 to determine whether the original site 3305 is unsafe for passwords. The check 3302 includes consulting a body of information that can include the Messaging System Database 1401, the Organizational Messaging Database 1501, and the other databases described above with reference to FIGS. 14 and 15. For illustration purposes, information relevant to determining whether the site is unsafe for passwords is described as and represented in the Figure as a "list" 3310. The list 3310 contains known sites and allowed/banned user actions associated with the known sites. For example, www.bankofolympus.com is a known site and user is not allowed to use (or provide) the password they use to login into their work account. Also shown, www.bigcorp.com is a known site and user is not allowed to use (or provide) the password they use to login into their bank account. Other user actions that can be controlled include providing corporate credentials and providing company credit card details just to name a few examples. Known sites can be looked up by URL, domain, subdomain, and wildcard just to name a few possible identifiers.

In the example shown in FIG. 33, the encoded link 2411 corresponds to an original site 3305 'www.bankofolympics.com' that is not found in the list 3310. In response, the threat protection system displays a warning message 3303 explaining to the user 3301 why the link is a potential threat and cautioning the user 3301 not to provide any personal or sensitive information to the site 3305. The warning may provide the user 3301 with an option 3304 to proceed to the original site 3305, or an option 3306 to not connect. One or more embodiments may provide any desired information, education, warnings, caveats, or options to the user 3301 when they click an encoded link or otherwise accesses a message that has been transformed by the threat protection system. If a site is found in the list 3310, the threat protection system displays a warning message informing the user 3301 of allowed and/or banned actions, as will be described next.

Figure 34A:
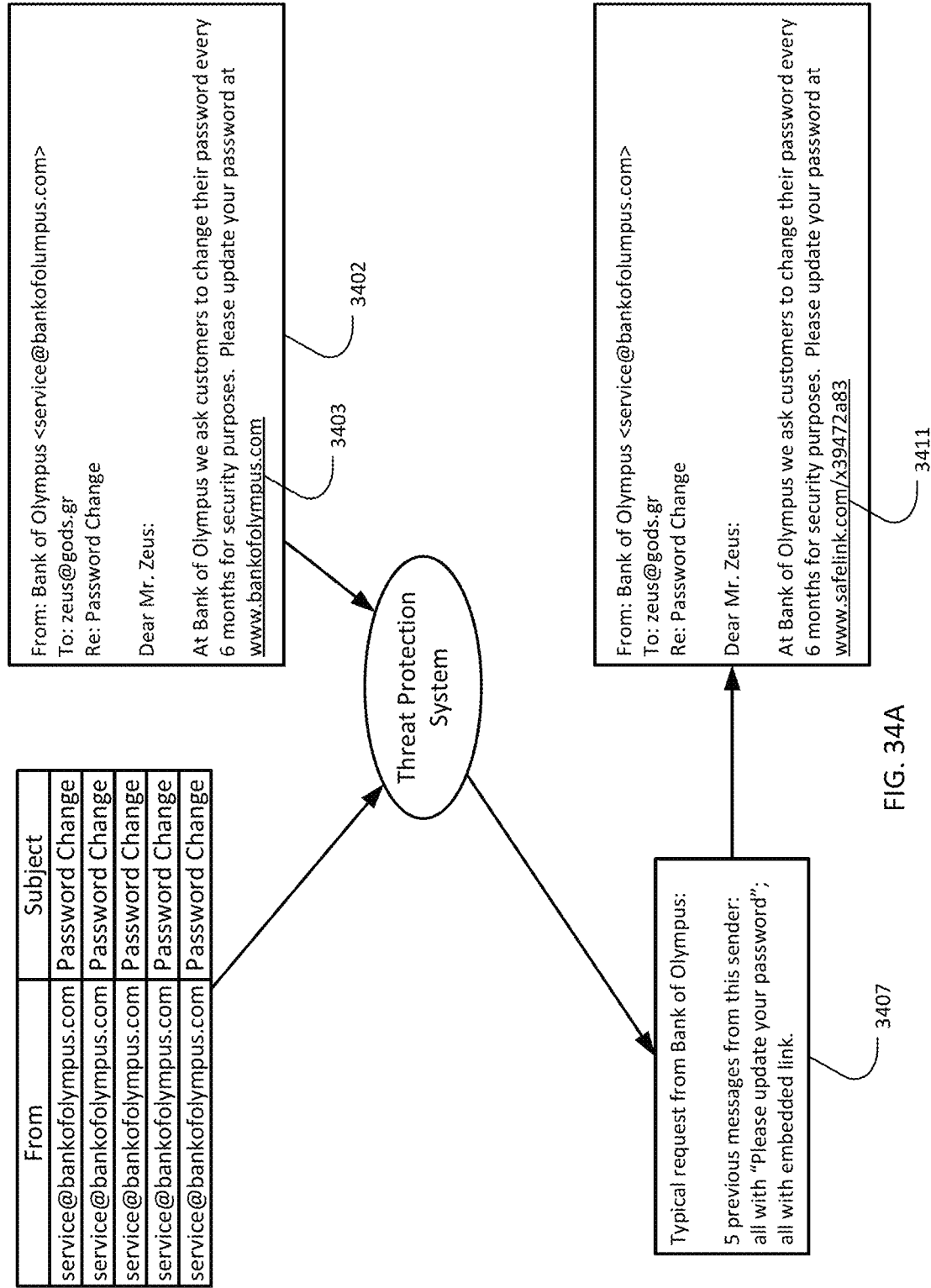
FIGS. 34A and 34B illustrate another example in which the embodiment of FIG. 34 checks whether a site is safe for a user to enter their password and warns the user which actions are allowed or banned with respect to the site.
Figure 34B:
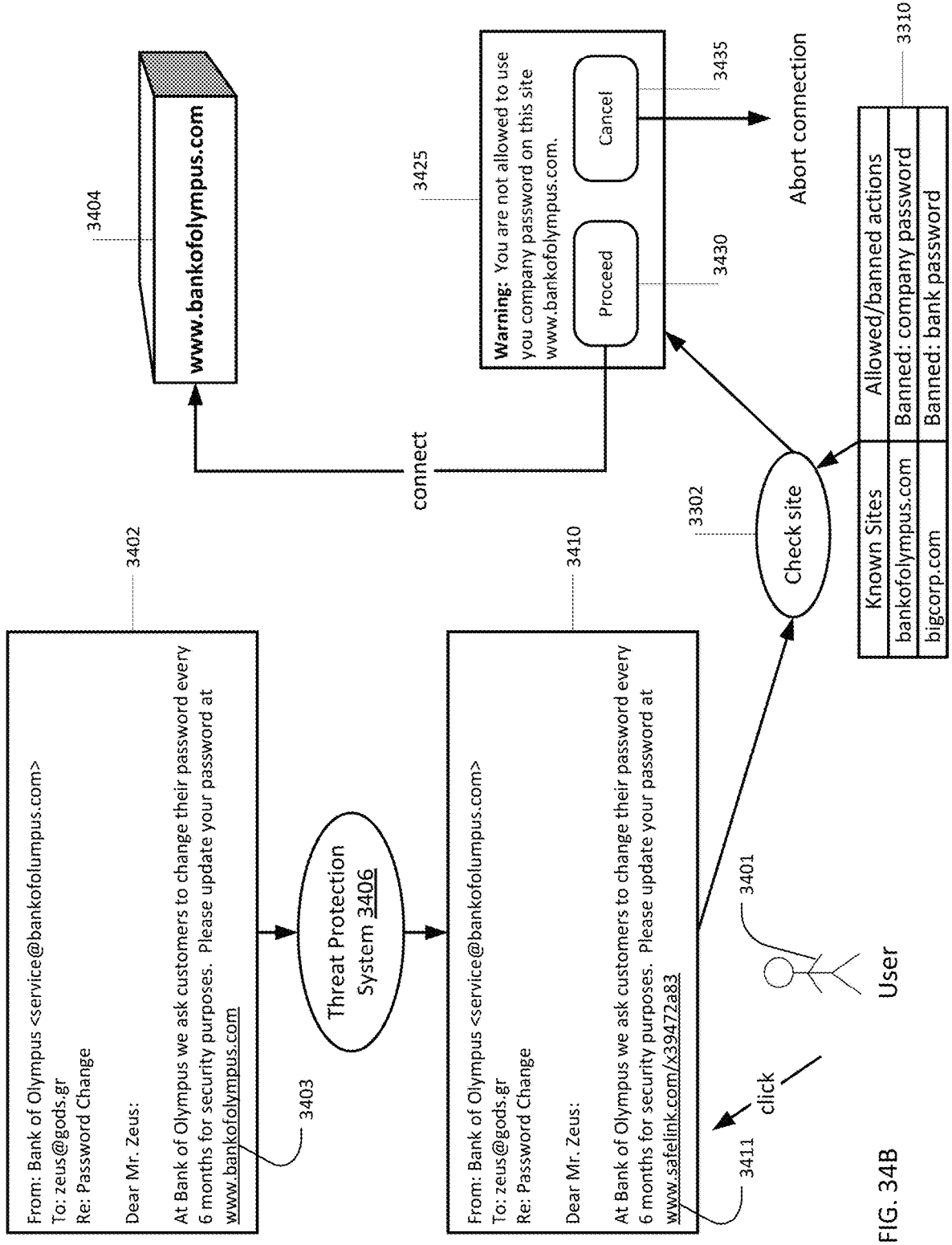

FIGS. 34A and 34B illustrate an example embodiment that encourages a user 3401 to practice good password hygiene. In FIG. 34A, the Bank of Olympus sends a message 3402 requesting the user 3401 to update their password. The message 3402 includes an embedded link 3403 to site 3404 'www.bankofolympus' where the user 3401 can update their password. Message archive 3405 contains several messages from the Bank of Olympus (service@bankofolympus). The threat protection system analyzes the previous messages and determines that the request 3402 is a typical request 3407 because the Bank of Olympus reminds the user 3401 to update their password, regularly. (Changing passwords regularly is itself part of good password hygiene.) One or more embodiments may use any form of pattern analysis, parsing, classification, trend analysis, statistical analysis, or artificial intelligence to determine whether a message represents a typical message that is consistent with previously received messages.

Turning to FIG. 34B, the threat protection system can perform a similar analysis on the embedded link 3403 and determines that the embedded link 3403 is asking the user 3401 to provide one or more passwords. For example, the threat protection system can access the embedded link 3403 and detect a passwords page. The threat protection system transforms the message 3402 into a modified message 3410 with the link 3403 transformed into an encoded link 3411, which provides additional checking or warnings. As described in previous examples, one or more embodiments may also add warnings to the message, or may block all or part of the message.

Continuing with FIG. 34B, when the user 3401 clicks the encoded link 3411, the threat protection system performs the check 3302 to determine what user actions are allowed and/or banned. In this example, the site 3404 is found in the list 3310 and is associated with a banned action 'Banned: company password'; which means the user 3401 is not allowed to use (or provide) their company password to the site 3404. The threat protection system displays a warning message 3425 explaining to the user 3401 they are not allowed to use (or provide) their company password to the site 3404. More importantly, the threat protection system provides a very simple message to the user 3401 that they cannot enter a password (or other personal information) unless they receive the warning message 3425.

The user 3401 sees the warning message 3425 and is reminded not to reuse their company password as a password for their bank account and to use a different password instead. Beneficially, the system directs the user 3401 to update their password with a new password instead of reusing an old one, thereby encouraging the user 3401 to follow good password hygiene. The warning message 3425 can provide the user 3401 with an option 3430 to proceed to the original site 3404, or an option 3435 to not connect. One or more embodiments may provide any desired information, education, warnings, caveats, or options to the user when the user clicks an encoded link or otherwise accesses a message that has been transformed by the threat protection system.

In response to updated information, the threat protection system can create and provide an intermediary page prior to connecting the user 3401 to the original site 3404. The intermediary page can warn the user which user action is allowed or banned with respect to the site 3404, or warn the user that the site 3404 is suspicious. Because the threat protection system provides the intermediary page before allowing the user to go to the site 3404, it may be convenient to say that the system intervenes or interrupts the user's access to the original site 3404.

The threat protection system can also create and provide an intermediary page to mitigate potential damage caused by a "zero day attack". In many cases, at the time of the attack, the zero day attack is not even recognized as an attack at all. When the system does not know whether a resource that a user seeks to access is safe or not, the system creates and returns an intermediary page for the user notifying them to use caution. This may dissuade the user from accessing the resource and thwart the zero day attack. Advantageously, if there is more information known about the attack (e.g. damage caused the attack), the system can provide an intermediary page to the user with updated information, a security patch or even block the user from accessing the unsafe resource. As such, the threat protection system can limit the extent of users affected by a zero day attack to only those users who promptly access an unsafe resource.

The intermediary page can be secured with personal information to reduce the likelihood that the page can be faked by someone phishing for passwords. The personal information can include, for example, the last 4 digits of a user's phone number and their recent activities (e.g., a particular email was sent or received by the user, or the subject of their most recent email in their inbox). In another example, the intermediary page can include an image and/or phrase that the user selected when they registered with a site. Including the user-selected image/phrase proves to user that the intermediary page is not a fake.

While the techniques for mediating a user's access to a resource are described in the context of a threat protection system, the foregoing principles can be applied to an application or a plug-in for a browser running on the user's computer or mobile computing device (including smart phones and smart watches). In such examples, the browser plug-in or application can mediate access to the resource without an intermediary page. Furthermore, user access can be mediated based on physical or network location. For example, the browser plug-in can detect that a user is in a virtual private network (VPN) and allows the user to provide their password to a site only when they are on the VPN. In another example, the browser plug-in can detect that a user is a specification geographical location (using GPS or based on IP address) and prevent the user from using certain passwords. The foregoing techniques can also be applied to a variety of situations in which a user should use care in typing important passwords or login details, forgotten password answers to questions, and the like. Such situations include as internet banking, social media, and ecommerce.

The threat protection systems described herein also may be configured to provide remediation services in the event that an illegitimate link is clicked and/or passed along to (e.g., shared with) other users (e.g., via email, messaging, or the like). For purposes of this discussion and claims, remediation generally includes removal of messages or files once detected as malicious post-click. Remediation can be performed for the user who clicked and/or for other potentially-affected users.

The threat protection systems described herein also may be configured to replace a URL with a shortened URL in certain situations. For example, in the event that an email is sent to a user, wherein the email contains a link (URL), the threat protection system is configured to analyze the email and, in some instances, replace the URL, e.g., with a shortened URL. URL shortening is a technique in which a URL may be made substantially shorter and still direct to the website associated with the original link. This is achieved by using a redirect, which links to the webpage that has the original, longer URL.

The systems of the present invention are configured to map a shortened URL to one or more stored objects such as JavaScript Object Notation (JSON) objects, wherein such objects may include informational data associated with them. For example, as previously described, a Message Filter 1410 may be applied to electronic messages, in order to check for potential threats and to respond to detected or suspected threats. The filter may check any or all of the message parts that comprise a message, which can serve as informational data for the JSON objects, such as for example, without limitation, the sender or senders, the receiver or receivers, the headers, the message text, the subject, the message thread, attachments, embedded links, embedded media, the path along which the message was transmitted, and timestamps associated with creating, sending, forward, receiving, and reading the message. The informational data may further include, for example, entity relationship (ER, which, for purposes of this discussion and claims is an object that stores all the message receipt and delivery metadata and data, thereby providing the system everything about the message in which the link was received), IP, and Policy Id, to name a few.

Accordingly, by associating the shortened URLs with objects such as JSON objects and the vast amount of informational data associated therewith, such shortened URLs become "smart URLs", in that the threat detection systems can utilize the informational data tied to any given short URL for more advanced processing such as, for example, providing detailed intermediary pages (since the systems knows the message), performing remediation (again, since the system knows the message), addressing other recipients (e.g., what actions did other recipients take, and has the system taken action for other recipients such as scanning, blocking, warning, triggering a browser isolation session, etc.). The system also knows all the other URLs in the message via the Smart URL, and the system can treat these other URLs as being bad by association. For example, in the event that a user clicks on a link that is illegitimate (and thus presents a security risk), the threat detection system can automatically remediate the message for all other recipients of the message based on the informational data associated with the link. In particular, by having knowledge of the ER (e.g., based on device enrollment, from which the identity of the person who clicked a URL can be determined), the message can be found, as well as all other original recipients of the message, all other URLs in the message, as well as all other recipients of forwarded messages (including forwarding of short URLs). Similar functionality can be provided for attachment release links. The remediation may include, for example, simply removing the malicious links, attachments, or the message entirely from a recipient's inbox, and/or notifying the recipients and administrator.

While the invention herein disclosed has been described by means of specific exemplary embodiments and applications thereof, numerous modifications and variations could be made thereto by those skilled in the art based on the disclosure without departing from the scope of the inventive concepts.

It should be noted that, while links are used in many of the described embodiments as examples of resources and content that are subject to mediated access, exemplary embodiments described herein can apply to many other types of resources and content including, without limitation, icons, attachments, and email addresses, to name but a few. Thus, embodiments of the present invention are not limited to links even if a link is the only example resource or content described in a particular exemplary embodiment. It also should be noted that terms such as "resource" and "content" are often (but not necessarily) used interchangeably throughout the specification such that, for example, in at least some cases, mediated access to certain content can be considered mediated content to a resource, and vice versa.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry.

Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

As described herein, various embodiments may be implemented using hardware elements, software elements, or any combination thereof. Examples of hardware elements may include processors, microprocessors, circuits, circuit elements (e.g., transistors, resistors, memristors, quantum computing devices, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A system for mediating a user's access to content, the system comprising:
    a processor coupled to a non-transitory memory containing instructions executable by the processor to cause the system to:
        monitor content delivered to, or queued to be delivered to, a computing device associated with the user, wherein the content is subject to changing over a period of time based on user interaction with the content through selection of a selectable object of the content or entry of data into a data entry field of the content;
        analyze the content including analyzing the content at least each time the content changes based on said user interaction with the content to determine whether the content requires disclosure of information and/or poses a threat; and
        mediate user access to the content based on the analysis, wherein the mediating of user access comprises at least one of (1) outputting to the user, at least prior to and/or during user interaction with the content, security- or content-related information associated with the content or (2) preventing any subsequent user interaction with the content.

2. The system of claim 1, wherein the system is configured to analyze the content at a time of delivery and also to analyze the content at least once after delivery but before the user accesses the content.

3. The system of claim 2, wherein the system is configured to analyze the content after delivery in response to the user attempting to access the content.

4. The system of claim 1, wherein outputting the security- or content-related information comprises generating an indicator to be displayed on a user interface of the user's computing device that indicates to the user one or more actions that are deemed allowable or banned with respect to the content.

5. The system of claim 1, wherein outputting the security- or content-related information comprises generating an indicator to be displayed on a user interface of the user's computing device that comprises a safety assessment of the content.

6. The system of claim 1, wherein outputting the security- or content-related information comprises generating an indicator to be displayed on a user interface of the user's computing device that comprises information about the content.

7. The system of claim 1, wherein outputting the security- or content-related information comprises generating an indicator to be displayed on a user interface of the user's computing device that indicates a recommended action for the user to take with regard to the content.

8. The system of claim 1, wherein outputting the security- or content-related information comprises generating an indicator to be displayed on a user interface of the user's computing device that indicates whether the content contains a virus, malware, a cyberattack mechanism including phishing, or a combination thereof.

9. The system of claim 1, wherein outputting the security- or content-related information comprises generating an indicator to be displayed on a user interface of the user's computing device that comprises training information.

10. The system of claim 1, wherein the content is associated with at least one of a software application, an operating system, a website, an email, an instant message, a text message, a voice mail, a social media message, a syndication feed such as RSS and ATOM, or a telecommunication.

11. The system of claim 10, wherein the analysis comprises identifying one or more information resources associated with the content and determining whether or to what degree or with what probability the one or more information resources poses a security threat.

12. The system of claim 11, wherein the one or more information resources comprises a link, an icon, an attachment, or other visual representation of an information resource.

13. The system of claim 12, wherein the visual representation is an email address or a link associated with a domain.

14. The system of claim 1, wherein the analysis comprises a similarity analysis of data associated with the content to a set of data associated with trusted content and flagging the content as being legitimate and safe or flagging the content as being illegitimate and unsafe based on the similarity analysis.

15. The system of claim 14, wherein the similarity analysis uses a distance function, similarity metric, or machine learning model to evaluate similarity.

16. The system of claim 1, wherein the content data and the trusted content data comprises at least one of domain name(s), Uniform Resource Locator(s) (URL), Uniform Resource Identifier(s) (URIs), Internet Protocol addresses, HTML structure, webpage resources, including images, reputation data, and a combination thereof.

17. The system of claim 1, wherein the analysis comprises a graphical comparison comprising either a full comparison or a partial comparison of a screen image of the content to a screen image of trusted content and the flagging of the content is based, at least in part, on the graphical comparison.

18. The system of claim 14, wherein the analysis comprises determining a suspicion score, wherein the suspicion score is a similarity metric representing of a degree of similarity between the data associated with the content and the set of data associated with trusted content.

19. The system of claim 1, wherein the processor is provided locally on the computing device or provided on a server remote from the computing device.

20. The system of claim 1, wherein the mediating of user access comprises recommending or triggering a browser isolation session to provide user access to the content in a protected environment.

21. The system of claim 1, wherein the content has been rewritten as protected content by a pre-delivery threat analysis and intervention system prior to delivery to the user.

22. The system of claim 21, wherein the content includes a smart URL associated with stored information identifying the original content, message, and recipients.

23. The system of claim 22, wherein the stored information is used as part of the threat analysis.

24. The system of claim 1, wherein the content is analyzed every time new content is loaded.

25. The system of claim 1, wherein outputting the security- or content-related information comprises alerting the user of the changes to the content.

* * * * *